(12) United States Patent
Shaw et al.

(10) Patent No.: US 6,456,766 B1
(45) Date of Patent: Sep. 24, 2002

(54) OPTOELECTRONIC PACKAGING

(75) Inventors: Kevin A. Shaw, Ithaca; James S. Sutherland, Corning, both of NY (US)

(73) Assignee: Cornell Research Foundation Inc., Ithaca, NY (US)

( * ) Notice: Subject to any disclaimer, the term of this patent is extended or adjusted under 35 U.S.C. 154(b) by 0 days.

(21) Appl. No.: 09/494,944

(22) Filed: Feb. 1, 2000

(51) Int. Cl.⁷ .................................................. G02B 6/26
(52) U.S. Cl. ............................ 385/47; 385/49; 385/50; 385/65
(58) Field of Search ..................... 385/47, 49, 50–52, 385/65, 83, 14

(56) References Cited

U.S. PATENT DOCUMENTS

| | | | |
|---|---|---|---|
| 4,165,914 A | * 8/1979 | Villarruel et al. | 385/44 |
| 5,198,390 A | 3/1993 | MacDonald | 437/203 |
| 5,393,375 A | 2/1995 | MacDonald | 156/643 |
| 5,846,849 A | 12/1998 | Shaw | 438/52 |

* cited by examiner

Primary Examiner—Cassandra Spyrou
Assistant Examiner—Fayez Assaf
(74) Attorney, Agent, or Firm—Jones, Tullar & Cooper, P.C.

(57) ABSTRACT

Packaging of micromechanical and microelectromechanical devices is carried out by mechanical couplers for connecting pairs or arrays of optical fibers in end-to-end alignment. In another embodiment, a coupler interconnects one or more optical components on a substrate. The electrical components may be active elements such as light sources or light sensors, while the optical components may be waveguides. The fibers are secured in a coupler block, and a substrate carrying the light detector or light source is mounted on or in the block and is secured in alignment with the fibers. The fibers are removably secured within the block by spring fingers.

The coupler block may include electrical circuitry connectable to the sensors or light sources on the substrate mounted on the block through wire bonding techniques.

56 Claims, 32 Drawing Sheets anisotropic deep etch creates waveguide coupler region 304 deposit coupler waveguide material and CMP deposit and pattern photonic circuit waveguide material to other photonic devices

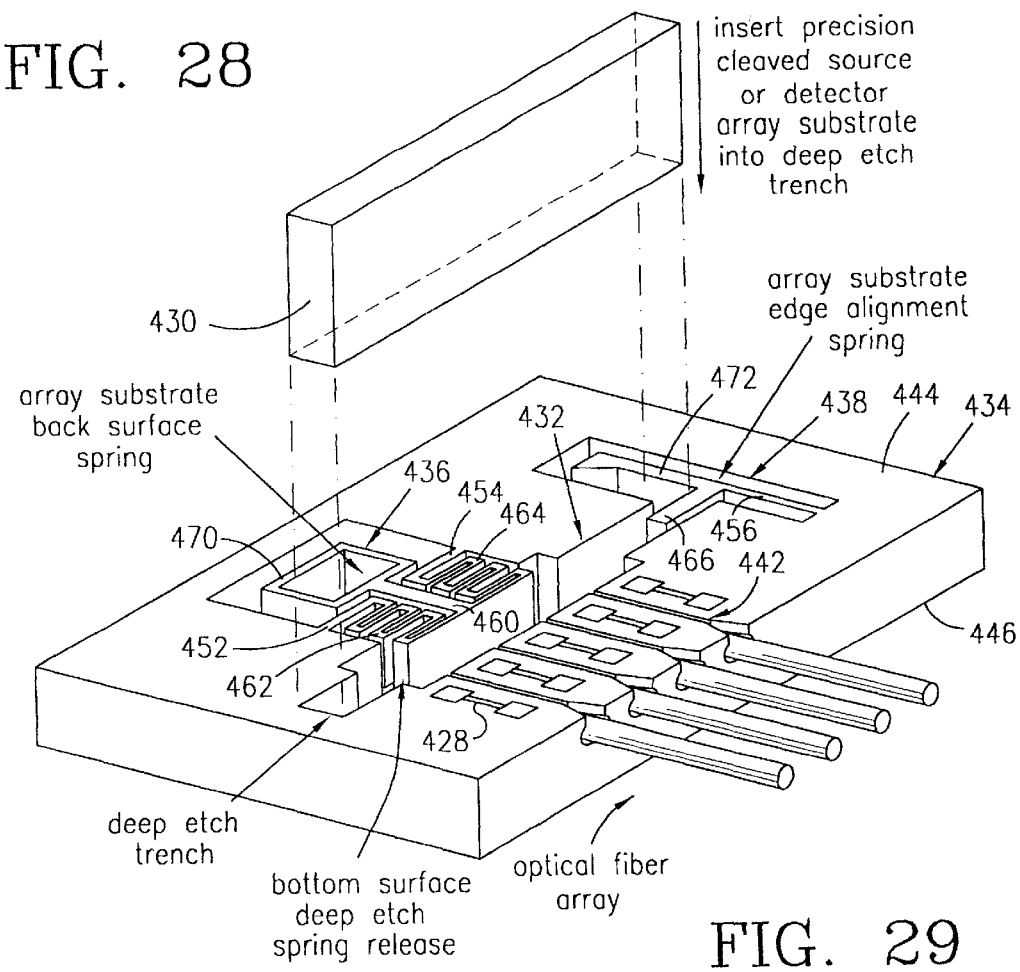
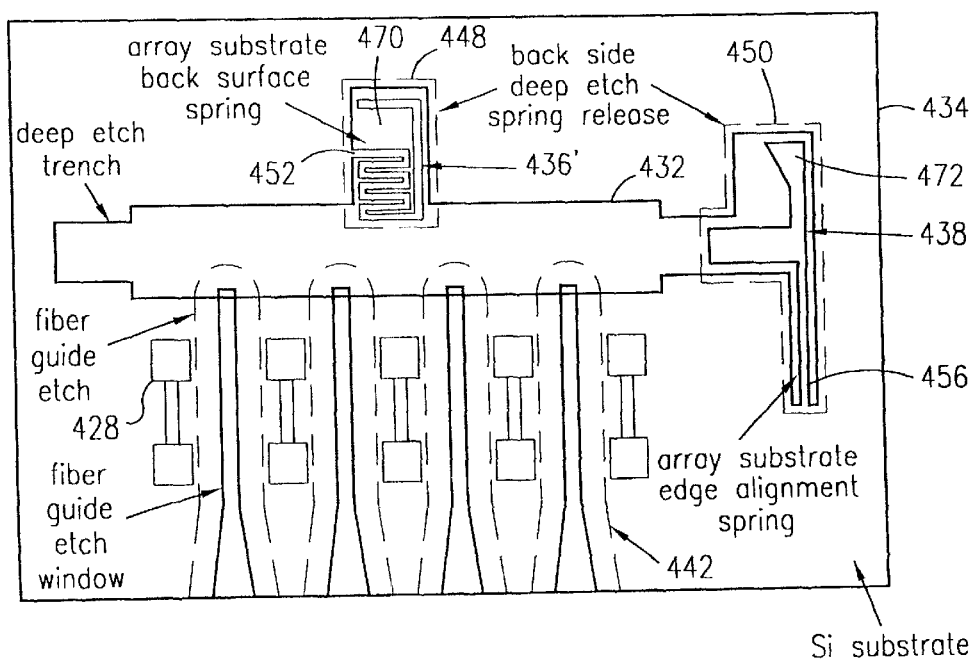

FIG. 40
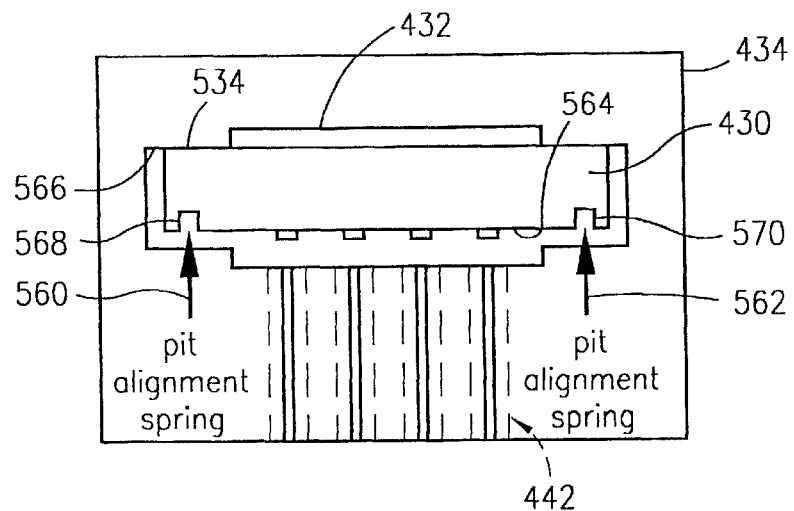
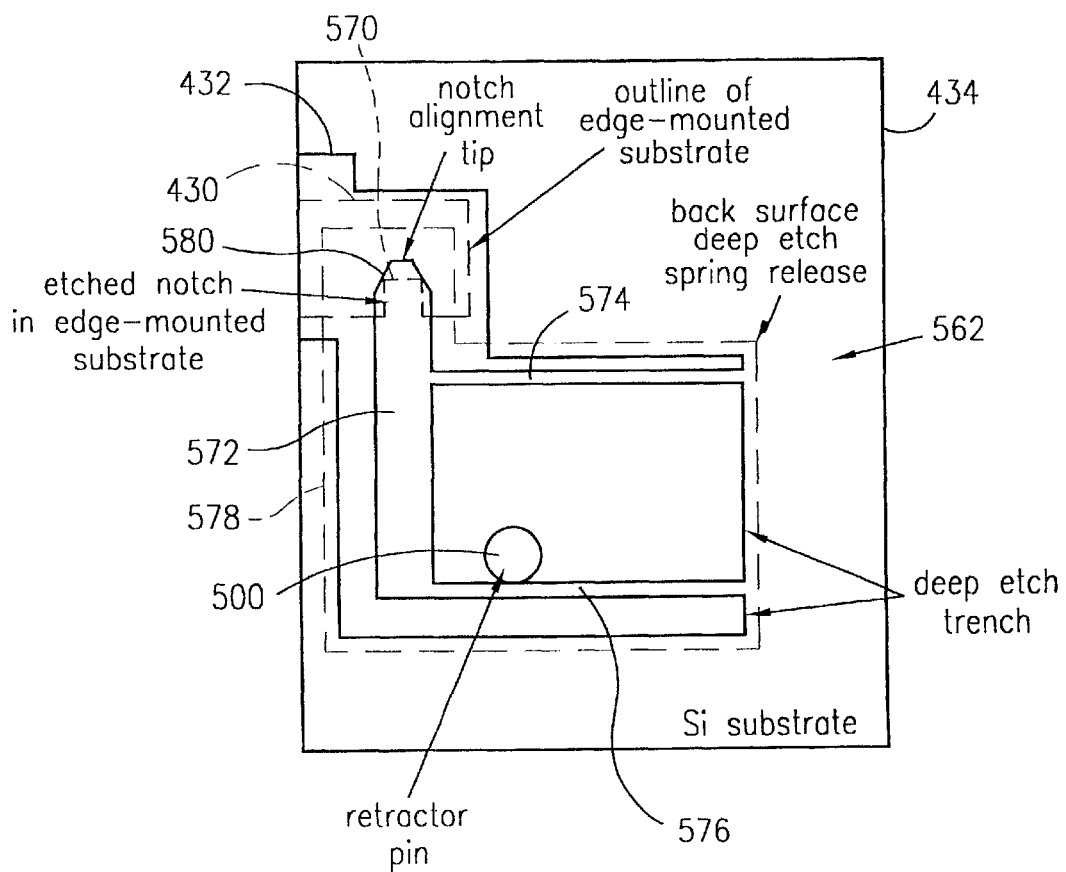
FIG. 41

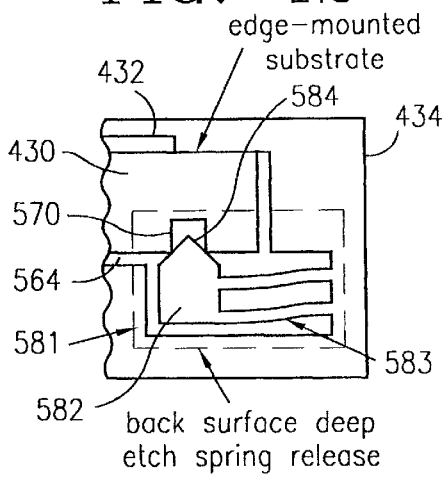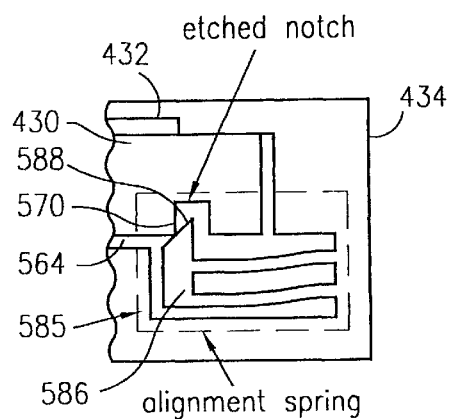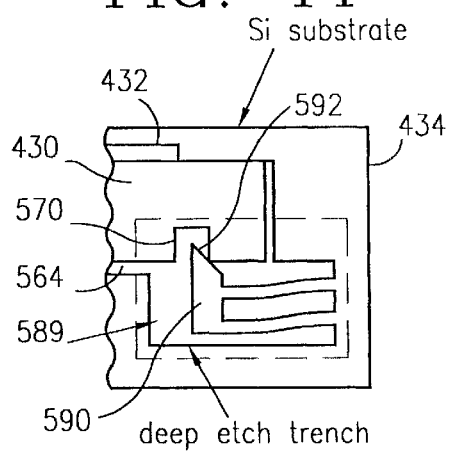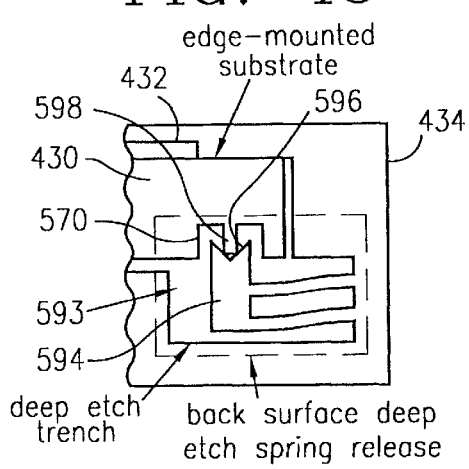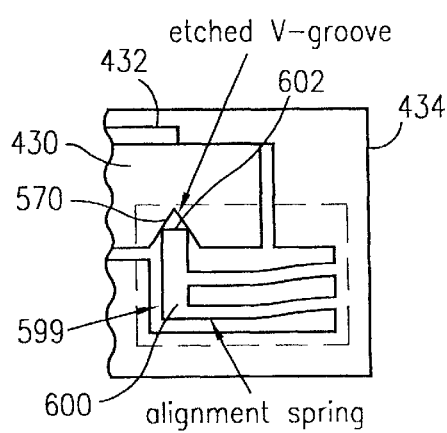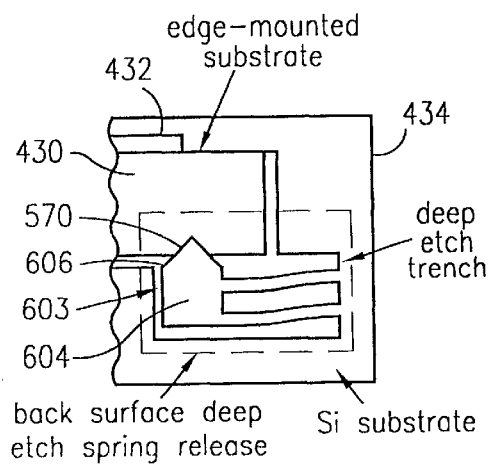

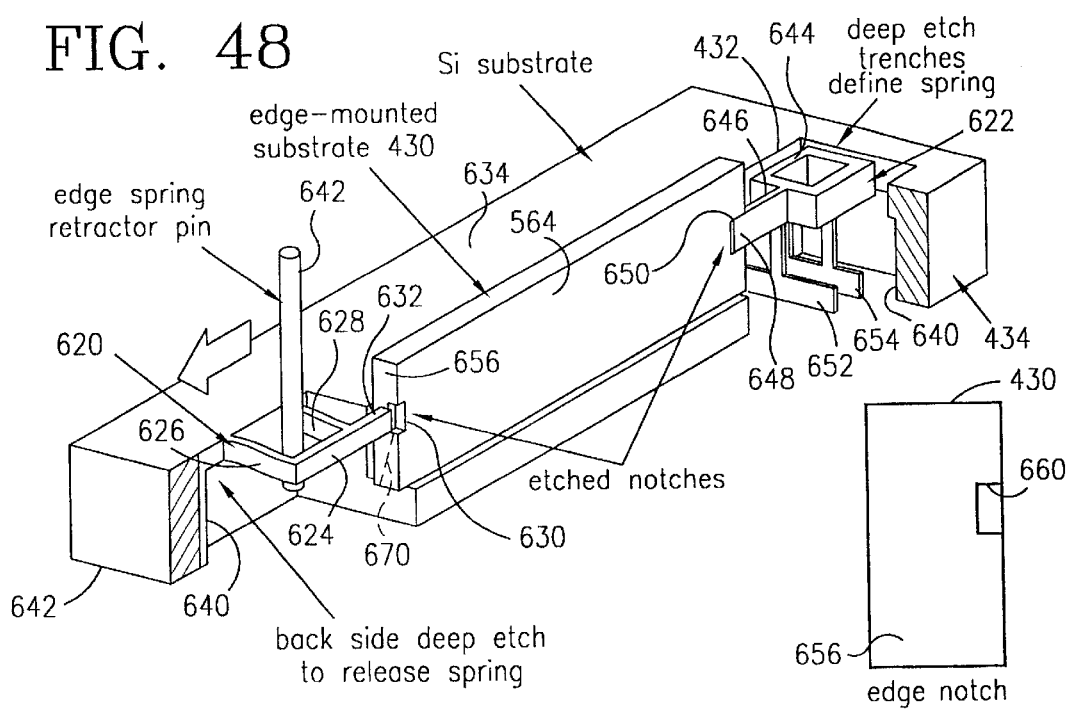
FIG. 48
FIG. 49 edge notch
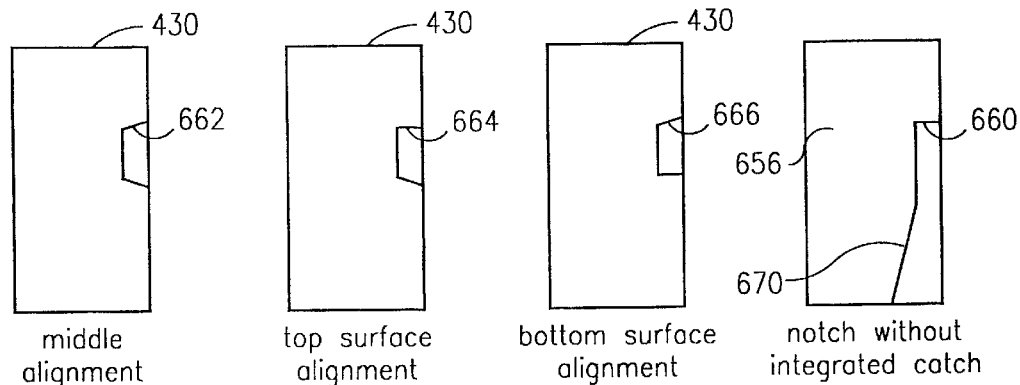
FIG. 50 middle alignment
FIG. 51 top surface alignment
FIG. 52 bottom surface alignment
FIG. 53 notch without integrated catch
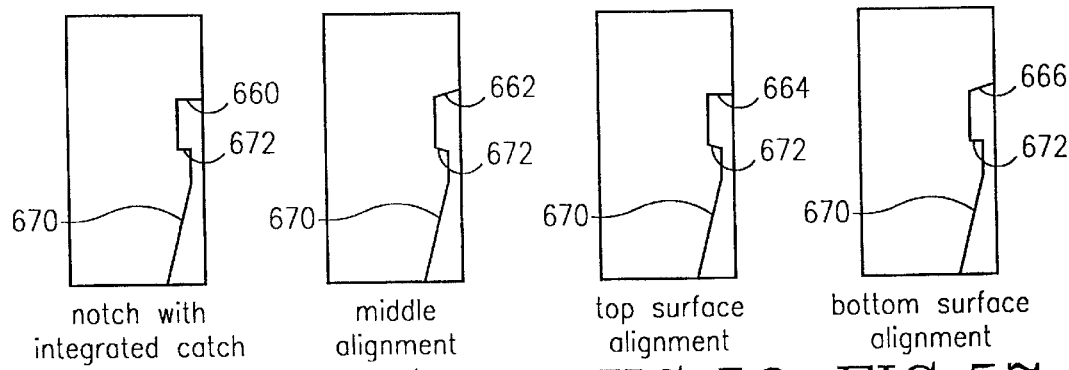
FIG. 54 notch with integrated catch
FIG. 55 middle alignment
FIG. 56 top surface alignment
FIG. 57 bottom surface alignment

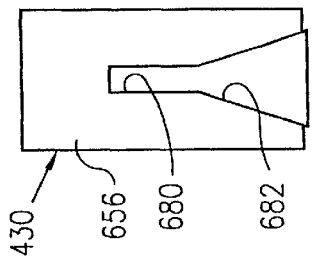
FIG. 58 simple alignment trench
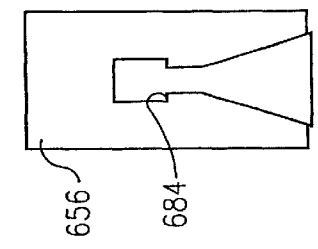
FIG. 59 alignment trench with catch
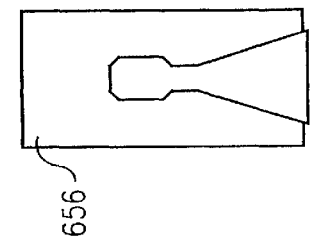
FIG. 60 middle alignment
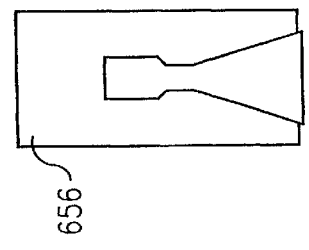
FIG. 61 top alignment
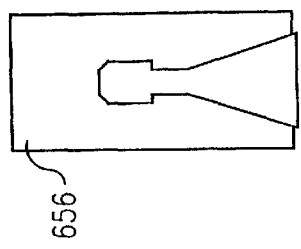
FIG. 62 bottom alignment
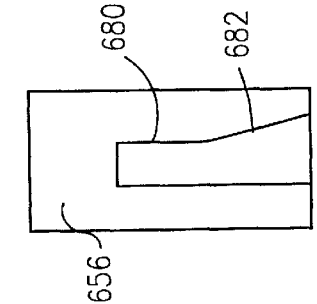
FIG. 63 trench without integrated catch
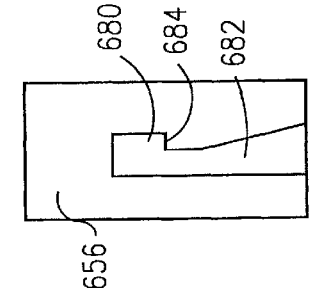
FIG. 64 trench with integrated catch
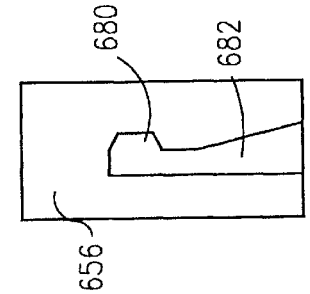
FIG. 65 middle alignment
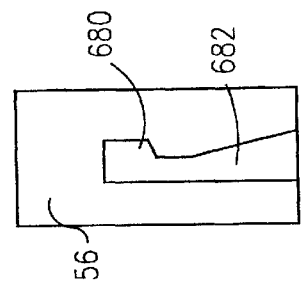
FIG. 66 top surface alignment
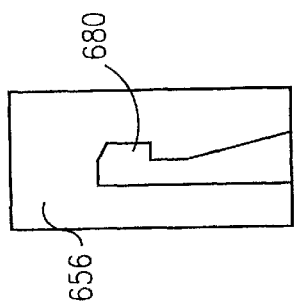
FIG. 67 bottom surface alignment

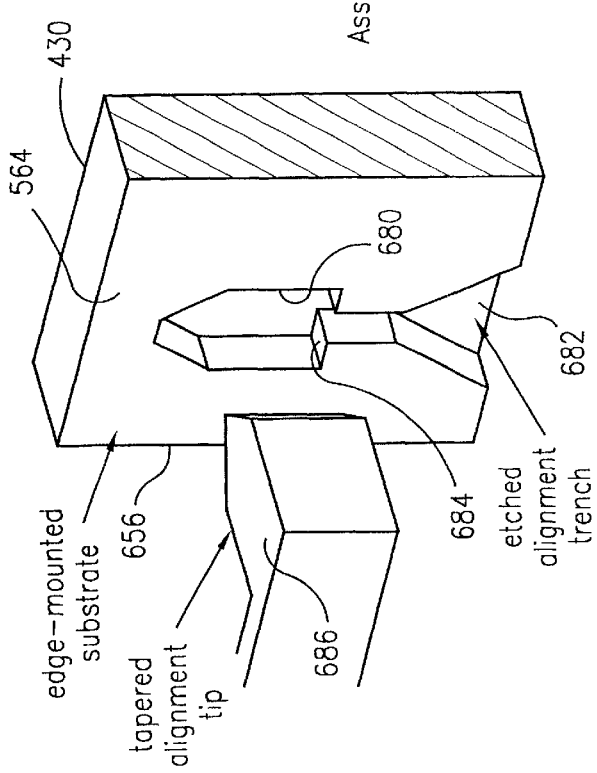
FIG. 68
Assembly of edge-mounted substrate using etched trenches and tapered alignment tip.
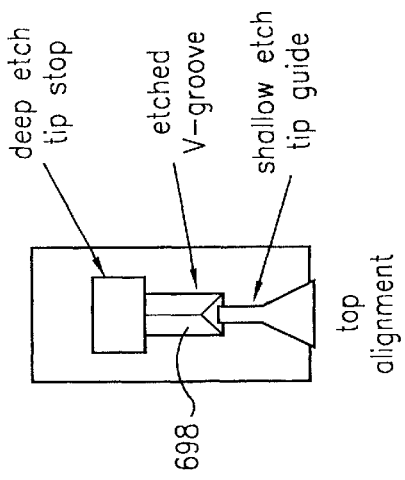
FIG. 72 top alignment
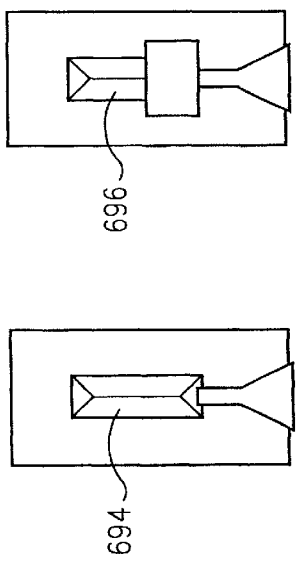
FIG. 71 bottom alignment
FIG. 70 middle alignment
FIG. 69

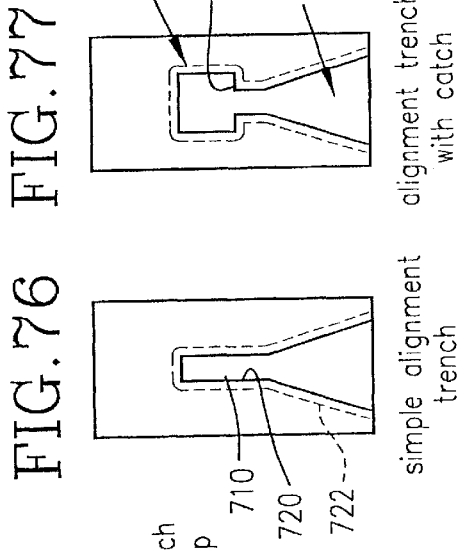
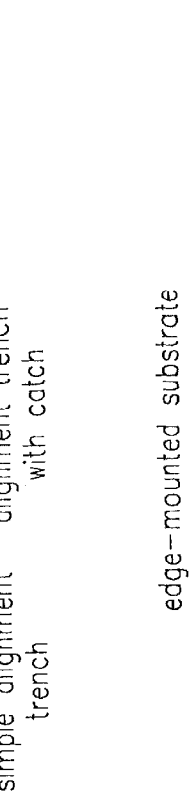
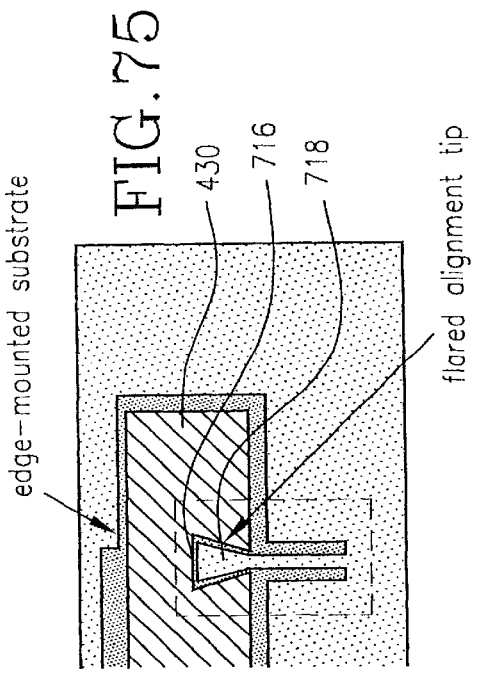
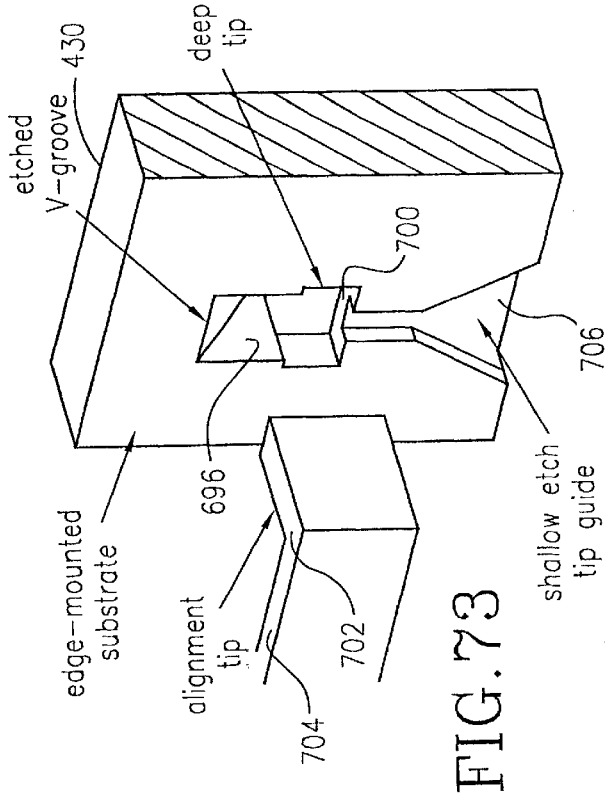
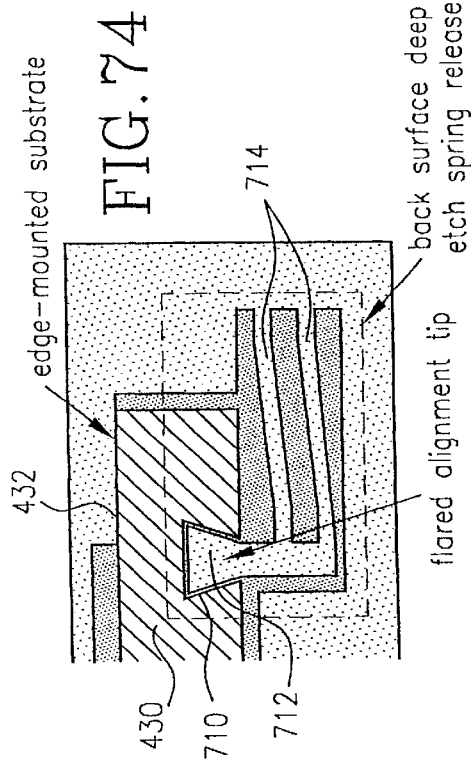

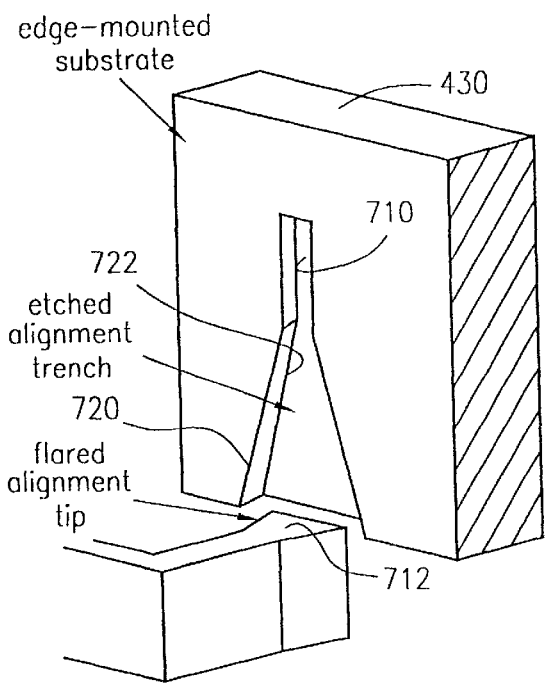
FIG.78
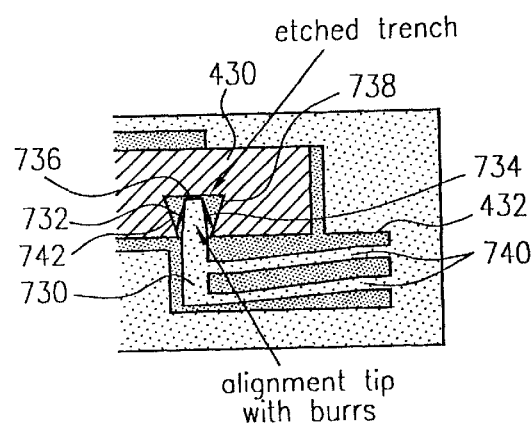
FIG.79
FIG.80
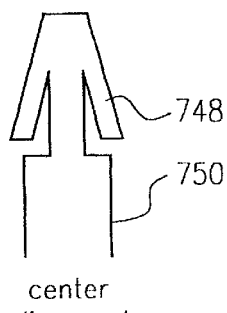
center alignment
FIG.82
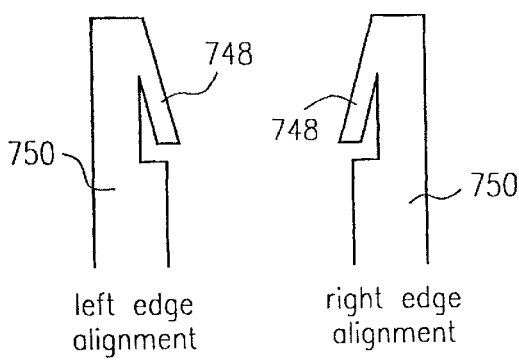
left edge alignment   right edge alignment
FIG.83    FIG.84
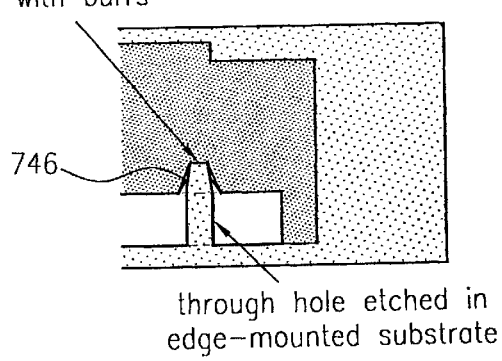
FIG.81

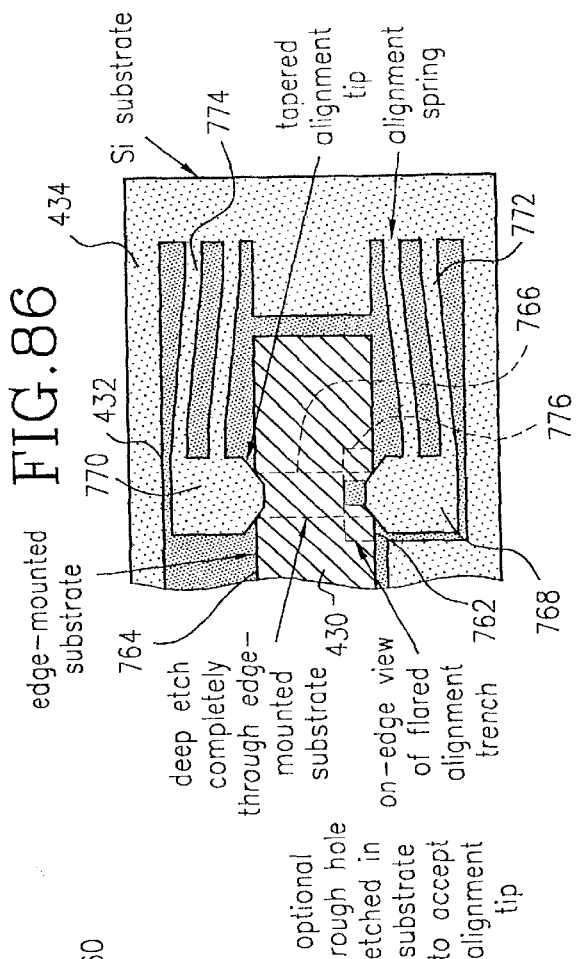
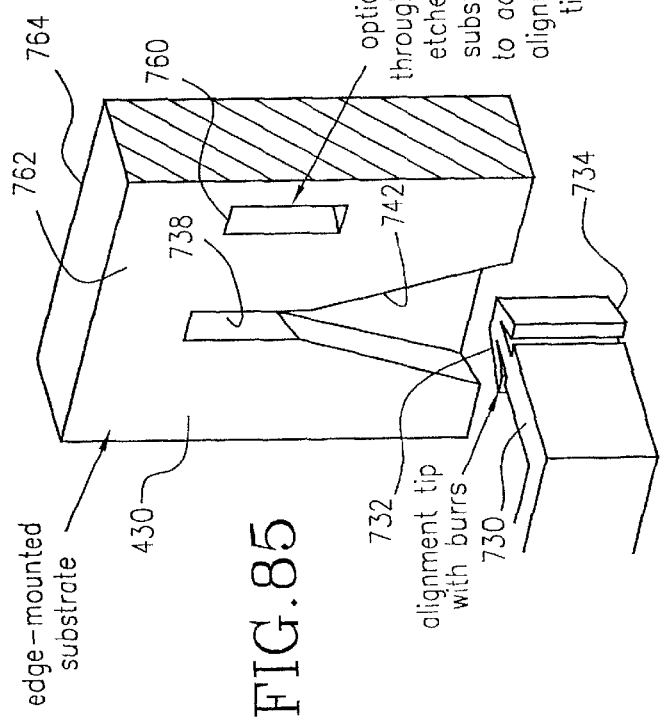
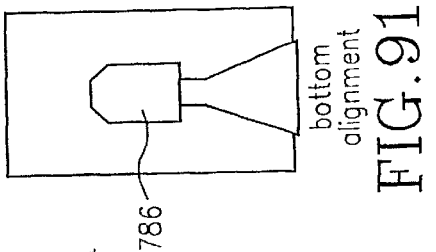
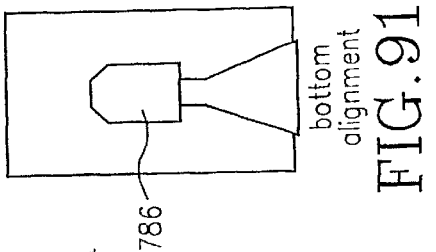
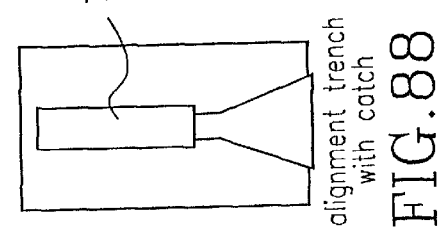
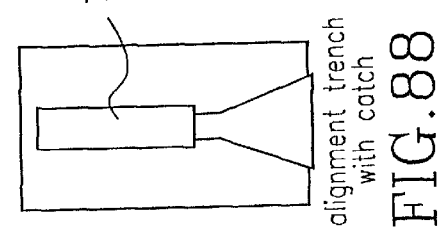

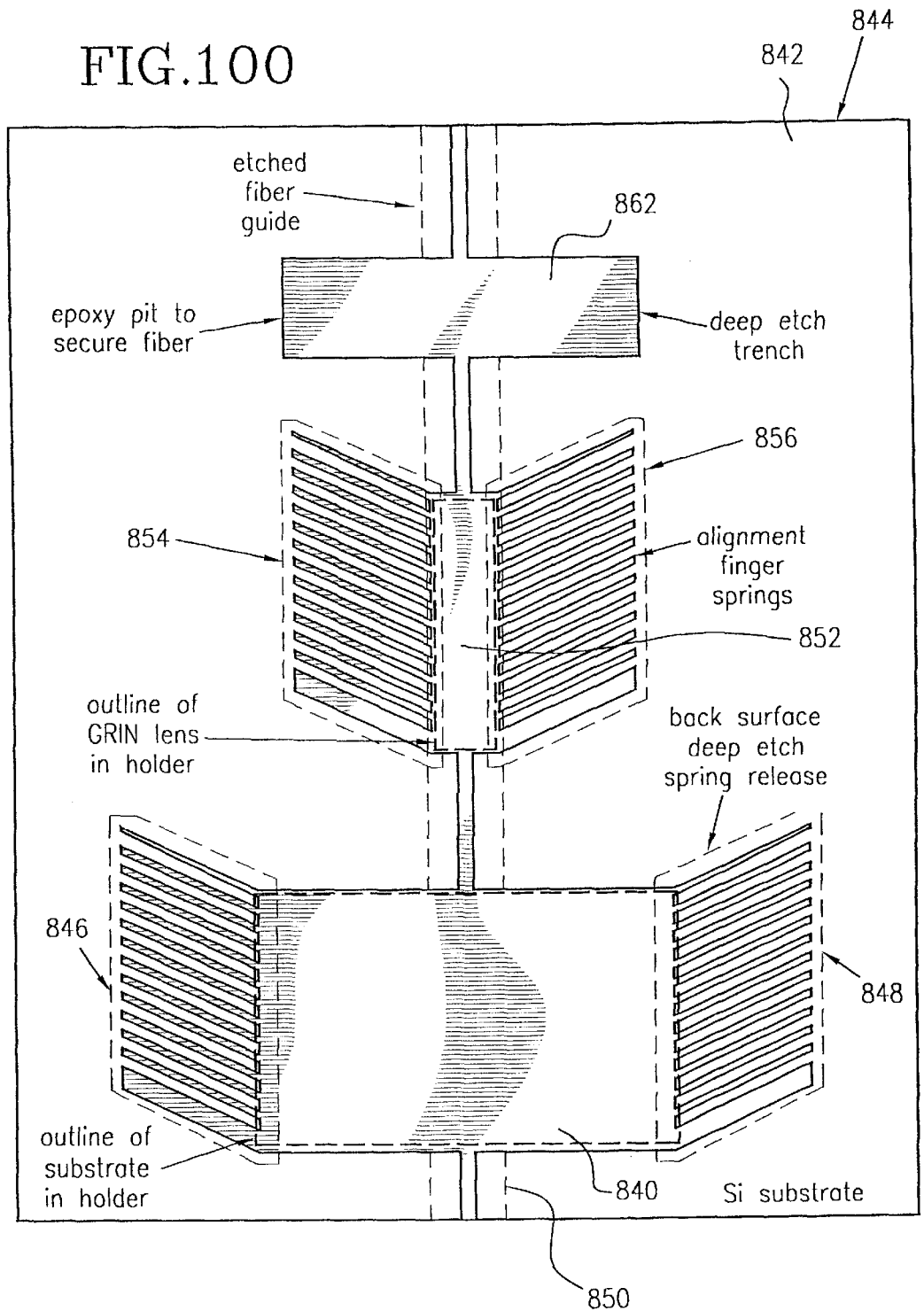

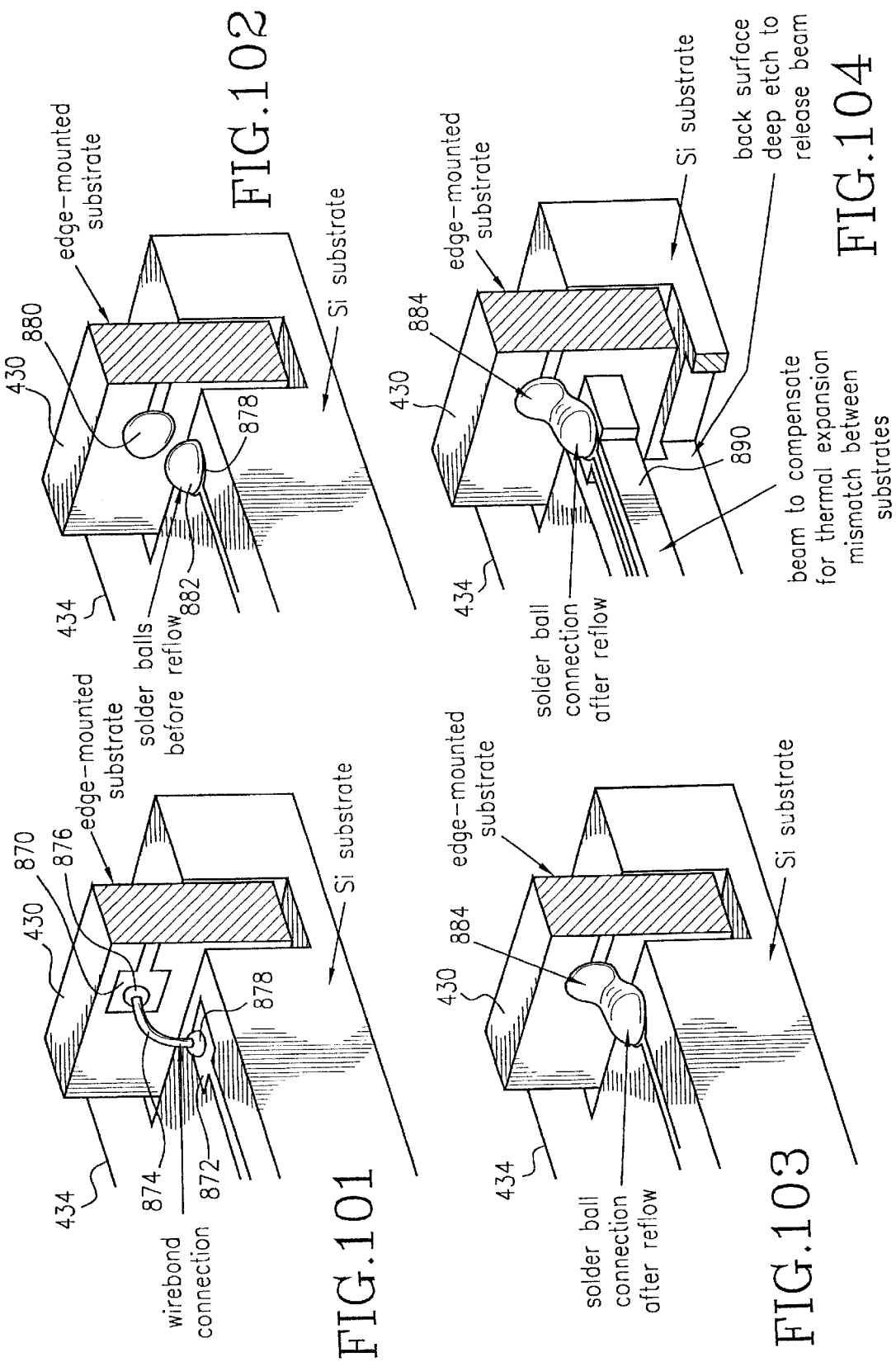

OPTOELECTRONIC PACKAGING

BACKGROUND OF THE INVENTION

The present invention relates, in general, to micron-scale optoelectronic devices, structures and techniques, and more particularly to devices and structures for facilitating the interaction of optical components such as optical fibers with other fibers and/or with circuit components such as wave guides or active elements such as light sources or light detectors on or connected to micromechanical structures.

Recent developments in micromechanics have successfully led to the fabrication of devices in single crystal substrates utilizing a dry etch process such as reactive ion etching (RIE) for producing micron-scale moveable mechanical structures. Such a process is described in U.S. Pat. No. 5,198,390 as utilizing multiple masks to define small, complex structural elements and related elements such as metal contacts in single-crystal silicon. U.S. Pat. No. 5,393,375 describes a similar process for releasing micromechanical structures in single-crystal materials other than silicon. An improved dry-etch process for the fabrication of microelectromechanical structures is described in U.S. Pat. No. 5,846,849, which discloses a single-mask, low temperature, self-aligned process wherein discrete devices can be made, and wherein such devices can be fabricated in wafers containing integrated circuits. The processes described in these patents may be used to produce a variety of sensor devices such as accelerometers, as well as a variety of actuator devices, resonators, moveable optical reflectors, and the like, either as separate, discrete devices or as components on previously-fabricated integrated circuits. The processes described in these patents may be referred to in general as the SCREAM (Single Crystal Reactive Etch and Metal) process, with the single mask process being referred to as the SCREAM-1 process.

As the field of micromechanical and microelectromechanical devices developed, a problem arose concerning the connection of ultra small components and structures formed on a wafer or substrate with other circuits and components on other wafers or substrates, whether of micron-scale or larger. One solution has been to fabricate solder pads on these devices for use in securing connecting lines or wires to the electrical components on the substrate. However, such a procedure requires precision wire bonding techniques which do not always produce satisfactory results. Furthermore, the use of wires for communication with microcircuits and related devices limits the flow of data between the circuits and devices.

On the other hand, optical fibers provide many advantages in data communication, but problems are encountered in connecting small diameter optical fibers to micromechanical devices such as waveguides and light detectors for transferring data to circuits carried by the substrate, as well as for transferring data from such circuits, as by way of laser light sources on the substrate. A major problem is that of alignment of fibers with each other, with microstructures such as waveguides and reflectors, with light sources such as vertical cavity surface emitting laser (VCSEL) arrays, and with electrical circuit components such as light detectors or the like.

The alignment of VCSEL arrays and detector arrays for direct coupling to optical fiber arrays is challenging, because the fibers must be mounted with their axes perpendicular to the light emitter or detector. The fiber support structure thus must be perpendicular to the detector or emitter, and the fabrication of micromechanical supports for this purpose is difficult.

Misalignment between fibers or between a fiber and a device or structure can occur in three translational directions and can occur around three rotational axes. Optical interconnections are most sensitive to lateral misalignment; that is, misalignment in directions perpendicular to the direction of propagation of light in the fiber, but the connections are also sensitive, to a lesser degree, to angular misalignment and to the axial distance between components in the direction of propagation. For single-mode optical systems such as those employed in telecommunications applications, lateral misalignment between optical components should be less than one micrometer, while for multimode systems, lateral misalignment tolerances are more relaxed; for example, up to about 5 micrometers. In both cases, axial separation tolerances are often greater by a factor 2–5, depending on the components involved. Single-mode interconnections typically can tolerate small angular misalignments; for example, less than 0.5 degree, depending on coupling efficiency requirements. In the case where columnated beams of light are coupled, where the beam waist is often 10–100 times the diameter of typical single-mode fiber beam profiles, angular misalignment of matching beams must be much smaller; for example, less than 0.01 degree. In all cases an accurate alignment is essential to effective, reliable communication.

Accordingly, there is a need for structures and devices for accurately, reliably and easily interconnecting optical fibers with each other, with micromechanical devices and structures and with light detectors and emitters.

SUMMARY OF THE INVENTION

Briefly, the present invention is directed to improved methods and apparatus for easily and accurately interconnecting small-diameter optical fibers in end-to-end axial alignment. The invention is further directed to micron-scale fabrication techniques and to passive optical components fabricated by such techniques for connecting such optical fibers to micromechanical and to microelectromechanical devices such as waveguides and for optically coupling such fibers to electrical circuits by way of active optical elements such as light detectors and laser sources.

The packaging of optical fibers with micromechanical and microelectromechanical devices is carried out, in a first embodiment, by mechanical couplers for connecting optical fibers in end-to-end alignment so as to obtain a maximum transfer of laser light energy or the data carried by such light energy from one optical fiber to another. Such couplers may be used to interconnect a single pair of fibers, or may be used to connect an array of optical fiber pairs, with the couplers providing easy and accurate assembly.

In another embodiment of the invention, an optical coupler interconnects one or more optical fibers with mechanical or electrical components carried by a substrate. The electrical components may be active elements such as light sources or light sensors, for example, which to are electrically connected to corresponding circuit components such as integrated circuits carried by the substrate. Such a coupler may incorporate trenches for receiving and holding optical fibers in alignment with suitable waveguides or reflectors for directing light carried by the optical fibers to corresponding detectors or sensors. In another alternative, the circuits or components on the substrate may consist of light sources such as a solid state lasers which generate light in response to signals from electrical circuits on the substrate, with the light produced by the lasers being directed into the optical fibers by way of the waveguides or reflectors.

In a preferred form of the invention, alignment of optical fibers with active optical components such as optoelectric detectors or laser light sources is attained by securing the optical fiber or fibers in a first substrate, which will be referred to herein as a coupler block. A second substrate, which will be referred to herein as a substrate or a wafer, and which contains the light detectors or light sources, is secured to the coupler block. The substrate may be mounted on or above, and parallel to, the surface of the coupler block, with its active optical components (light detectors or light sources) positioned in alignment with corresponding fibers. Alternatively, the wafer may be edge-mounted on or in the coupler block, as in a trench formed in the coupler block, or may be mounted on an edge of the coupler block. In order to ensure alignment of the detectors and light sources with the optical fibers, the trench for receiving the substrate must be precisely shaped and accurately located, and the substrate must be held firmly in place. In accordance with the invention, various mounting devices, including fasteners, springs, and the like, are provided to align the substrate with the optical fibers in the coupler block and to secure it in place.

In the preferred form of the invention, the various mounting devices consist of micromechanical structures fabricated in the connector block, which preferably is a single to crystal silicon substrate. The mounting structures are unitary with the connector block, and are fabricated by one of the SCREAM micromachining processes described above so that all of the trenches, connectors, fasteners, springs, waveguides, reflectors, and like structures which make up the connector block of the invention are fabricated in a single process.

The SCREAM-1 process utilizes a single crystal substrate of a material such as silicon, gallium arsenide, silicon germanium, indium phosphide, compound and complex structures such as aluminum-gallium, arsenide-gallium-arsenide, and other quantum well or multi-layer super lattice semiconductor materials in which moveable, released structural elements electrically isolated from surrounding substrate materials and metallized for selective electrical connections can be fabricated using a single mask. The structures fabricated by the SCREAM processes can be discrete; i.e., can be fabricated in a substrate or wafer formed from any of the aforementioned substrate materials. The processes allow structures to be fabricated in silicon wafers containing integrated circuits, since the SCREAM processes use a low temperature dry etch procedure.

Complex shapes can be fabricated by the SCREAM processes, as illustrated in the '849 patent, including triangular and rectangular structures, as well as curved structures such as circles, ellipses and parabolas for use in the fabrication of fixed and variable inductors, transformers, capacitors, switches and the like. Released, cantilevered structures can be fabricated by this process for motion along x and y axes in the plane of the substrate, along a z axis perpendicular to the plane of the substrate, and for torsional motion out of the plane of the substrate.

The SCREAM processes in a single crystal substrate permit formation of deep, narrow trenches which may be located and oriented as desired, and which can be used to define isolated and released structures and to produce high aspect ratio structures. In addition, the processes permit deep lateral etching extending below any structures which are to be released, and can be used to produce extended cavities in the sidewalls of mesas adjacent trenches or surrounding released structures. The released structures can include single or multiple fingers cantilevered to side walls of the substrate and extending outwardly over a trench bottom wall, as well as various grids and arrays, and various electrical components. The various structures may be referred to herein as "beams" or as "released beams".

In accordance with the SCREAM-1 process, a dielectric mask layer of oxide or nitride is deposited on the top surface of a wafer or substrate, using a standard PECVD process. Preferably, the substrate is single crystal silicon, with the dielectric layer serving as a mask throughout the remainder of the steps. The standard PECVD process is used because of its high deposition rate and low deposition temperature. Thereafter, a resist layer is spun onto the mask layer, and standard photolithographic resist techniques are used to produce in the resist layer a pattern which defines the desired micromechanical structure. The pattern in the resist is then transferred to the mask dielectric layer using, for example, $CHF_3$ magnetron ion etching (MIE) or RIE. An $O_2$ plasma etch may be used to strip the resist layer, and a deep vertical reactive ion etch (RIE) or a chemically assisted ion beam etch (CIAB) is used to transfer the pattern from the dielectric mask into the underlying wafer to form trenches which define, in top plan view, the outline of the desired structures, with the trenches being from 4 to 20 micrometers deep and having substantially smooth, vertical walls.

After completion of the trenches, a protective conformal layer of PECVD oxide or nitride is applied to cover the silicon structures to a thickness of about 0.3 micrometers, for example. The conformal dielectric layer covers the top surfaces of the substrate as well as the sides and bottom walls of the trenches. Thereafter, the conformed dielectric layer is removed from the trench bottom wall, as by an anisotropic RIE which removes the previously applied 0.3 micrometers of dielectric from the substrate top surfaces and from the trench bottom, leaving the trench side wall coatings undisturbed. As a result, the substrate is left with a top surface and side wall layer of dielectric, with the bottoms of the trenches being free of dielectric.

A deep RIE or CAIBE is used to etch the floor of each trench down below the lower edge of the side wall dielectric to thereby expose the substrate material below the dielectric on each side of the trench. An isotropic RIE is then used to etch the substrate material laterally under the dielectric layer on the side walls to form cavities. If the trenches define beams or other narrow structures, the lateral etching may extend completely under the beams or narrow structures to release them, while cavities will be formed under other fixed (nonreleased) structures, which may be referred to as mesas. The etch chemistry has high selectivity to the dielectric, allowing several microns of substrate to be etched without appreciably affecting the protective dielectric coating. Released beams are thus cantilevered over the bottom wall of the deep silicon trench, with the cantilevered structures having a core of semiconductor material and a conformal coating of dielectric on their top surfaces and side walls. If desired, a metal layer may be deposited onto the structure, as described in U.S. Pat. No. 5,846,849.

The SCREAM-1 process permits fabrication of high aspect ratio microstructures with precise geometries, is compatible with existing semiconductor fabrication techniques, and is preferred, although other bulk micromachining processes can be used.

In its simplest form, the optical coupler block of the invention connects a pair of optical fibers in an end to end relationship. The coupler block is fabricated by a micromachining process such as the SCREAM-1 process to etch a trench, or fiber guide, across a silicon substrate or wafer to define the location of the two fibers. The fiber guide is flared where it meets opposite edges of the block to create tapered receptacles which receive the ends of the optical fibers to be aligned and direct them into the fiber guide. The guide dimensions are selected to firmly receive the optical fiber so that when one fiber is inserted into the guide from each end, the fibers will be aligned at the center of the guide where they abut. If desired, a precision stop can be etched into the guide to control the distance that each fiber travels when being inserted, and a multiplicity of such guides may be formed in the coupler block to allow alignment of multiple pairs of fibers. The coupler block may be fabricated from a stand-alone substrate, or may be fabricated by micromachining it in a larger substrate; for example, to form the coupler block in a cavity in the substrate surface.

In another embodiment of the invention, instead of aligning fiber pairs, the optical coupler block is modified to couple optical fibers to passive optical components such as waveguides, reflectors, or the like, or to active electrooptical components such as light sources or light detectors. In this case, a fiber guide is formed so that it extends from a flared receptacle at the edge of a substrate into a corresponding cavity having a vertical wall where the guide terminates. In one form of the invention, the cavity is fabricated to incorporate a sloped reflective wall aligned with the optical fiber guide so that light entering the cavity from an optical fiber in the guide will be reflected upwardly towards an opening on the surface of the substrate. The coupler block may support a separate, surface-mounted substrate or wafer carrying an optically active element such as light detector which may be aligned with the upwardly opening reflector in the cavity so that the optical fiber is in communication with the active element. The separate wafer may contain, or may be connected to, external circuitry or may be connected to circuitry on the coupler block itself. Alternatively, or in addition, the optically active element on the separate wafer may be a surface emitting laser which emits light into the cavity when the wafer is mounted on the coupler substrate, with the laser light then being reflected toward the corresponding optical fiber guide.

In other embodiments, the wafer may be mounted on an end of the coupler block, with one or more optical fibers extending across the coupler for alignment with corresponding detectors or surface emitting lasers on the end-mounted wafer. Further, instead of incorporating a reflector, the cavity in the coupler may comprise a waveguide for coupling light from an optical fiber to detectors or to other optical components on a substrate, or on the coupler block itself.

In a preferred form of the invention, optical fibers are coupled to active optical elements on a substrate by edge-mounting the substrate in the coupler block so that the axes of the fibers are perpendicular to the substrate surface on which the active elements are mounted. This ensures that the light from the fibers will strike the surfaces of the corresponding active elements at right angles, or the light from such elements will be parallel to the axes of the corresponding fibers, for maximum efficiency. Careful, precise alignment of a substrate carrying optical elements in or on the coupler block is critical to assuring reliable optical coupling between the optical elements and an optical fiber, and accordingly a variety of alignment techniques have been devised, in accordance with the invention. Exemplary techniques and structures for ensuring accurate alignment of edge-mounted substrates include precision etching (i.e, within plus or minus 1 or 2 micrometers) of a deep cavity or trench having the dimensions required to accurately position an edge-mounted wafer in the coupler block. The wafer is positioned in the trench with its surface perpendicular to the fibers and with the active elements aligned with corresponding fibers. Once positioned it may be bonded in place, but it has been found that thermal expansion can cause undue stresses in the microstructures, resulting in deformations which adversely affect optical coupling. Preferably, therefore, the wafer is aligned and secured within the trench by microsprings fabricated when the trench is formed. The springs may be provided with tabs or rings to permit retraction for release of the wafer, but operate to firmly hold the wafer in a selected position for alignment while accommodating changes in dimensions due to temperature variations. The present invention contemplates a wide variety of alignment springs, including edge springs, corner springs and keyed springs.

Alignment can be further assured by the provision of notches, pits or depressions formed on the wafer for receiving and locating the alignment springs, and such notches may be tapered or nontapered to receive corresponding pins or tips fabricated in the connector substrate. If desired, alignment, grooves or trenches can be located on the wafer to guide the alignment springs into corresponding notches and the tips of the alignment springs may be tapered, flared or burred to hold them in place. Vertical alignment of the wafer may be provided by suitable stops or shoulders formed in the etched trench to engage corresponding notches on the wafer. These techniques can be used to align one or more wafers in the coupler substrate, as required.

In order to connect the electrical components carried by the wafer to external circuits, various wire bonding techniques may be utilized, or conventional solder ball interconnections may be used. Thermal stress relief may be provided by mounting the connections on flexible spring-beams, if desired, or the connection can be provided by means of a metallized spring tip engaging a contact pad on the wafer.

The foregoing fabrication and mounting techniques provide a compact electrooptical connector package in which optical fibers are accurately and reliably aligned with other fibers or electrooptical components carried by a wafer, and to structures wherein optical components are electrically connectable to corresponding circuits carried by the coupler substrate or other wafers. Angular and lateral alignment of optical fibers is carried out during the lithographic patterning steps, in accordance with the invention, so that various components are effectively self-aligned to a high degree of accuracy. Further, alignment structures such as tips, notches, fiber guides, and the like, are designed to compensate for variations in etching by providing symmetrical designs. As a result, when both sides of an alignment structure etch at the same rate, the remaining portion is automatically aligned with a lithographically-determined reference.

BRIEF DESCRIPTION OF THE DRAWINGS

The foregoing, and additional objects, features and advantages of the present invention will become apparent to those of skill in the art from the following detailed description of preferred embodiments thereof, taken in conjunction with the accompanying drawings, in which;

FIG. 28 is a diagrammatic, exploded perspective view of a coupler and substrate, illustrating examples of rear and edge alignment springs;

FIG. 29 is a diagrammatic top plan view of the coupler of FIG. 28 with the edge-mounted substrate removed;

FIG. 40 is a diagrammatic top plan view of a modification of the coupler of FIG. 26, incorporating front surface alignment springs engaging front surface notches;

FIG. 41 is a diagrammatic top plan view of an alignment spring for use with the coupler of FIG. 40;

FIGS. 42–47 illustrate in diagrammatic top plan views a variety of alignment tips for use with front surface alignment notches for the coupler of FIG. 40;

FIG. 48 is a diagrammatic perspective view of edge alignment springs for the coupler of FIG. 31, incorporating edge springs engaging notches in the front edges of an edge-mounted substrate;

FIGS. 49–57 illustrate in diagrammatic front elevation views a variety of notch configurations for the edge-mounted substrate of FIG. 48;

FIGS. 58–67 illustrate variations in the etched alignment notches which are centered on an end wall of a substrate or on a front surface of the substrate for use with the embodiments of FIGS. 27 and 40, respectively;

FIG. 68 is a partial perspective view of a modified etched alignment trench centered on an end or on a front surface of an edge-mounted substrate incorporating a notch for receiving a tapered alignment tip;

FIGS. 69–72 illustrate modified forms of the alignment trench of FIG. 68;

FIG. 73 illustrates in perspective view another modification of the alignment trench of FIG. 68, utilizing a square-ended alignment tip and using etched V-grooves;

FIGS. 74–75 illustrate additional modifications of the alignment trench of FIG. 68 for receiving outwardly flared alignment tips;

FIGS. 76 and 77 illustrate in elevation view the shape of the alignment trench of FIG. 74 to and a modification thereof, respectively;

FIG. 78 is a diagrammatic perspective view of the flared alignment tip and corresponding alignment trench of FIG. 74;

FIGS. 79–81 illustrate the use of alignment tips with burrs for the front surface alignment notches of FIG. 40 and modifications thereof;

FIGS. 82–84 illustrate variations of the burred alignment tips utilized in FIGS. 79–81;

FIG. 85 illustrates in perspective view the alignment tip and corresponding notch for the edge-mounted substrate of FIG. 80;

FIG. 86 illustrates in diagrammatic top plan view a substrate having a through hole for receiving front and rear surface alignment tips;

FIGS. 87–91 illustrate through holes of various shapes and dimensions combined with alignment trenches of the type illustrated with the substrate of FIG. 58;

FIG. 100 is a modified form of the optical coupler of FIG. 99; and

FIGS. 101–106 illustrate various structures for providing electrical interconnections between an optical coupler and an edge-mounted substrate.

DESCRIPTION OF PREFERRED EMBODIMENTS

Figure 1:
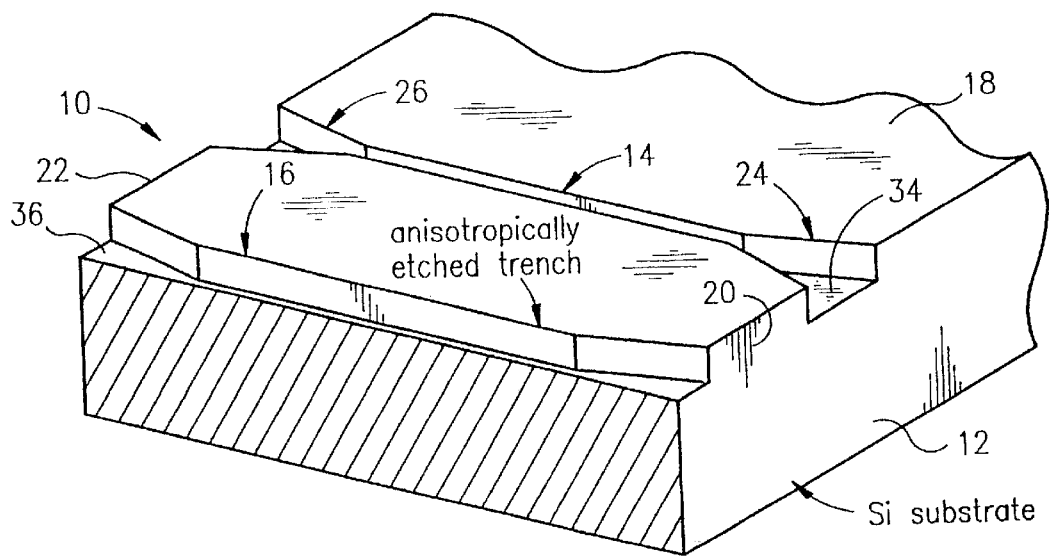
FIG. 1 illustrates in a perspective, cross-sectional view an optical coupler block incorporating etched trenches which define the locations of optical fiber guides.
Figure 2:
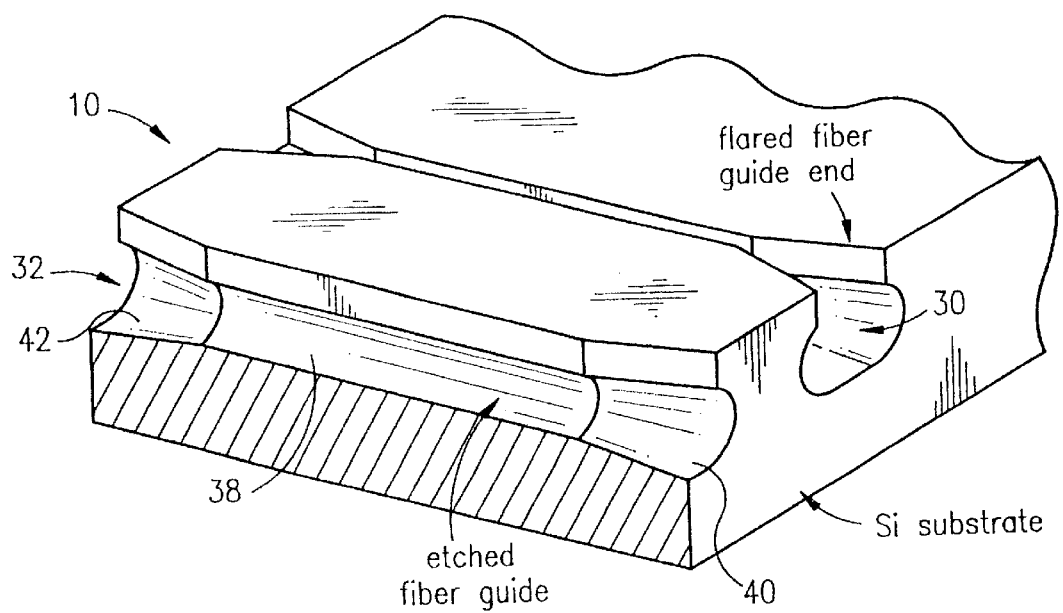
FIG. 2 illustrates the structure of FIG. 1 with the trenches completed to form a fiber-to-fiber optical coupler block in accordance with the invention.

Turning now to a more detailed consideration of the present invention, FIGS. 1 and 2 illustrate steps in the fabrication of an optical coupler generally indicated at 10, for providing end-to-end alignment of pairs of optical fibers. In the preferred form of the invention, the coupler is fabricated from a substrate, or block, 12 of a suitable material such as single crystal silicon. One or more trenches, such as the trenches 14 and 16, are first formed on the top surface 18 of block 12, using, for example, the SCREAM process described above. Thus, the trenches are anisotropically etched across the top surface of the substrate block 12 to define the locations of fiber guides which are to be formed. The trenches preferably extend completely across the top of the substrate 12, from side wall 20 to side wall 22, with the trenches being flared as indicated at 24 and 26 where they meet the sidewalls of the substrate. The flared trenches permit formation of flared fiber guide ends in the next step of the process.

It will be understood that a single trench may be provided to permit end-to-end alignment of a single pair of optical fibers, or multiple trenches can be provided to permit alignment of an array of optical fiber pairs. For simplicity, the trenches preferably are parallel to each other across the coupler block 12, but other alignments are possible, if desired, since the use of a single crystal material for the substrate 12 permits formation of the trenches without regard to the crystal structure.

Although not illustrated in the Figure, the side walls of the trenches 14, 16 are covered with a protective layer of oxide so that, as indicated in FIG. 2, fiber guides 30 and 32 can be fabricated by isotropically etching away the bottoms 34 and 36, respectively, of trenches 14 and 16. The dimensions of the resulting guides 30 and 32 are determined by the width and depth of the anisotropically etched trenches 14 and 16, by the reactive ion etch time, by the plasma potential used in the etch process, by gas flow and chemistry, as well as other parameters known from the SCREAM-1 process. Since typical optical fibers have an outer diameter of about 125 micrometers, the etch parameters and resulting trench structure dimensions are selected to create fiber guides 30 and 32 having corresponding compatible dimensions. Thus, for example, the center portion 38 of each fiber guide would have a diameter equal to or slightly larger than the diameter of the optical fibers which it is to receive, while the guides would have flared end portions 40 and 42 large enough to facilitate insertion of the fibers into the coupler.

Figure 3:
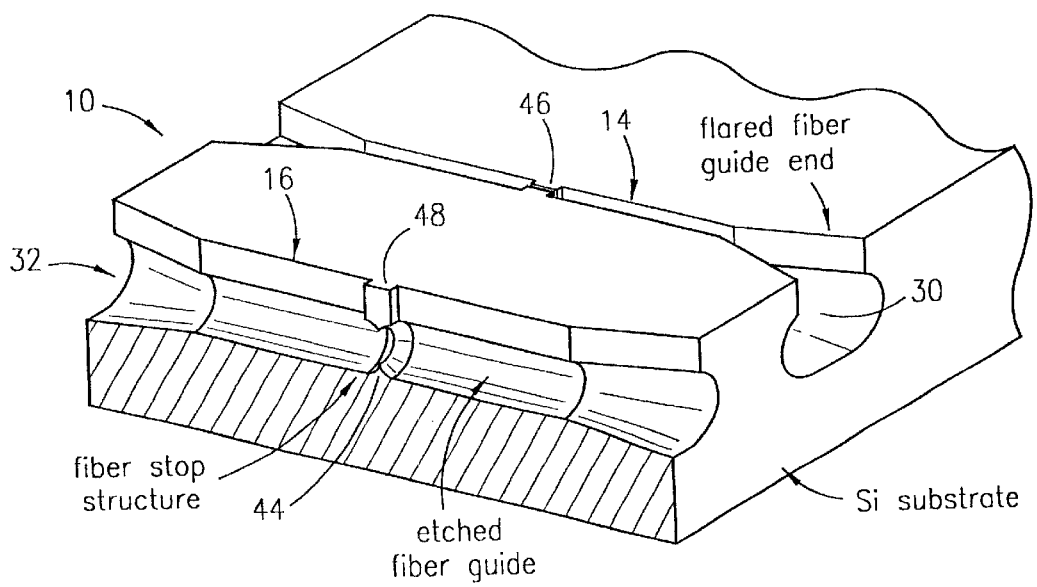
FIG. 3 illustrates a modified optical coupler block wherein fiber guides include integrated fiber stops.

If desired, a fiber stop structure 44 can be fabricated in each of the fiber guides 30 and 32, as illustrated in FIG. 3. These are fabricated by shaping the trenches 14 and 16 to incorporate narrowed regions 46 and 48 to restrict the etching and to thereby produce the ring 44 of unetched material. This ring 44 reduces the diameter of the fiber guide and acts as a precision stop for inserted fibers.

In operation, two fibers of a pair of optical fibers which are to be aligned in end-to-end relationship are inserted into a fiber guide, such as the guide 32, from opposite ends and are pushed into the guide until they reach opposite sides of the fiber stop structure 44. The two optical fibers are thereby coaxially aligned with the guide 32 and with each other, and thus are aligned for transfer of light from one fiber to the other with minimal loss. In this simplest form of the invention, the optical coupler aligns pairs of fibers coaxially in end-to end relationship. It will be apparent that the fibers may be secured in the guides by providing a close tolerance between the diameters of the fibers and the guide, or they may be secured in place by an adhesive or other fastener, as required.

Figure 4:
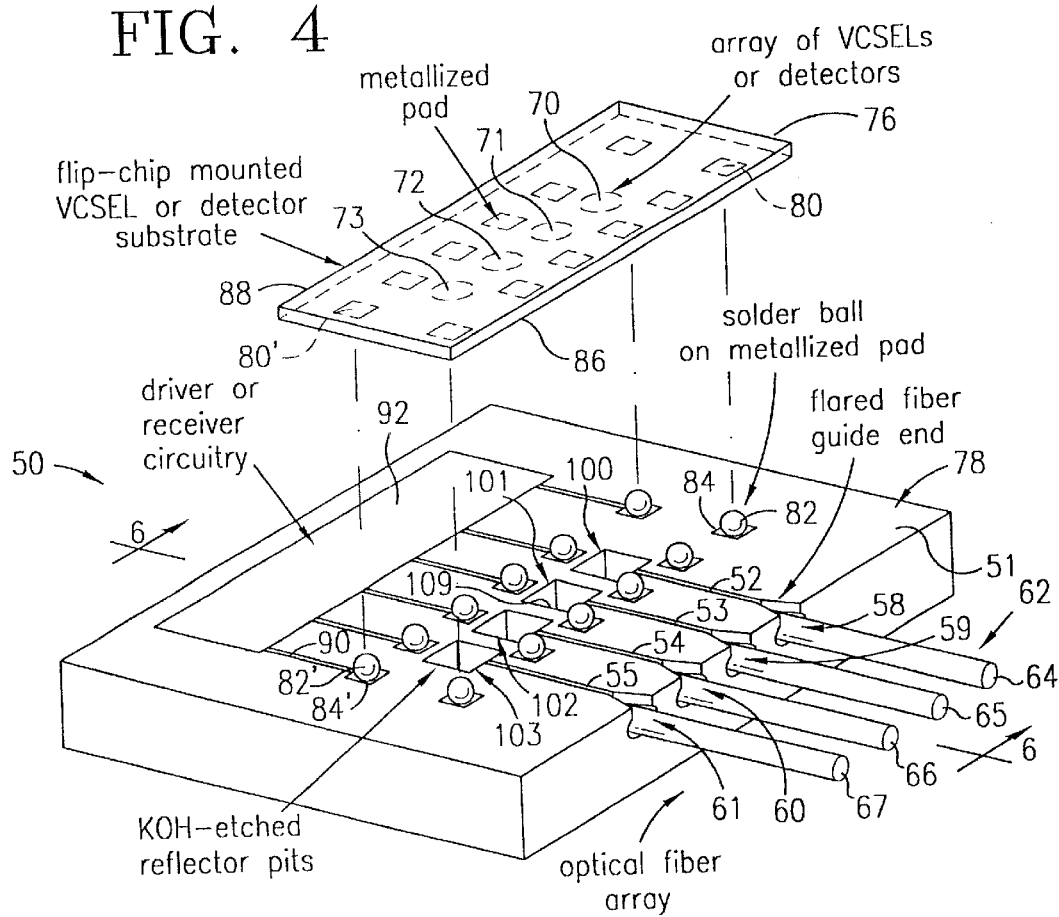
FIG. 4 is an exploded perspective view of an optical coupler block and a surface-mounted substrate which is parallel to a top surface of the coupler; the coupler block aligning optical fibers with corresponding active optical devices on the substrate.

The coupler of the present invention may be modified to secure and align optical fibers not only with other fibers, but also with external structures or components which may be mounted on or secured to the coupler. Thus, for example, FIG. 4 illustrates a modified optical coupler 50 having on its upper surface 51 a plurality of trenches 52–55 through which corresponding fiber guides 58–61, respectively, are fabricated utilizing, for example, the SCREAM-1 process. These fiber guides receive the optical fiber array 62 which consists of fibers 64–67, respectively, with the diameter of the fiber guides being selected to finally receive and hold the respective optical fibers. If desired, fiber stops, such as the stop structure 44 illustrated in FIG. 3, may be provided in each of the guides to provide a positive location for the inner end of each of the fibers.

In the embodiment of FIG. 4, the fibers are to be aligned with a corresponding array of optically active devices, such as optical detectors or laser light sources, indicated at 70–73, mounted on a substrate, or "flip-chip" 76. The flip-chip 76 is mounted on the top surface 51 of an optical coupler block 78 by any suitable means so that the substrate 76 is parallel to the top surface 51. In the illustrated embodiment, the surface mounted substrate 76 carries a plurality of metallized mounting pads 80 which are aligned with and engage corresponding solder balls 82 carried on metallized pads 84 on the top surface 51 of block 78. The pads 80 are aligned along a first edge 86 of the substrate; similarly, metallized pads 80' are aligned along an opposite edge 88 of the substrate 76 in alignment with corresponding solder balls 82' mounted on pads 84' on the surface 51. The pads 84' may be connected through suitable surface conductors 90 to circuitry 92 on the surface 51 of the block 78, for connecting the circuitry to the active elements 70–73 to drive light sources or to receive signals from detectors. The driver or receiver circuitry 92 may be in the form of an integrated circuit fabricated on the coupler block 78 using conventional integrated circuit technology. The active elements 70–73 may be conventional vertical cavity surface emitting lasers (VCSELs) or may be conventional light detectors, depending on the use to which the flip-chip is to be put.

To secure the substrate 76 to the coupler, the entire assembly is placed in a reflow oven to melt the solder balls. This causes the solder to pull the substrate 76 into alignment with the metal pads on the surface of the optical connector 50. For solder balls with a diameter of 50 micrometers on metallized pads 50 micrometers in diameter, lateral misalignments of less than about 0.5 micrometer can be obtained; accordingly, the solder pads allow submicron tolerances in the alignment of the active devices 70–73 with the optical fiber array. In addition to the mechanical alignment, the solder balls provide electrical connections and a thermal dissipation path for the active devices.

Figure 5:
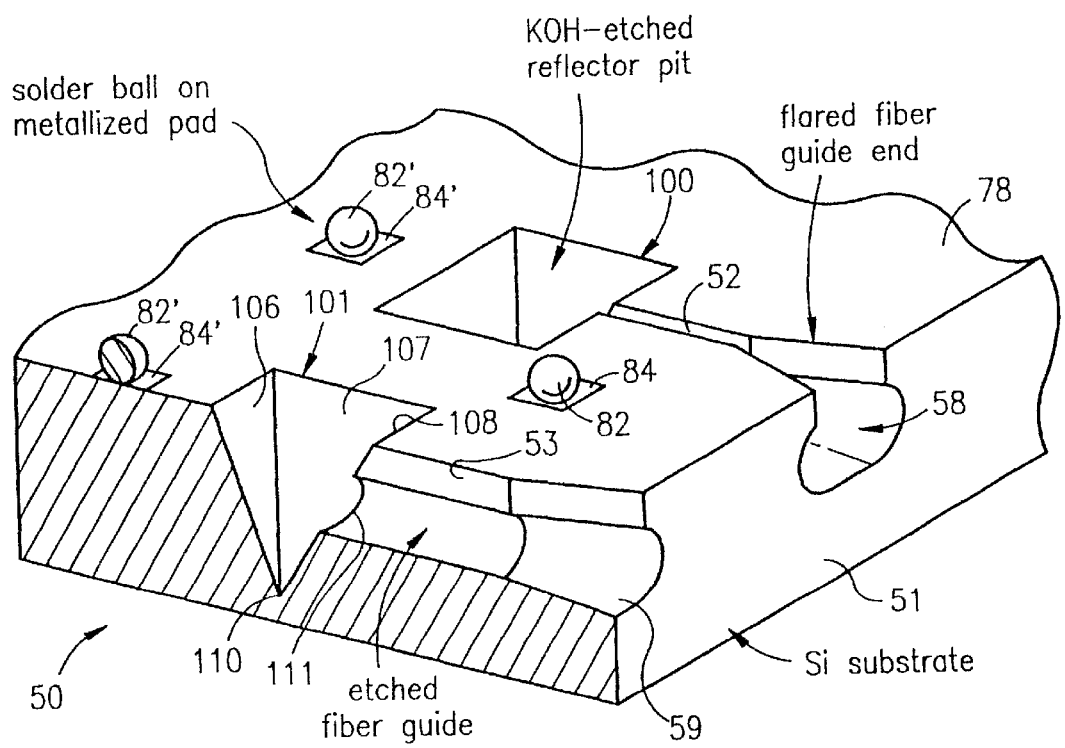
FIG. 5 is an enlarged, perspective view of a portion of the optical coupler of FIG. 4.
Figure 6:
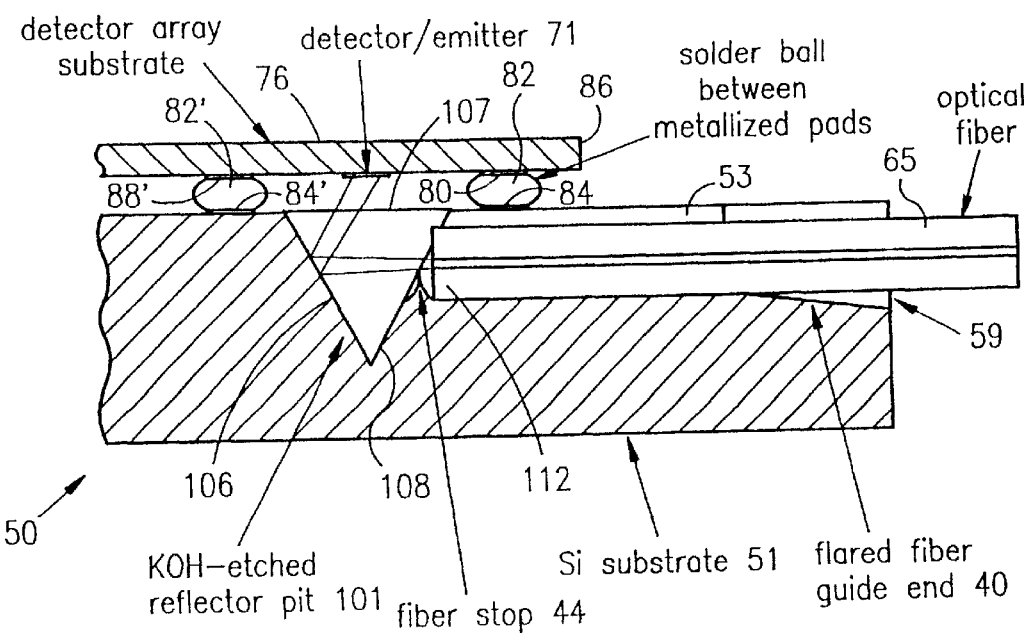
FIG. 6 is a diagrammatic, partial cross-sectional view taken along lines 6—6 of the coupler of FIG. 4.

In accordance with the embodiment of FIG. 4, light is transmitted between corresponding optical fibers 64–67 and active devices 70–73 by way of precision reflectors etched in cavities 100–103 formed in the coupler block 78 at the end of corresponding fiber guides. The cavities 100–103 are identical, and are exemplified by the cavity 101 illustrated in cross section in the enlarged views of FIGS. 5 and 6. As there illustrated, the cavity 101 is located at the end of fiber guide 59 and is fabricated as an inverted pyramid having four sloping sidewalls 106–109 which taper inwardly and downwardly to an apex 110. The fiber guide 59 extends to the sidewall 108 and provides an aperture 111 in that wall so that when the optical fiber 65 is positioned in guide 59 (FIG. 6), the inner end 112 of the fiber will extend through aperture 111 and slightly into the cavity, with the fiber aligned with the opposite wall 106. The cavity walls are reflective, as by metalization, so that light entering the cavity from the optical fiber 65 will be reflected from wall 106 onto a corresponding light detector 71 carried by substrate 76. Similarly, if the active element 71 is a light emitter, then light from that device will be directed onto reflective wall surface 106 and from there into the optical fiber 65. Accordingly, the coupler 50 precisely aligns the optical fibers 64–67 with corresponding active elements 70–73 by way of corresponding reflector cavities 100–103 to couple light between the substrate 76 and the optical fiber array, with the reflective surface causing the light paths to be perpendicular to the active elements.

Figure 7:
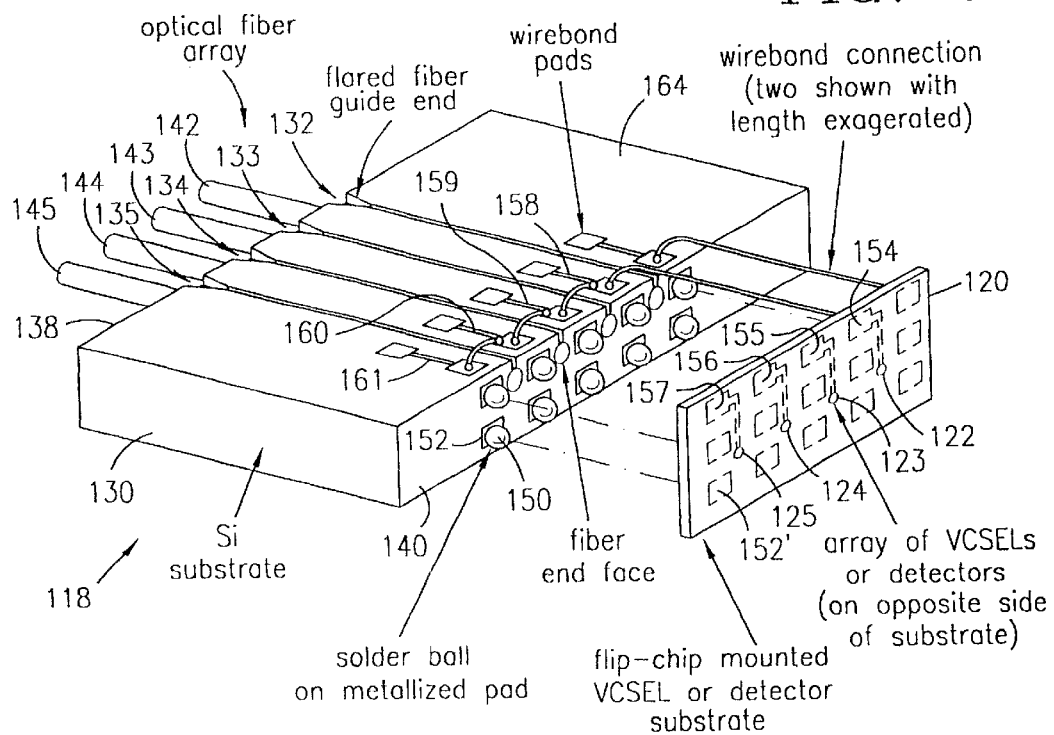
FIG. 7 is a diagrammatic, perspective, exploded view of an optical coupler block and an end-mounted substrate, the coupler aligning optical fibers with active optical devices carried on the substrate.

A further modification of the optical connector of the present invention is illustrated at 118 in FIG. 7, wherein a substrate 120 carrying an array of active elements such as the elements 122–125 is to be mounted on the surface of an optical coupler block 130 without the need for etching cavities with angled reflector faces of the type described above. This is accomplishing by extending fiber guides 132–135 completely across block 130, so that the guides extend from sidewall 138 to opposite side wall 140 of the block. The corresponding optical fibers 142–145 are positioned in the respective guides with their inner end faces substantially flush with end wall 140. The substrate 120 is secured to wall 140 by solder balls 150 mounted on corresponding metallized pads 152 on the wall 140. Corresponding metallized pads 152' are precisely located on the substrate 120 so that when the substrate 120 is positioned on the solder balls and the solder is reflowed, the substrate will be precisely positioned on the end wall 140. As discussed above with respect to FIG. 4, this mounting will precisely align the optical fibers with the corresponding active elements on substrate 120, with the fibers perpendicular to the substrate surface.

As illustrated, the active elements 122–125 may be electrically connected through conductors to corresponding contact pads 154–157 on the substrate 120. These pads may be electrically connected to corresponding wire bonding pads 158 through 161 located on the top surface 164 of block 130, with the metal contacts being connected to the pads by conventional right-angle wire bonding. The wire bond pads may then be connected to external circuitry or to integrated circuits on the substrate 130, as desired.

Figure 8:
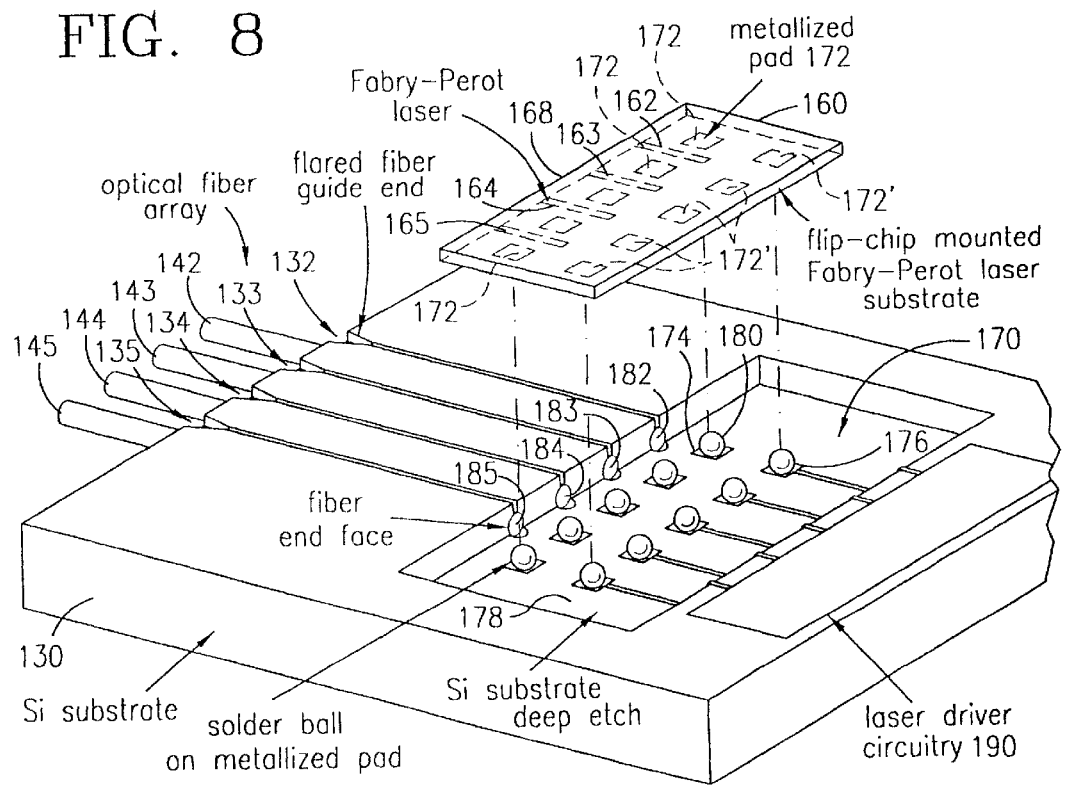
FIG. 8 is an exploded, perspective partial view of an optical coupler block and a surface-mounted substrate, the coupler aligning optical fibers with edge-emitting optical devices on the substrate, which is mounted parallel to a top surface of the coupler and which is located in a cavity on the coupler.

Since the fiber guides 132–135 are buried beneath the surface 164 of block 130, in another embodiment the substrate 120 can be surface mounted in a cavity formed on the surface of the coupler block 130, as illustrated in FIG. 8, to avoid the difficulty of mounting the substrate on the end wall 140 as described above. In this embodiment, the surface-mounted substrate 160 is illustrated as carrying Fabry-Perot lasers 162–165 arranged along one edge 168 of the substrate. A cavity 170 is fabricated in the top surface of block 130, for example, by the SCREAM-1 process described above, with the depth of the cavity being determined by the depth of the longitudinal axes of the optical fibers 142–145 and by the location of the lasers 162–165 on the substrate 160. A plurality of metallized pads 172 and 172' are placed on the lower surface 173 of substrate 160 in alignment with corresponding metallized pads 174 and metallized connectors 176 on the floor 178 of cavity 170. Solder balls 180 are located on each of the metallized pads and connectors which, when they are reflowed, provide a mechanical and electrical connection between pads 172 and pads 174, or pads 172' and pads 176, to precisely align substrate 160 in the cavity 170 so that the lasers 162–165 are precisely aligned with the end faces 182–185 of the fibers 142–145. The metallized pads 172 are mechanically connected to corresponding pads 174 through solder balls 180 primarily for the purpose of securing and aligning the substrate 160, while metallized pads 172' are aligned with corresponding connector pads 176 primarily to provide electrical connections through the solder balls 180 to connect the lasers 162–165 to laser driver circuitry 190 which may be carried on the surface of substrate block 130.

As noted above, the depth of the cavity 170 is determined by the depth of the axes of the optical fibers when they are located in their corresponding fiber guides and by the rest height of the laser array on substrate 160 after reflow of the solder balls 180. Laser array height variations can be reduced by using additional solder balls for supporting the substrate 160, but strict control on solder ball volume as well as control and repeatability of the cavity etch depth is required to obtain precise optical alignment. Careful location of the metallized pads reduces the chance of lateral misalignment in the device of FIG. 8.

Figure 9:
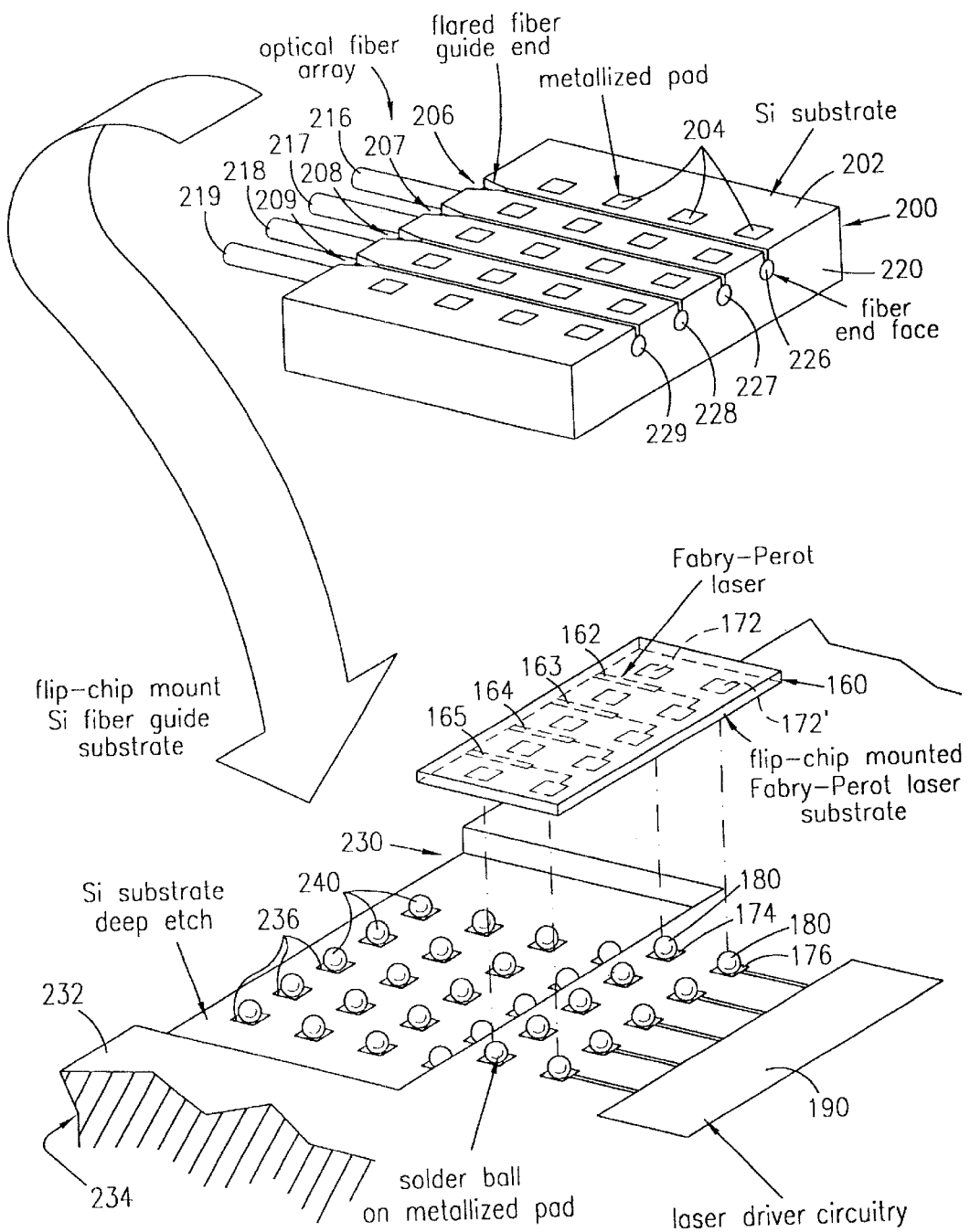
FIG. 9 is a diagrammatic, exploded, perspective, partial view of an optical coupler block mountable in a carrier for alignment with a surface-mounted substrate carrying optical devices.

Another embodiment of a laser-fiber optical coupler is illustrated in FIG. 9, wherein a coupler block 200 is in the form of a "flip-chip" which includes on its top surface 202 a multiplicity of metallized pads 204 which are used for mounting the block 200 by means of corresponding solder balls, as described above. Also formed in the surface 202 of block 200 are a multiplicity of spaced, parallel fiber guides 206–209 fabricated as described above to receive corresponding optical fibers 216–219. In this embodiment, the fibers extend completely through the block 200 with the end faces of the fibers being flush with the end wall 220 of block 200, as illustrated at 226–229.

The block 200 is received in a cavity 230 formed in the top surface 232 of a suitable wafer or the like generally indicated at 234. The cavity 230 includes a multiplicity of metallized pads 236 which are aligned with the pads 204 when the coupler block 200 is positioned in the cavity. Solder balls 240 are positioned on each of the pads 236 and when they are reflowed, they serve to secure and accurately position coupler 200 in cavity 230.

In this embodiment, the substrate 160 may be mounted on the top surface 232 of wafer 234, with metallized pads 172 and 172' on the bottom surface of substrate 160 being aligned with corresponding pads 174 and 176 located on the top surface 232. Solder balls 180 on pads 174 and 176 serve to secure and accurately position the substrate 160 so that the lasers 162 through 165 will be aligned with the end faces of the corresponding fibers 216–219. The metallized connector pads 176 on surface 232 connect the lasers 162–165 through pads 172', solder balls 180, and the connector pads to laser driver circuitry 190, also mounted on surface 232. The flip-chip mounting of both the fiber guides in block 200 and the laser array on substrate 160 in the manner illustrated in FIG. 9 reduces the incidence of misalignment between the lasers and the optical fibers in a direction perpendicular to the surface of wafer 234 caused by variations in height due to variations in solder ball size. Although lateral misalignment parallel to the surface 232 is possible, such misalignment is minimized by biasing both the coupler 200 and the substrate 160 in the same direction prior to reflow so that the reflow process tends to keep them in alignment. However, the depth of the cavity 230 must be accurately controlled to maintain alignment in the vertical direction.

Figure 10:
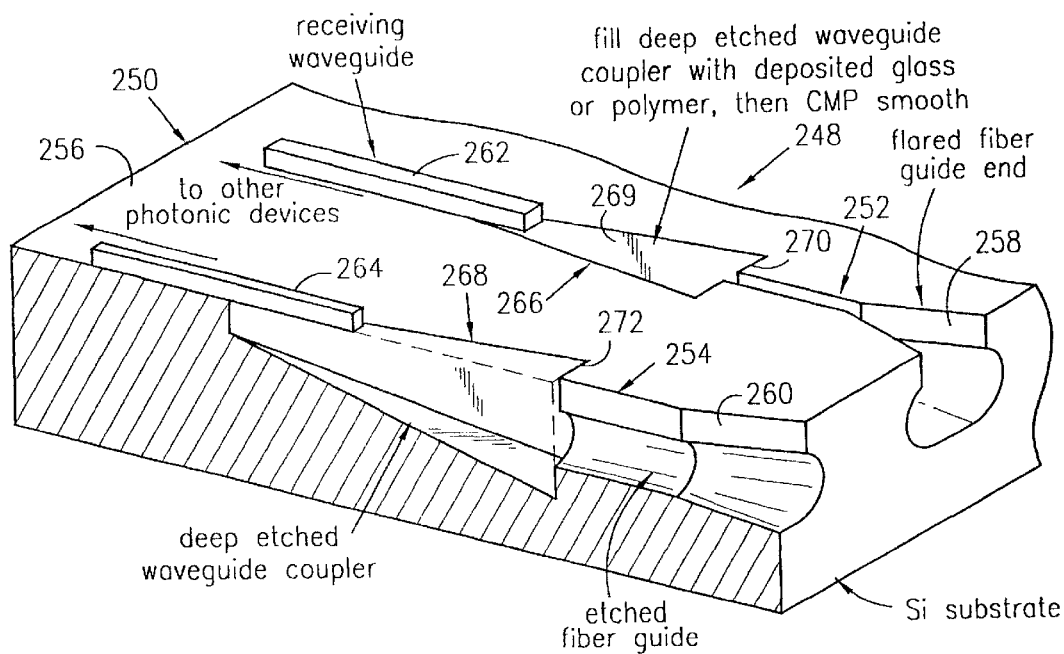
FIG. 10 is a diagrammatic, perspective view in partial cross-section of an optical coupler block for aligning optical fibers with surface wave guides.

FIGS. 10–24 are directed to embodiments of the optical coupler of the present invention for aligning optical fibers with optical waveguides. In particular, these embodiments relate to fiber-waveguide optical couplers fabricated in a coupler block such as a silicon substrate for receiving light from optical fibers and coupling that light into a receiving waveguide which may either be on the surface of the optical coupler or embedded in the coupler. One embodiment is illustrated in FIG. 10, wherein an optical coupler 248 includes a coupler block 250 which incorporates an array of fiber guides, such as those illustrated at 252 and 254, which are etched into the block in the manner described with respect to FIGS. 1–3. As previously described, the fiber guides are formed in the top surface 256 of the block 250, with the guides incorporating flared ends 258 and 260, as previously described.

Mounted on the surface 256 of coupler block 250 is an array of receiving waveguides such as the waveguides 262 and 264. These waveguides are fabricated by depositing on surface 256 suitable waveguide materials such as glass, polymer, or lithium niobate, for example. This material is patterned using standard semiconductor fabrication processes, with the resulting waveguide leading to photonic devices (not shown) to which the optical signals carried by optical fibers in fiber guides 252 and 254 are to be coupled. The receiving waveguides 262 and 264 are coupled to and aligned with the optical fibers by means of deep-etched tapered cavities, or trenches, forming waveguide couplers 266 and 268, respectively, in the substrate block 250, as will be described.

The tapered waveguide couplers 266 and 268 are fabricated by establishing deep etch conditions which make wider trenches also deeper so that their vertical and horizontal dimensions change gradually over their length. Each cavity is filled at least partially with an optical waveguide material 269, such as glass or polymer, and a chemical-mechanical polish (CMP) is used to make the top surface smooth. Next, the waveguide material for surface waveguides 262 and 264 is deposited and patterned, and after this the fiber guides 252 and 254 are etched. If desired, the same waveguide material 269 can be used for both the trench filler and the surface waveguides.

The large ends 270 and 272 of the waveguide couplers 266 and 268 are adjacent the fiber guides 252 and 254, respectively. For clarity of illustration, these ends 270 and 272 are shown as being wider and deeper than is necessary. In practice, the taper of waveguide trenches 266 and 268 may be designed to support a single mode in a plane parallel to the top surface 256 of block 250, with the profile of the guided mode in the waveguide closely matching the profile in the optical fiber to reduce coupling losses. While it is easy to profile the width of the tapered end to achieve a profile match, setting the thickness of the waveguide material is more difficult due to the aspect ratio of the tapered region. Such a taper will support many modes in the plane perpendicular to the top surface 256, so the tapered trenches are more suited to for coupling to multimode fibers, where an appropriate match between the tapered region and fiber mode field profiles are easier to fabricate using the here-in described processing procedures. A shorter taper minimizes pulse spreading but the geometry of the taper is of less concern for multimode coupling. Due to the tall shape of the waveguide couplers 266 and 268, these couplers are primarily applicable for coupling from optical fibers into planar waveguides such as those illustrated at 262 and 264.

Figure 11:
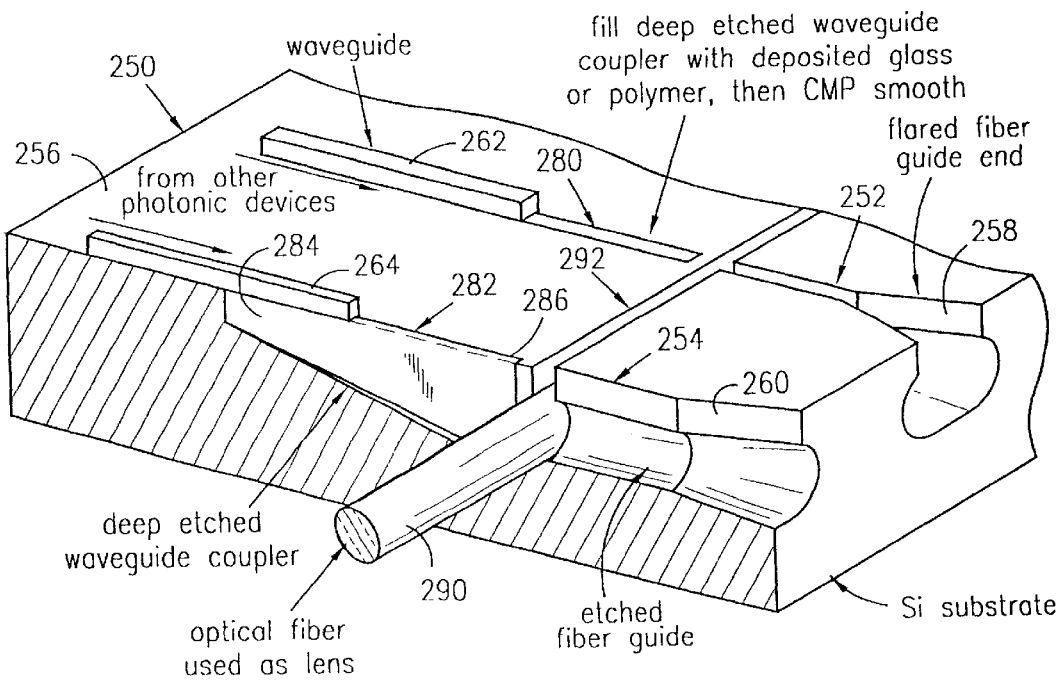
FIG. 11 illustrates a modification of the device of FIG. 10, incorporating a fiber lens.
Figure 12:
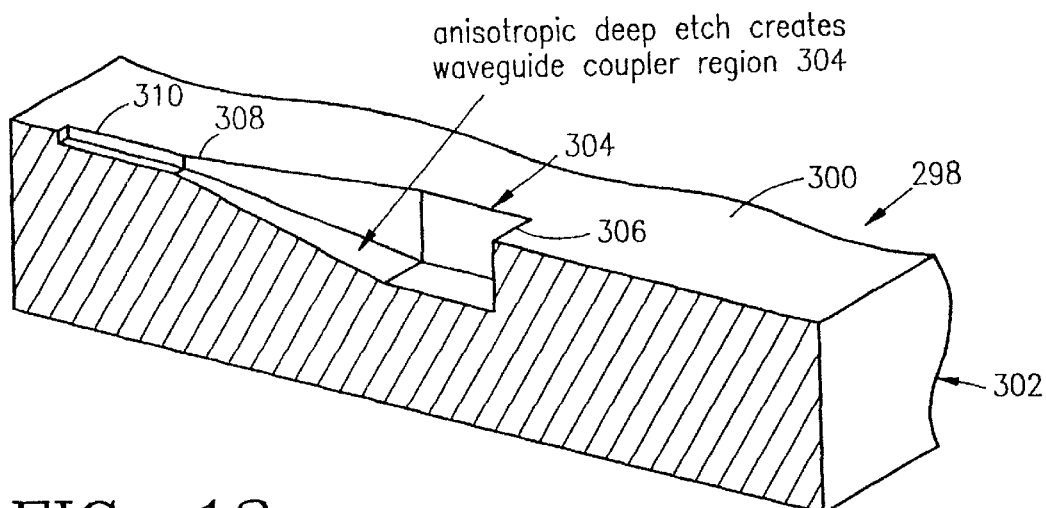
FIGS. 12–17 illustrate successive steps in a process for fabricating a coupler block incorporating an embedded waveguide.
Figure 13:
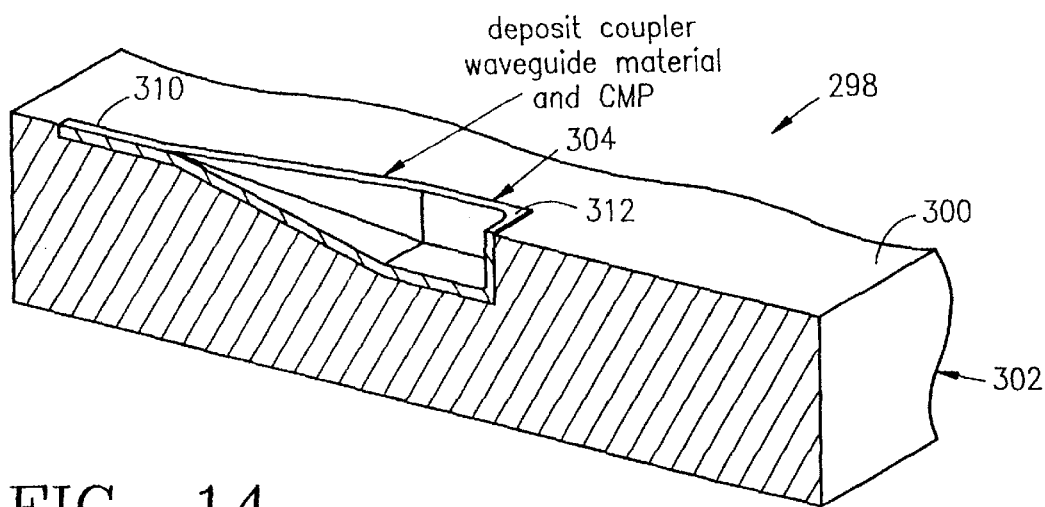

Coupling from planar waveguides, such as the waveguides 262 and 264, into corresponding optical fibers is illustrated in FIG. 11, wherein elements similar to those of FIG. 10 are similarly numbered. In this embodiment, the surface waveguides 262 and 264 are coupled to corresponding deep-etched waveguide couplers 280 and 282 which are narrower than the waveguide couplers 266 and 268, and which are tapered outwardly from an inlet end 284 to an outlet end 286. In this embodiment, light from the waveguides 262 and 264 passes through couplers 280 and 282 and is focused into the corresponding optical fibers in fiber guides 252 and 254, using an optical fiber 290 as a cylindrical lens. As illustrated, the fiber 290 is located in a deep-etched trench 292 which extends transversely across the substrate block 250, intersecting the waveguide couplers 280 and 282 where they join the ends of the fiber guides 252 and 254. The relative positions and depths of the tapered waveguide couplers, fiber lens, and receiving optical fibers in guides 252 and 254 are selected to maximize optical coupling. An integrated fiber stop, such as the stop 44 illustrated in FIG. 3, can be provided in the fiber guides 252 and 254 to ensure proper lens-fiber spacing.

In a modification of the waveguide couplers of FIGS. 10 and 11, a single-mode fiber-to-waveguide coupler 298 may be fabricated by providing a thin, linear (i.e., non-tapered) waveguide in a cavity for directing light between a surface waveguide and an optical fiber which intersects the cavity. Such a thin waveguide may be fabricated in accordance with the process steps illustrated in FIGS. 12–17. In the first step, (FIG. 12), the upper surface 300 of a coupler block 302, which may be single crystal silicon, is patterned and etched with an isotropic deep etch to create a waveguide coupler cavity 304. This cavity is relatively large at a first end 306, and tapers inwardly and upwardly to a reduced end 308 which leads to and is integral with a surface channel 310. The desired coupler waveguide material 312 is then conformally deposited on the top surface 300 and in the waveguide cavity 304, and the material 312 on the top surface is chemical-mechanical polished to reveal the substrate top surface 300, leaving a layer of the material 312 coating the interior walls and floor of the coupler cavity 304 and filling the channel 310.

Figure 14:
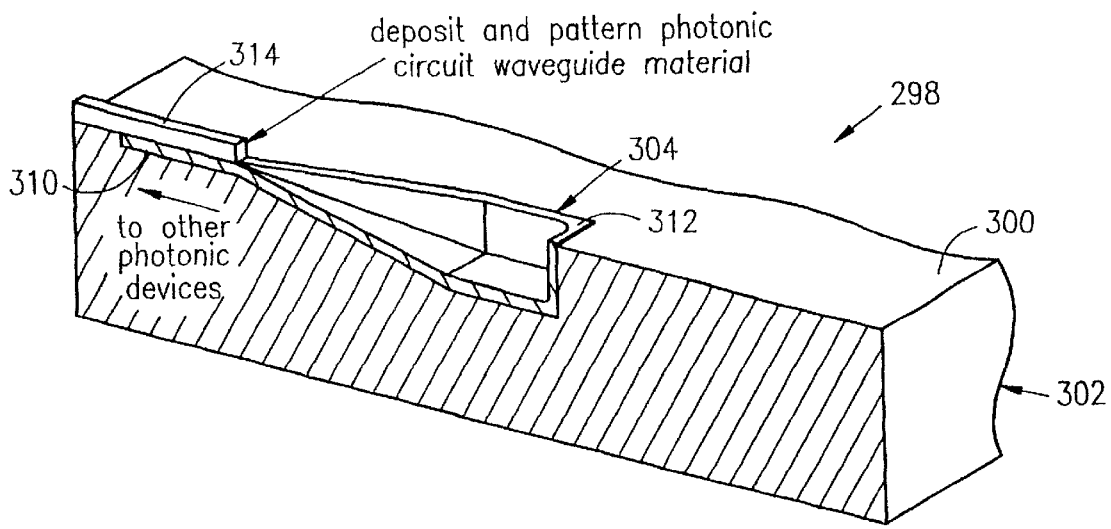

Thereafter, as illustrated in FIG. 14, waveguide material for a surface waveguide 314, which leads to photonic devices or circuits on substrate 302, for example, is deposited and patterned to produce the surface waveguide. This step can be merged with the previous step of FIG. 13 if the waveguide material characteristics and deposition techniques for the structure 314 and the material 312 are compatible. If desired, a coupler structure, taper, or grating can be fabricated where the two waveguides overlap at the channel 310 to improve coupling.

Figure 15:
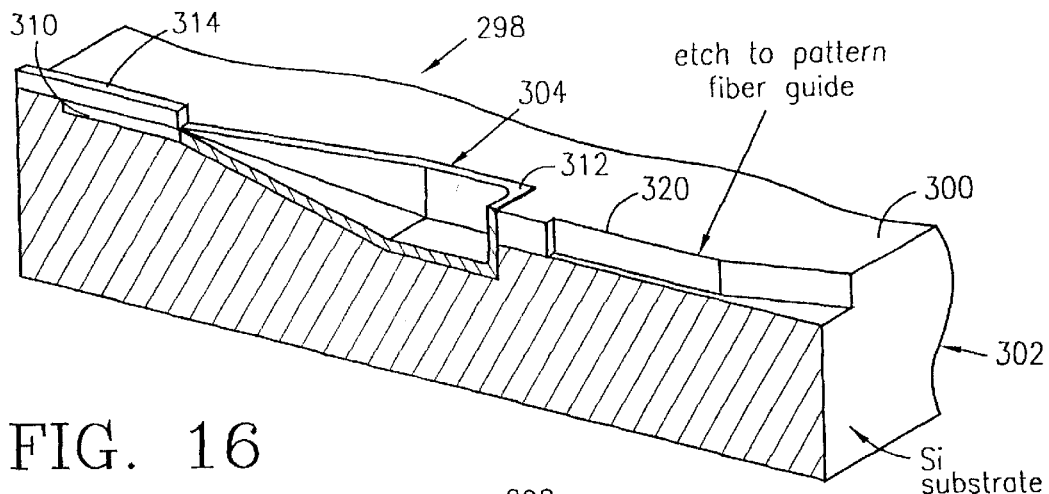
Figure 16:
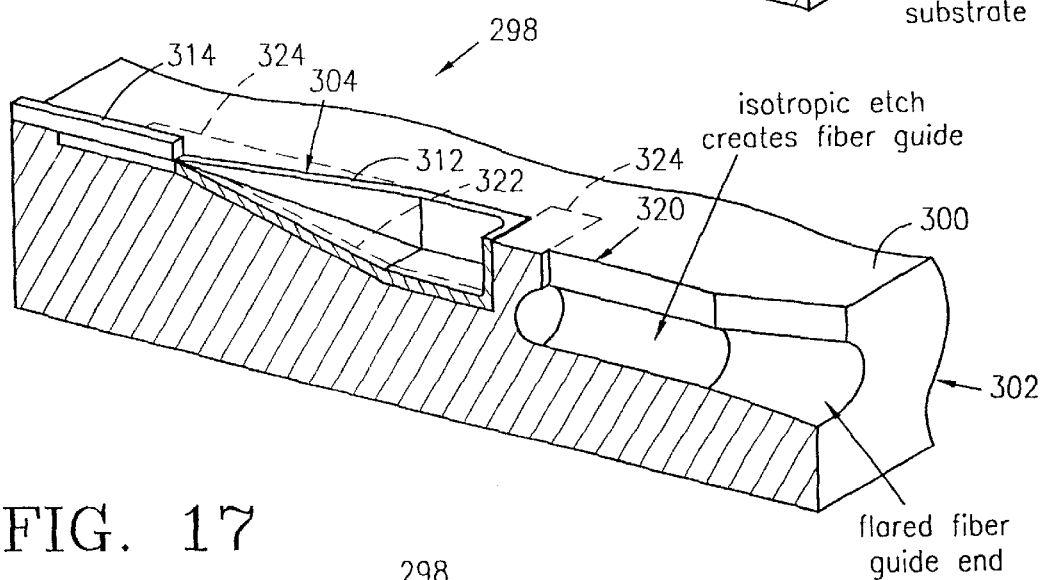
Figure 17:
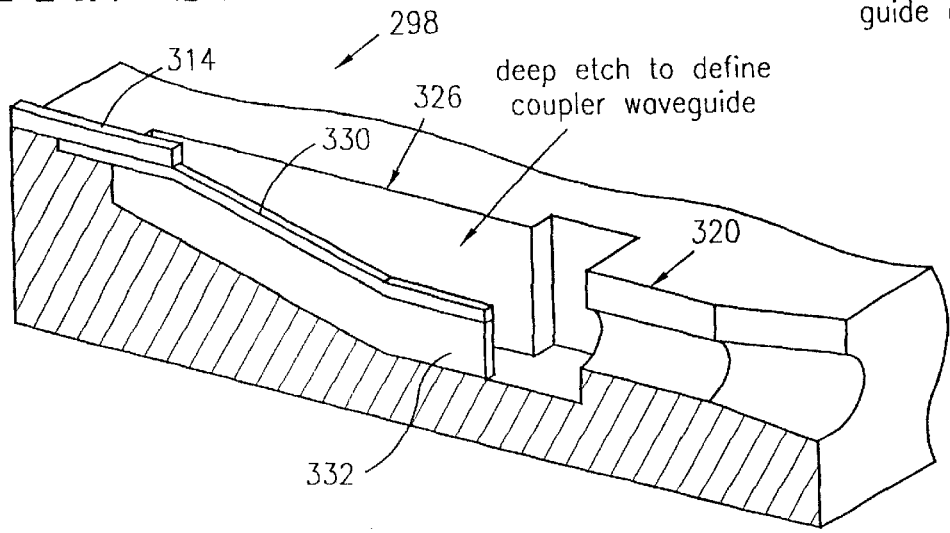

The next step, illustrated in FIG. 15, is to fabricate a fiber guide 320 by isotropic etching, as described with respect to FIGS. 1–3. Thereafter, as illustrated in FIG. 16, the material 312 in waveguide coupler cavity 304 is patterned, as illustrated by dotted line 322, to define a linear waveguide and, as illustrated by dotted line 324, to define a trench region. Following the patterning, an isotropic deep etch is performed to produce a deep trench 326, as illustrated in FIG. 17, surrounding a linear waveguide 330 as patterned at 322 in material 312. The deep etch forms an upstanding ridge 332 beneath, and supporting, waveguide 330. The depth of the fiber guide 320 and the depth of the coupler cavity 304 are selected so that the axis of an optical fiber inserted into the fiber guide 320 will be aligned with the center of linear waveguide 330. In this way, light from the optical fiber is guided through waveguide 330 into the surface waveguide 314 or vice versa. If desired, the etched cavity can be filled with a cladding material to improve the coupling between the optical fiber and the waveguide.

In the embodiments described above, the fibers are secured in fiber guides located below the surfaces of the respective optical coupler blocks and are held in place by friction between the fiber guides and the surfaces of the optical fibers. In another embodiment of the invention, illustrated at 339 in FIG. 18, shallow fiber guides 340 are fabricated in a coupler block 342. In the illustrated embodiment, the depth of the fiber guides is selected to align the center of an optical fiber, such as the fiber 344, with a buried waveguide 346 located in a trench 348 etched in the surface 350 of block 342. Thus, the depth of the fiber guide 340 is selected to be a little larger than the radius of the optical fiber 344 so that the surface of the fiber extends above the top surface 350 of block 342, as illustrated.

Figure 18:
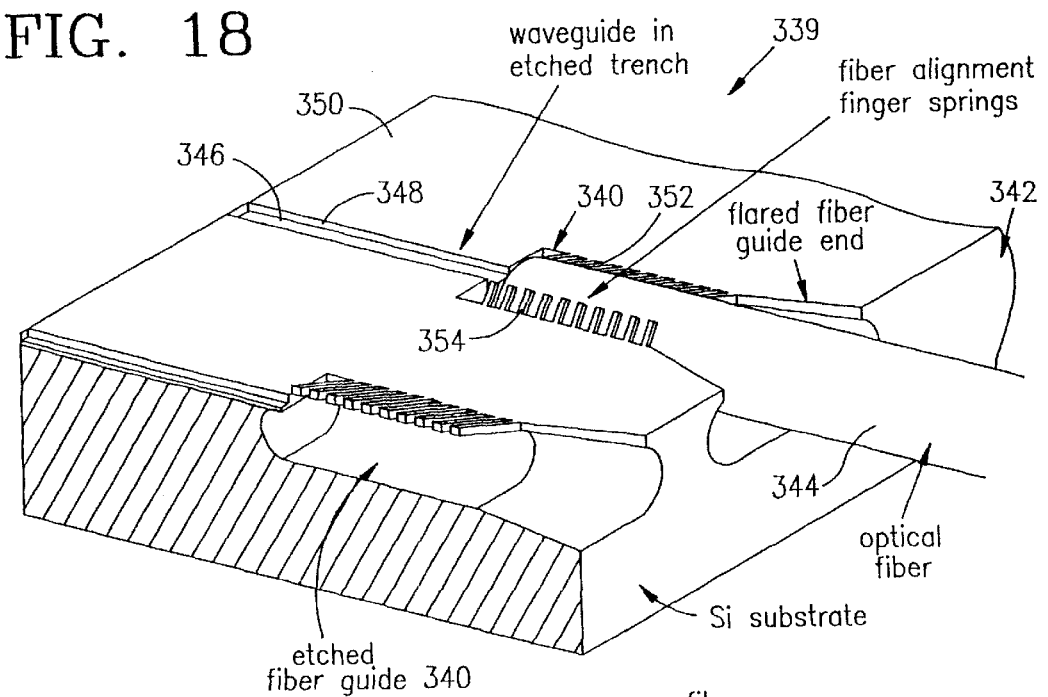
FIG. 18 is a diagrammatic perspective view in partial cross-section of an optical coupler for aligning optical fibers with embedded and surface waveguides and incorporating multiple fiber alignment fingers.

In this embodiment, the fiber guide 340 is fabricated so that its width is greater then the diameter of the fiber 344, and a plurality of fiber alignment finger springs 352 and 354 are provided which extend from opposite sides of the trench from which the fiber guide 340 is formed. The finger springs are undercut, released, cantilevered beams preferably fabricated by the SCREAM-1 process and extend toward each other and toward the center of the fiber guide 340 to receive and engage an optical fiber and to hold it in alignment with the waveguide 346. As illustrated in FIG. 18, the depth of each of the finger springs 352 and 354 is approximately equal to its width so that the fingers are flexible both vertically and horizontally to permit easy insertion of the optical fiber into its corresponding fiber guide. The fingers have sufficient thickness to ensure that the fiber is restrained. Thus, the amount of pressure required to insert and align the optical fiber depends on the finger spring geometry and the number of fingers. These finger springs are located lithographically in the fabrication process, and are aligned in opposition across the fiber guide.

Figures 19, 20:
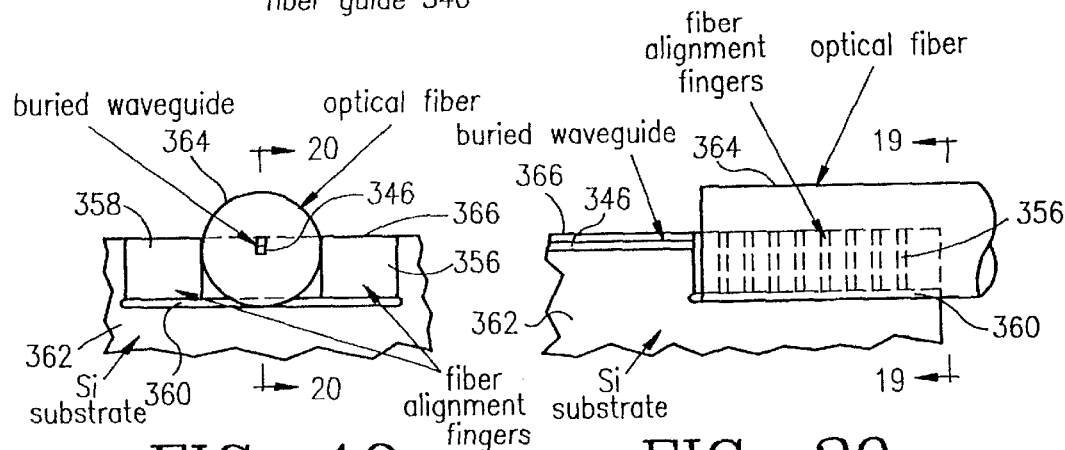
FIG. 19 is a side elevation of the embedded waveguide portion of the coupler of FIG. 18.
FIG. 20 is a partial cross-sectional view taken along lines 20—20 of FIG. 19.

A similar embodiment is illustrated in FIGS. 19 and 20; however, instead of using an undercutting etch step to fabricate thin fingers as in FIG. 18, relatively thick alignment fingers 356 and 358 are fabricated in a fiber guide 360, located in a coupler block 362. In t his case, the fingers 356 and 358 are relatively narrow so that they are flexible in the horizontal direction, and are relatively thick in the vertical direction. These thick fingers provide greater stiffness and thus provide improved alignment over the thin fingers of FIG. 18. The optical fiber 364 is secured in the fiber guide 360 by the fingers 356 and 358, with the surface of the optical fiber extending above the top surface 366 of block 362 so that the axis of the fiber is aligned with a buried waveguide 346.

Figure 21:
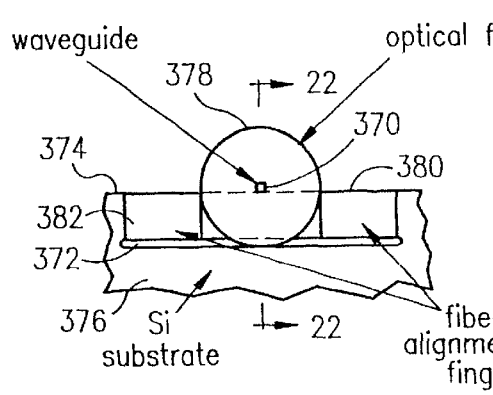
FIG. 21 is a side elevation of the surface-mounted waveguide portion of the coupler of FIG. 18.
Figure 22:
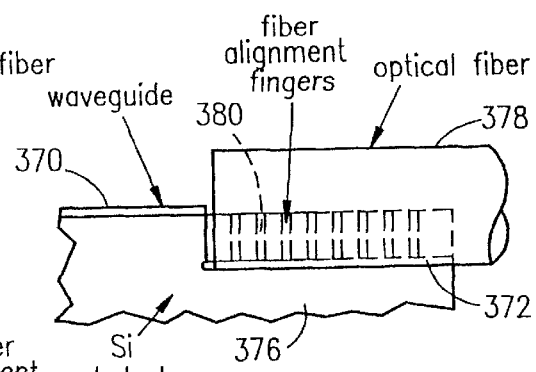
FIG. 22 is a partial cross-sectional view taken along lines 22—22 of FIG. 21.
Figures 23, 24:
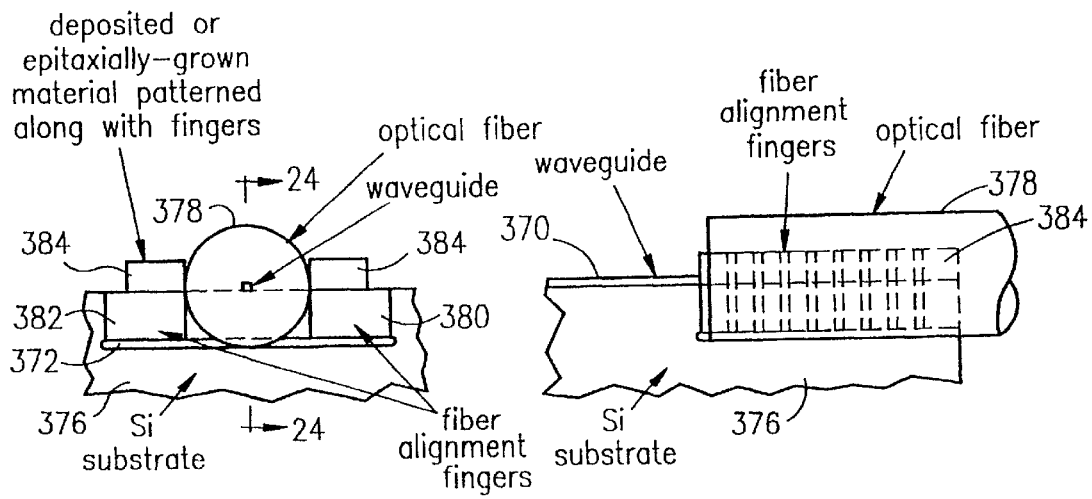
FIG. 23 is a side elevation of a modified form of the device of FIG. 18, utilizing deposited material on the top of the alignment fingers.
FIG. 24 is a partial cross-sectional view taken along lines 24—24 of FIG. 23.

If a waveguide 370 is on the surface of the coupler block, as illustrated in FIGS. 21 and 22, a fiber guide 372 in the surface 374 of block 376 will have to be shallower in order to align the axis of optical fiber 378 with the waveguide. In this case, the alignment fingers 380 and 382 on opposite sides of the waveguide will also be shallow, with the tops of the fingers being below the axis of the optical fiber, making it difficult to retain the optical fiber in the fiber guide 372 since the fingers would tend to squeeze the fiber out of the guide. This would lead to lateral misalignment of the optical fiber with the waveguide. One solution for this is illustrated in FIGS. 23 and 24, wherein an additional layer 384, is deposited or epitaxially grown on the top surfaces of alignment fingers 380 and 382, respectively. This layer grips the fiber securely to reduce the possibility of misalignment.

As discussed above, the alignment active optical devices such as Vertical Cavity Surface Emitting Laser (VCSEL) arrays and photo detector arrays which are to be optically coupled to optical fiber arrays is challenging, because the light to be detected must be perpendicular to the light-detecting elements or the emitted light must be parallel to the optical axis of the fiber. In the previously-described embodiments in which the active elements are mounted on a separate, surface-mounted substrate, as in FIGS. 4–6 and 8–9, a coupler is provided in which light is redirected, as by reflective surfaces or waveguides, between the active elements and optical fibers which are not perpendicular to the elements. In accordance with the present invention, another solution to this alignment problem is to edge-mount the substrate which carries the active elements in a cavity so that the surface of the substrate which carries the active elements is perpendicular to the optical fibers. Such an arrangement is illustrated at 398 in FIG. 25, wherein a substrate 400 is mounted on one edge in an etched trench 402 located in a silicon fiber guide substrate, or coupler block, 404. The coupler block 404 includes an array of fiber guides, generally indicated at 406, which receive an array of optical fibers 408, as described above with respect to FIG. 4, for example. The substrate 400 carries an array of active optical elements such as VCSELS or detectors, which emit or detect light. In the illustrated embodiment, the elements 410 are VCSELS which emit light through the substrate 400. These VCSELS are to be aligned with corresponding optical fibers in array 408, and for this purpose the substrate 400 is positioned in the deep etched trench 402 and is held in place by shaping the ends of the trench, as at ends 412 and 414, to snugly receive corresponding ends of the substrate.

The substrate 400 carries a plurality of wire bond pads 416 which may be electrically connected to suitable driver circuitry 420 carried on the top surface 422 of coupler block 404 by way of corresponding connector pads 424, also on surface 422. Conventional wire bonding, as described with respect to FIG. 7, for example, may be used to provide the electrical connections. By controlling the depth and position of the trench 402 and the location of the active elements 410 on substrate 400, accurate alignment of the active elements with the optical fiber array can be obtained. The substrate so mounted in the coupler block may be referred to as an edge-mounted substrate.

Figure 25:
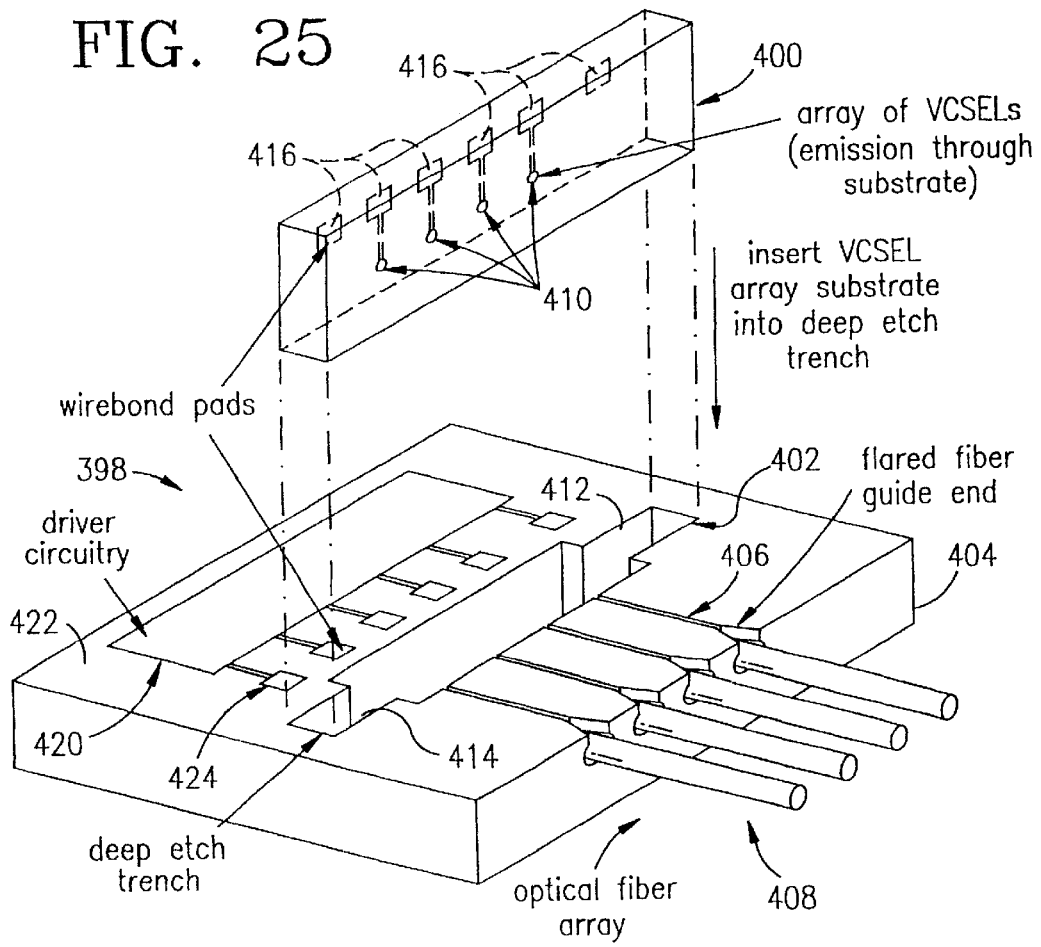
FIG. 25 is a diagrammatic, exploded, perspective view of an optical coupler and an edge-mounted substrate located in an etched trench in the coupler.
Figure 26:
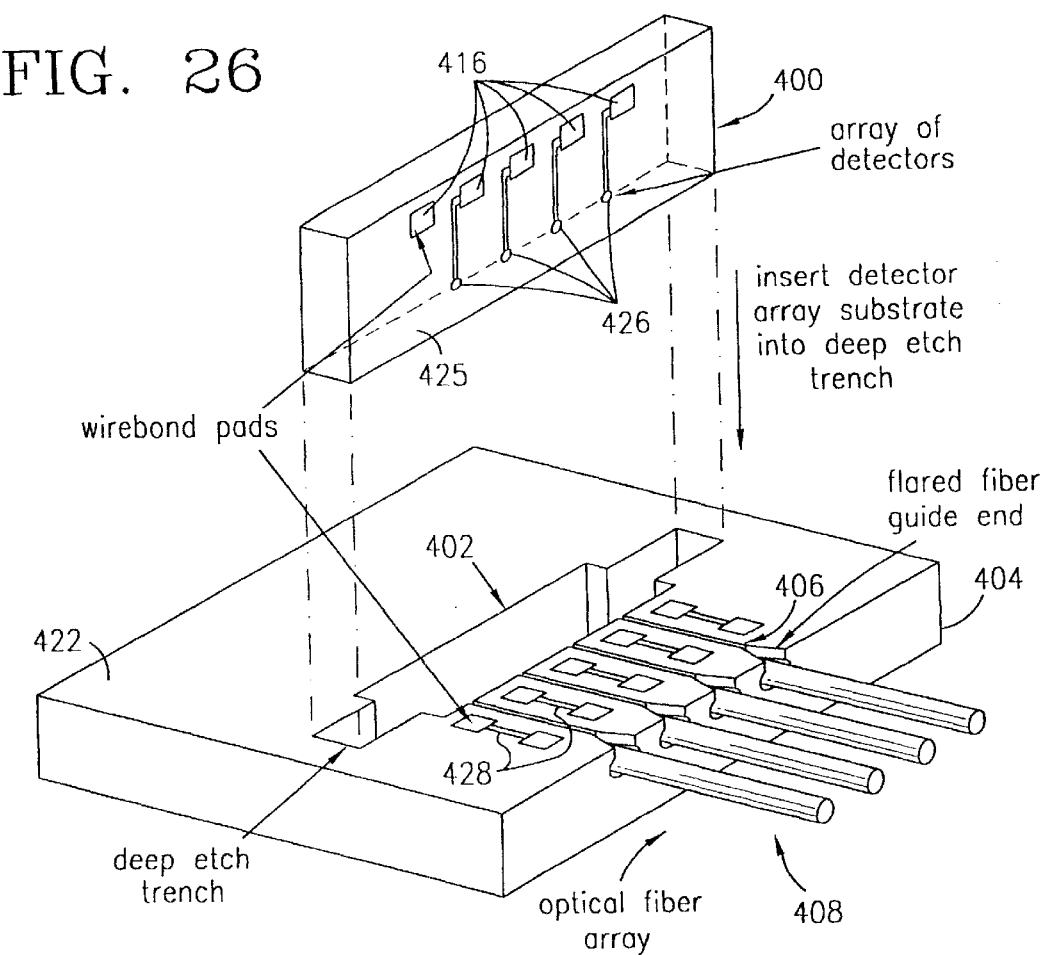
FIG. 26 is a modification of the device of FIG. 25.

FIG. 26 illustrates a variation of the device of FIG. 25, wherein the optical coupler block 404 receives the optical fiber array 408 in corresponding optical fiber guides 406, in the manner previously described. In this case, the active elements on the substrate 400 are illustrated as optical detectors 424 located on the surface 425 of the substrate which faces the optical fiber array 408. The substrate 400 is received in trench 402 in the manner previously described. In this case, the wire bond connector pads 416 are located on the surface 425 of substrate 400 which faces the optical fiber array and are connected to corresponding wire bond connector pads 428 on the surface 422 of connector block 404. Electrical connections to detector circuitry are made through additional wire bond connections to pads 428.

In the devices of FIGS. 25 and 26, the active devices on the edge-mounted substrate are aligned with the optical connector block 404 and thus with the optical fiber array 408 by precision etching of the deep etch trench 402 and by precision cleaving of the edge-mounted substrate so that the substrate has the correct dimensions. Precision cleaving of the substrate 400 may be attained by etching small trenches around its parameter to establish the precise location of the cleaved edges. The deep trench etch depth must be controlled to within 0.5 micrometers for successful alignment to single-mode optical fibers. After the edge-mounted substrate is inserted into the trench, it is brought into contact with one end of the trench and is fixed in position with an adhesive such as epoxy or by some other bonding method.

Figure 27:
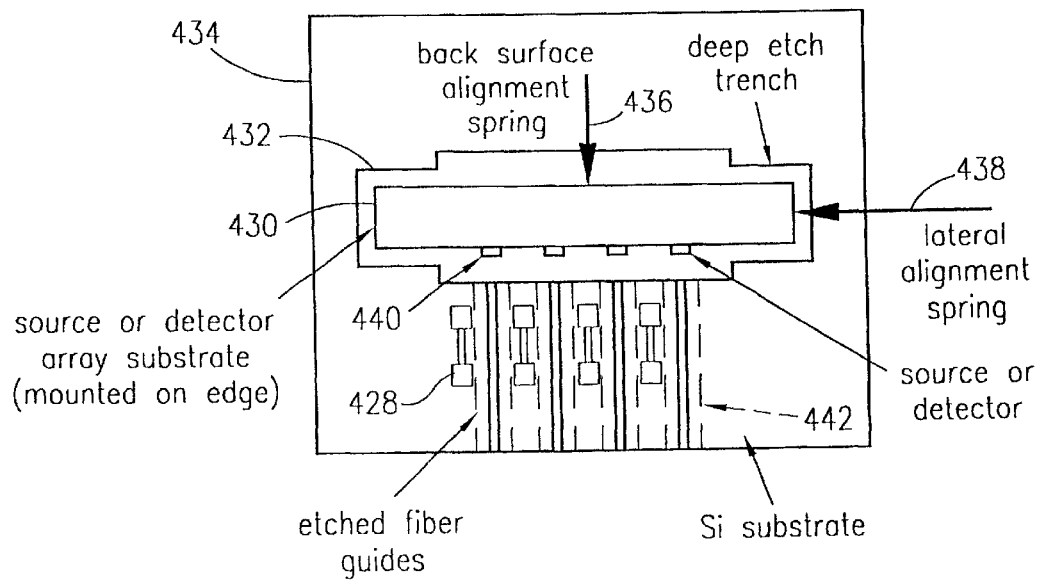
FIG. 27 is a diagrammatic top plan view of the coupler of FIG. 26, illustrating the use of back surface and lateral end alignment springs in the trench.

One problem with the foregoing assembly technique is that it may not adequately address expansion effects arising from different coefficients of thermal expansion of the edge-mounted substrate and the optical coupler 404. FIG. 27 diagrammatically illustrates a solution to this problem wherein an edge-mounted substrate 430 (which may be the same as substrate 400, for example) is secured in a deep-etched trench 432 in an optical coupler block 434 by means of microsprings which bend slightly to accommodate thermal expansion and contraction of the edge-mounted substrate relative to the coupler block. These microsprings are located, as indicated by arrows 436 and 438, to press the substrate toward the optical fibers and toward the left-hand end of the trench 432, respectively, as viewed in FIG. 27. The left-hand end of the trench must still be etched to sub-micron tolerances to ensure alignment of the active elements 440 with the optical fibers in fiber guide 442, but the springs accommodate relative motion due to differences in thermal expansion.

FIG. 28 illustrates in perspective view examples of back surface and lateral alignment springs 436 and 438, while FIG. 29 illustrates a top plan view of the coupler block 434 with the substrate 430 removed for clarity. In addition, the back surface spring 436' in FIG. 29 is of slightly different configuration to illustrate that the springs can take a variety of forms.

The various alignment springs are fabricated in the silicon coupler block using the SCREAM-1 process by first patterning the top surface 444 of block 434 at the same time that trench 432 is patterned. After the trench 432 and the springs have been etched to the desired depth, the springs 436 and 438 are released for motion with respect to the block 434 by deep etching the block 434 from its back surface 446. This back surface etch takes place in the regions indicated by the dotted lines 448 and 450 in the top plan view of FIG. 29, leaving spring 436 connected to substrate 434 by cantilever arms 452 and 454 and leaving spring 438 connected to substrate 434 by cantilever arm 456. An advantage of releasing by deep etching from the back side of the substrate is that the back surface etch depth does not require strict control, since any over-etch in this location only results in a spring which is slightly thinner than desired. Since the SCREAM-1 process is capable of fabricating high aspect ratio structures such as springs 436 and 438 which are tens of microns deep, any over-etch on the back surface on the order of micrometers will not significantly influence the operation of the resulting springs.

As illustrated, spring 436 includes a base region 460 connected to cantilevered arms 452 and 454 through sinuous connector arms 462 and 464 which allow motion toward and away from the optical fiber guides 442. This spring tends to urge the substrate 430 into position against the fiber guides. Similarly, released edge alignment spring 438 includes an edge contact arm 466 mounted on cantilever arm 456, with the arm 456 being movable toward and away from the end of substrate 430 to urge the substrate toward the left-hand end of the deep trench 432, as viewed in FIG. 29.

Figure 30:
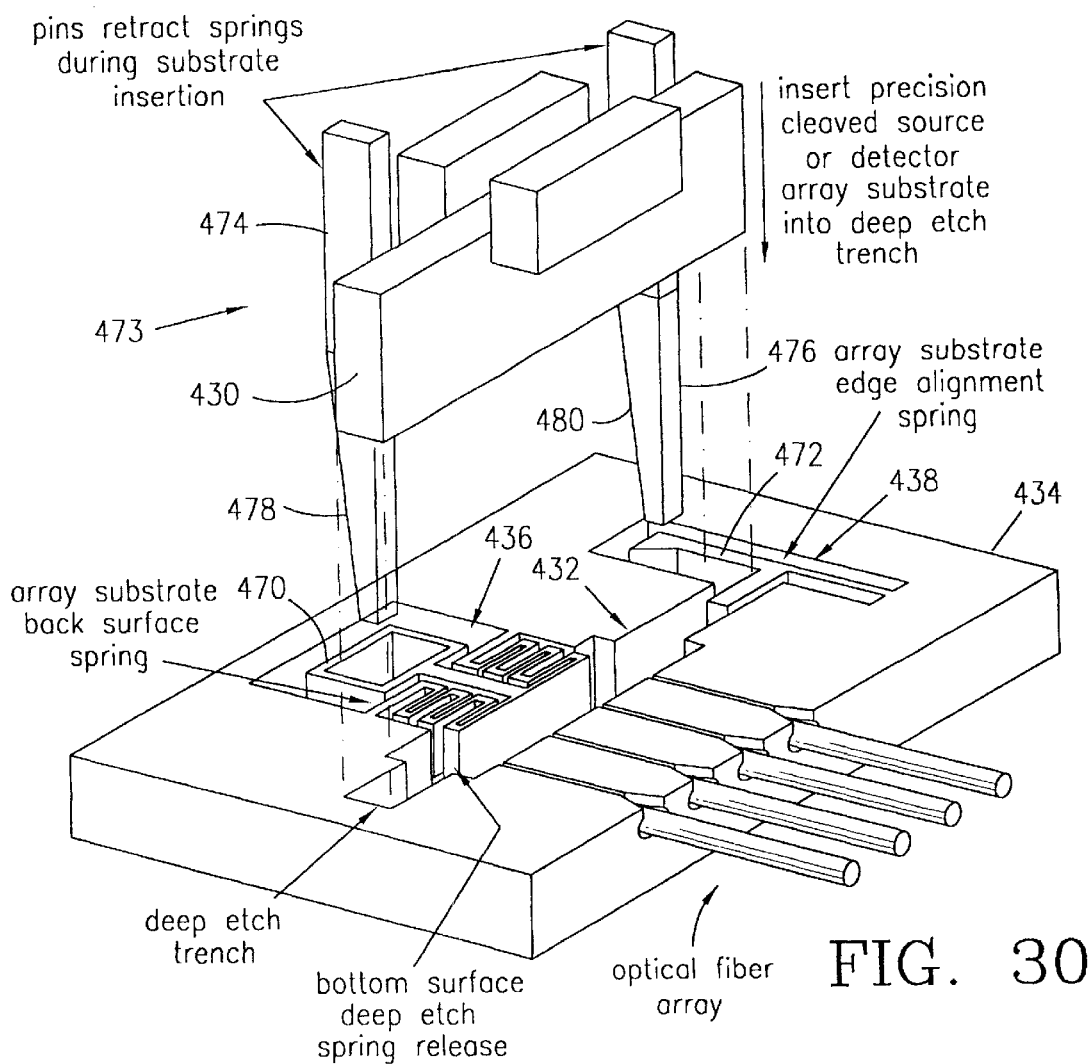
FIG. 30 is a diagrammatic perspective view illustrating the provision of retracting pins for the springs of FIG. 28.

The alignment spring 436 is illustrated in FIG. 30 as having a ring 470 (FIG. 30) which may be used to retract the spring during insertion of the edge mounted substrate 430 into the trench. Similarly, alignment spring 438 incorporates a tab, or extension 472 for the same purpose. A substrate insertion tool 473 may incorporate corresponding tapered retraction pins 474 and 476 which automatically retract the springs 436 and 438, respectively, during the substrate installation process, and release the springs after the substrate is in place. The insertion tool grips the substrate for precision placement in trench 432. Alternatively, the pins can be independent of the substrate insertion tool. As illustrated in FIG. 30, the pins 474 and 476 include sloped faces 478 and 480 which engage ring 470 and tab 472 to force the springs away from the substrate as the pins are lowered.

Figure 31:
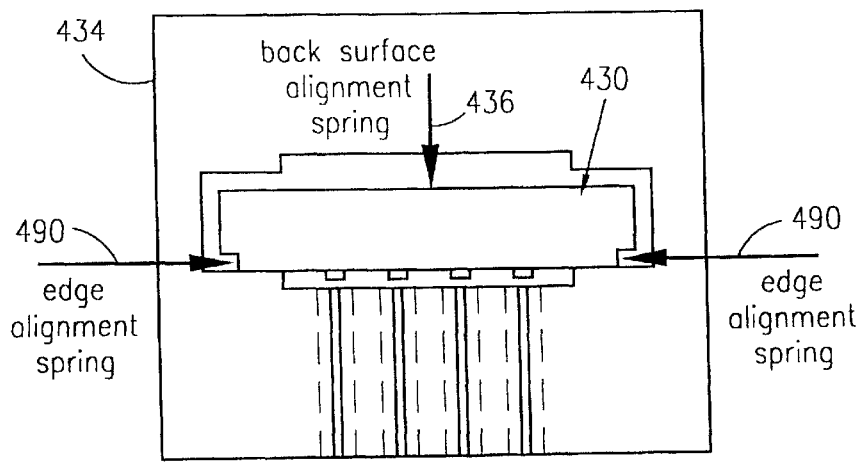
FIG. 31 is a diagrammatic top plan view of a modification of the coupler of FIG. 26, incorporating a back surface alignment spring and a pair of left and right edge alignment springs.

A variety of alignment spring structures may be utilized to assist in aligning the edge-mounted substrate 430 in trench 432 of block 434. Such alignment structures are diagrammatically illustrated in FIG. 31 as including not only the back surface alignment spring 436 previously discussed, but also variations in the lateral alignment spring 438 on the right-hand side of the substrate 430 as well as alternative edge alignment springs 490 illustrated in FIG. 31. Such variations and modifications are illustrated in FIGS. 32–39, to which reference is now made.

Figure 32:
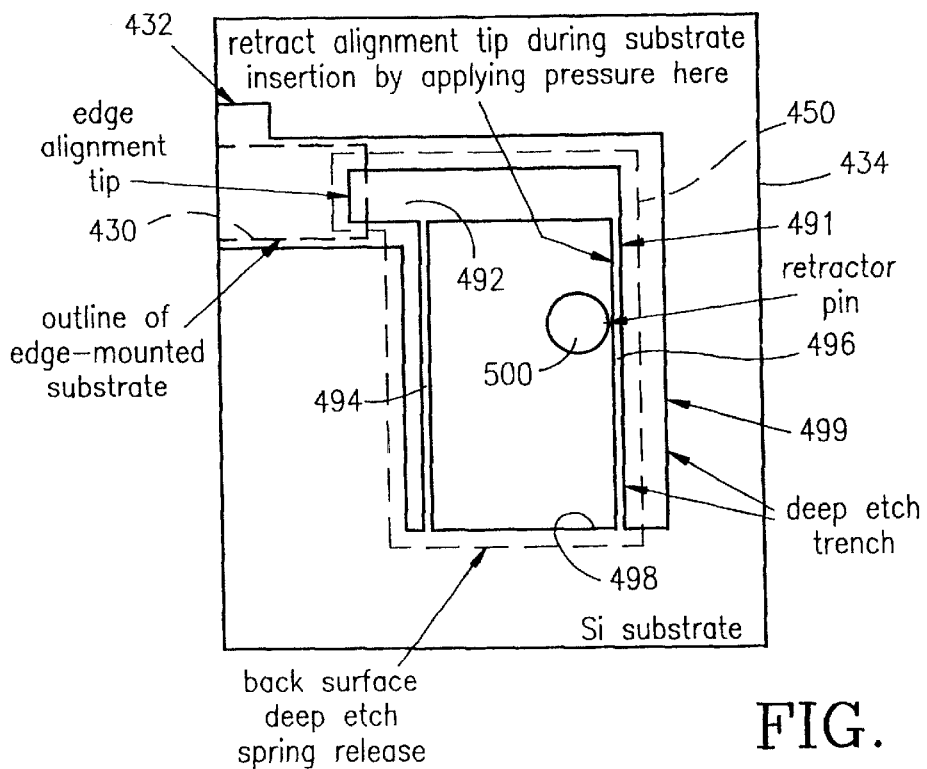
FIGS. 32–35 illustrate in diagrammatic top plan views a variety of lateral end alignment springs for use with the coupler of FIG. 27, FIG. 32 illustrating a parallel beam edge spring with parallel retractor action, FIG. 33 illustrating a parallel beam edge-spring with perpendicular retractor action, and FIG. 34 illustrating a serpentine edge spring.

FIG. 32 illustrates a lateral alignment spring 491 which is similar to spring 438 of FIG. 30. This spring includes an alignment tip 492 which engages an end of the substrate 430, and is mounted on a pair of parallel spring arms 494 and 496 which are mounted as cantilevers on the wall portion 498 of an extension 499 of trench 432. As illustrated by dotted lines 450, the alignment spring 491 is released by a deep trench etch on the back surface of the substrate 434, as was described with respect to FIG. 29. The spring arms 494 and 496 tend to urge the tip 492 against the end of substrate 430 to hold the substrate in place while accommodating changes due to temperature. The spring may be released from the substrate, or moved to the right as viewed in FIG. 32, to permit insertion of the substrate, by means of a retractor pin 500 which may be utilized in the manner described above with respect to pins 474 and 476 in the device of FIG. 30.

As illustrated, in the rest position of alignment spring 491 the tip 492 extends past the location of the substrate 430, (indicated by dotted lines in FIG. 32). It will be understood that when the substrate 430 is in place, the tip of the spring 491 will engage the edge of the substrate, shifting the spring toward the right, as viewed in FIG. 32. The spring arms 494 and 496 will then urge the spring toward the left, against the edge of the substrate to hold it in place.

Figure 33:
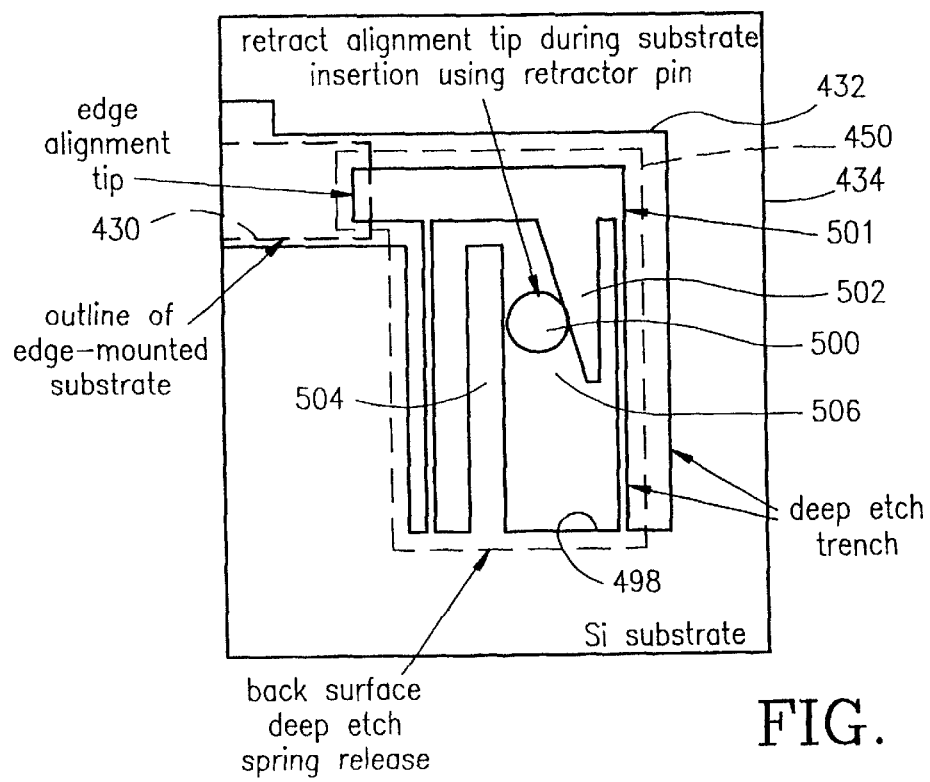

FIG. 33 illustrates at 501 a slightly modified form of the alignment spring of FIG. 32. In this case, the alignment spring 501 includes a shoulder portion 502 which receives the force supplied by retractor pin 500 to move the spring toward the right to permit insertion of substrate 430 or to release the substrate. In this embodiment, pin 500 engages a fixed beam 504 which extends outwardly from wall portion 498 of trench extension 499 in cantilever fashion to provide a support for the retractor pin. The pin may then be moved horizontally into a tapered slot 506 formed between shoulder 502 and beam 504 to shift the alignment spring.

Figure 34:
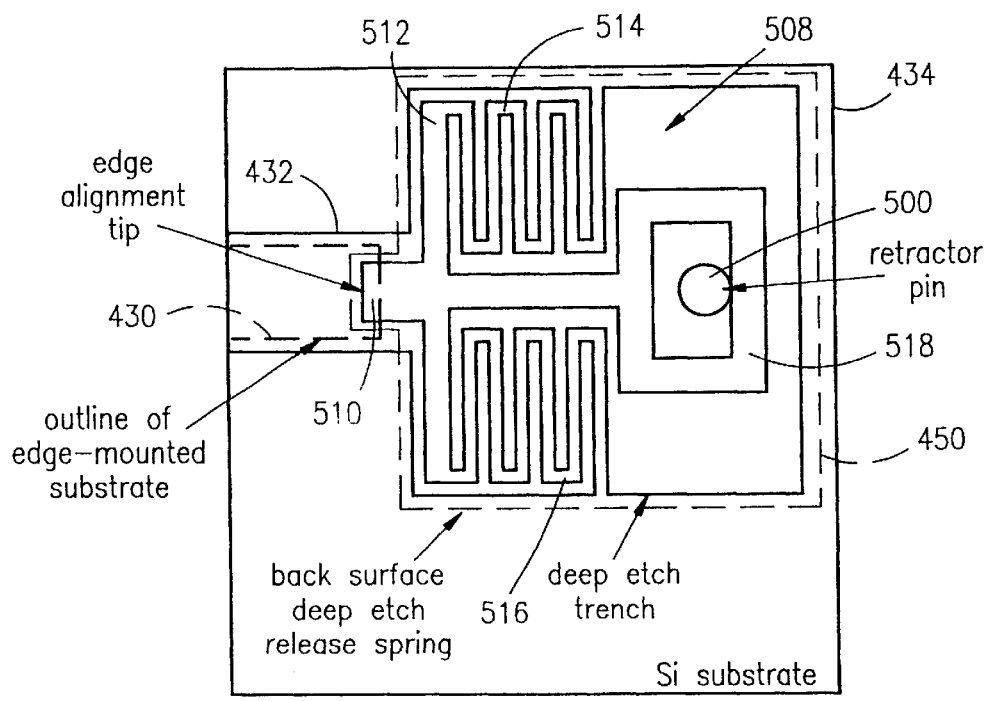

The lateral alignment spring may be fabricated to have the serpentine configuration illustrated for back spring 436 in FIG. 30. Thus, as illustrated in FIG. 34 a lateral alignment spring 508 may include an alignment tip 510 secured on a base 512 mounted to the wall of trench 432 by serpentine springs 514 and 516. The base 512 may also support a retractor ring 518 which receives the retractor pin 500 for shifting the edge alignment tip 510 to the right to permit insertion of a substrate 430 or to release it.

Figure 35:
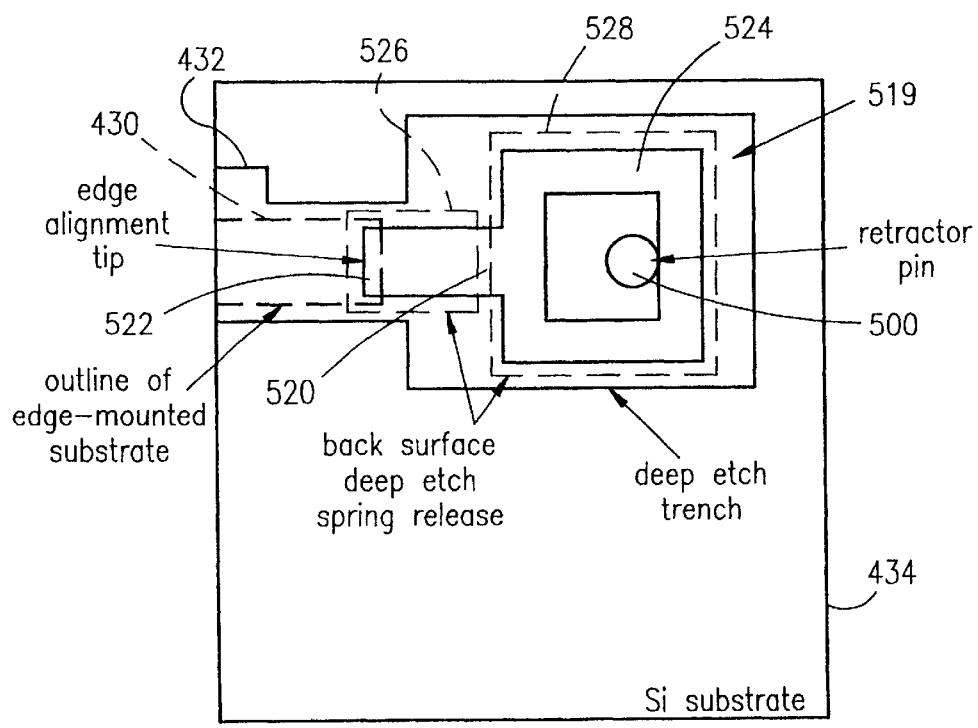

In the embodiment of FIG. 35, a lateral alignment spring 519 is supported by a vertical beam portion 520 extending upwardly from the floor of trench 432 in place of the serpentine springs of FIG. 34. In this embodiment, the spring 519 includes an alignment tip 522 and a retractor ring 524 fabricated in the trench 432 by the SCREAM-1 process described above. The alignment tip 522 is released for motion with respect to substrate block 434 by a back surface deep etch indicated by dotted line 526, while the retractor ring portion 524 is released by a back surface deep etch in the location indicated by dotted line 528. The back surface etching at 526 and 528 are separated by a vertical beam portion 520 which is flexible to allow the edge alignment tip 522 to move in the trench in directions from right to left as viewed in FIG. 35. Retractor pin 500 may be used to engage the ring 524 to press the alignment spring toward the right to permit the substrate 430 to be mounted in trench 432 or to permit its release. The lateral springs of FIGS. 32–33 engage the end of substrate 430 in the manner illustrated by arrow 438 in FIG. 27, or engage the front edges of the substrate in the manner illustrated by arrows 490 in FIG. 31.

Figure 36:
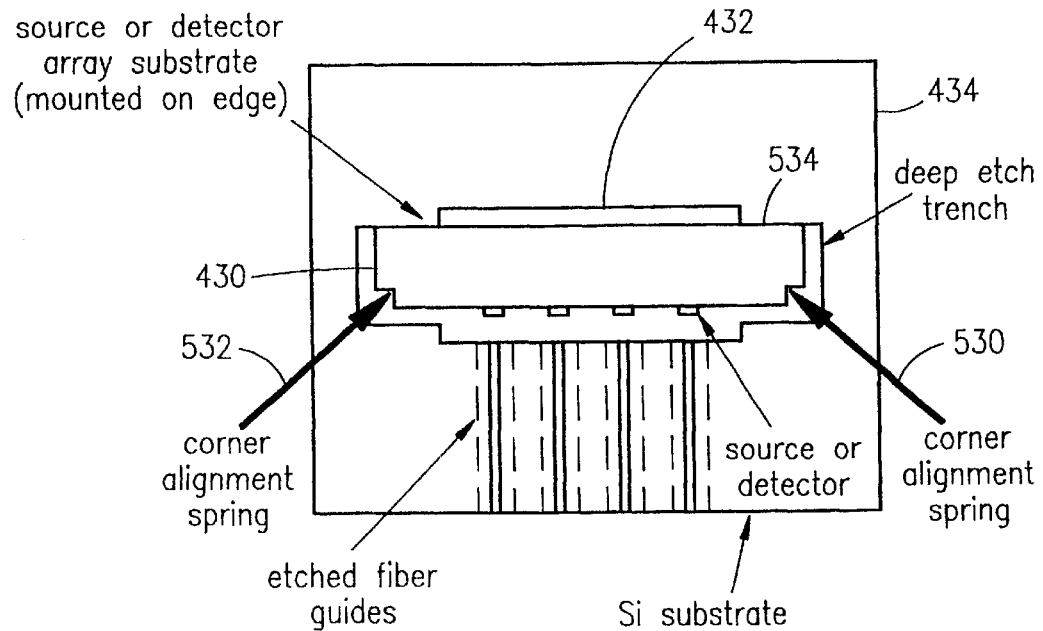
FIG. 36 is a diagrammatic top plan view of a modification of the coupler of FIG. 26, incorporating angled corner alignment springs.

As diagrammatically illustrated in the top plan view of FIG. 36, edge mounted substrate 430 can be secured in trench 432 of coupler block 434 by angled corner alignment springs such as those illustrated by arrows 530 and 532. When corner alignment springs are used, the substrate is urged away from the etched fiber guides on substrate 434 and is held with the back wall 534 of the substrate engaging the wall of trench 432. This eliminates the need for the back wall alignment spring 436 of FIG. 30 and changes the direction of force supplied by the edge alignment springs 438 and 490 of FIG. 31. By placing the back surface 534 of substrate 430 in contact with the coupler block 434, heat transfer from optoelectronic components on the substrate 430 is improved.

Figure 37:
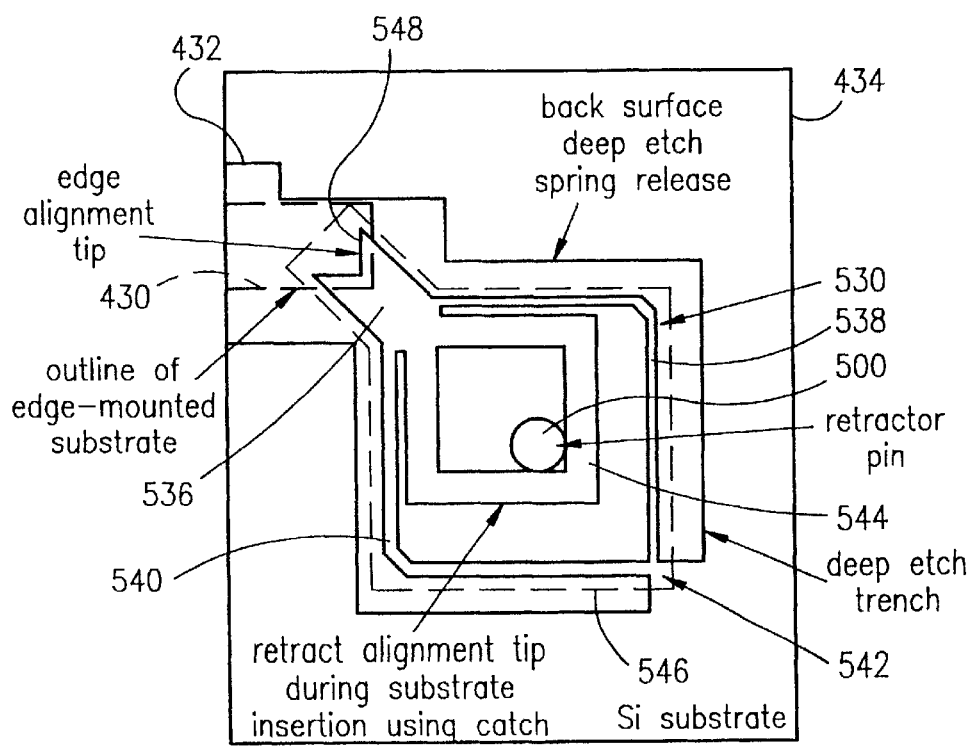
FIGS. 37–39 illustrate in diagrammatic top plan views various corner alignment spring structures for use with the coupler of FIG. 36, FIG. 37 illustrating a box beam corner spring, FIG. 38 illustrating a serpentine corner spring, and FIG. 39 illustrating a serpentine corner spring aligned to notch in an edge-mounted substrate.
Figure 38:
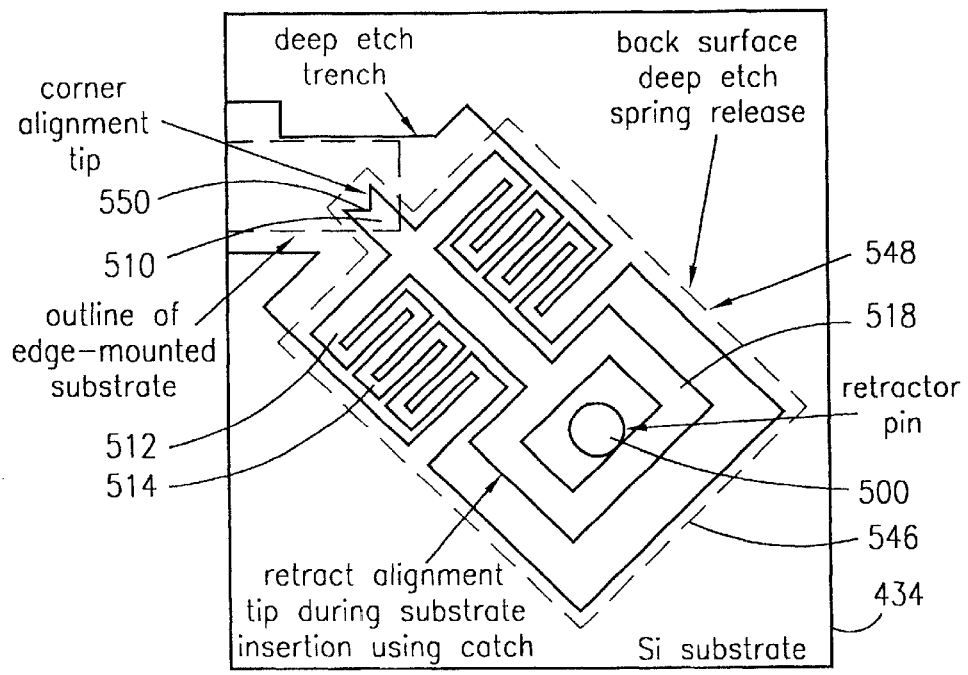
Figure 39:
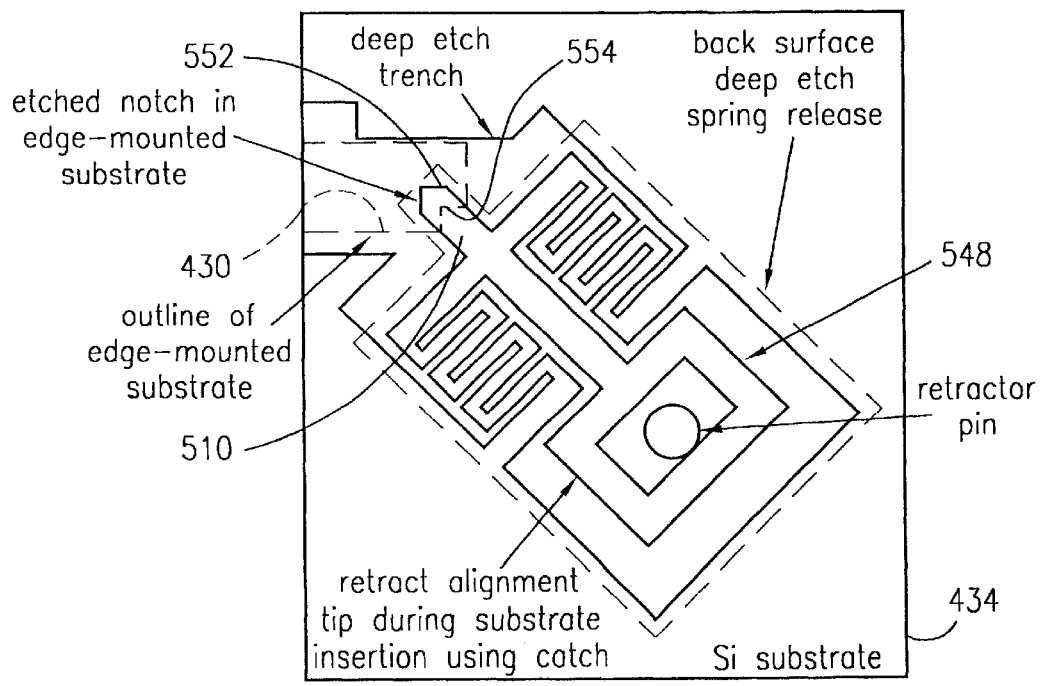

Exemplary corner alignment spring structures are illustrated in top plan view in FIGS. 37, 38 and 39. These are similar to the lateral alignment springs previously discussed, but as noted above, provide an alignment force at an angle against the front and side edges of the substrate. Thus, as illustrated in FIG. 37, trench 432 in coupler block 434 is shaped to receive a corner alignment spring 530 which includes of a corner alignment tip 536 supported by a pair of spring arms 538 and 540 connected in cantilever fashion to the wall of trench 432 in block 434 at 542. The corner alignment spring 530 also includes a retractor ring 544 which may be located within spring arms 538 and 540 and which is adapted to receive the retractor pin 500 for shifting the alignment tip 536 away from the corner of substrate 430. As illustrated by dotted line 546, the alignment spring 530 is released by a rear surface etch in the manner previously discussed. The corner alignment tip 536 is notched as at 548 to engage a forward corner of substrate 430 to ensure proper contact between the alignment tip 536 and the substrate 430.

Another form of the corner alignment spring 530 is illustrated in FIG. 38, at 548 wherein the serpentine spring of FIG. 34 is angled so that its alignment tip 510 engages the front corner of substrate 430. As illustrated in FIG. 38, tip 510 may incorporate a notch 550, as discussed with respect to FIG. 37.

A variation in the structure of FIG. 38 is illustrated in FIG. 39 wherein the corner alignment tip 510 of spring 548 is outwardly tapered, as at 552, to engage a corresponding notch 554 in the front corner of substrate 430. The notch 554 preferably is etched in substrate 430 and can be accurately positioned on the edge-mounted substrate during lithographic patterning so as to provide improved vertical and horizontal alignment of substrate 430 with the optical fibers carried by the coupler block 434. Similarly, the alignment spring 548 is lithographically aligned with the fiber guide structures so that when the alignment spring 548 engages the notch in the substrate 430, precise lateral alignment of the edge-mounted substrate to optical fibers held in the fiber guides is attained.

Another embodiment of the present invention is illustrated in diagrammatic form in the top plan view of FIG. 40, wherein the optical coupler block 434 incorporates alignment trench 432 for receiving the edge-mounted substrate 430 to be secured in alignment with fiber guides 442, as previously discussed. In this embodiment, the substrate 430 is held in alignment by a pair of front surface alignment springs generally indicated at 560 and 562 in place of the previously-described lateral, edge and rear alignment springs. In this embodiment, the springs 560 and 562 engage a front surface 564 of the substrate to press it rearwardly away from the optical guides 442 so that its rear wall 534 is in engagement with a rear wall 566 of the precision etched trench 432. These springs position the substrate and provide heat transfer between the substrate and the coupler block of 434, while allowing expansion and contraction of the substrate 430 due to temperature changes. Lateral alignment of substrate 430 within trench 432 horizontally (toward the left and toward the right as viewed in FIG. 40) and vertically is obtained by precision etching of the front alignment springs 560 and 562 and by providing alignment tips on the springs which engage corresponding alignment notches (or pits) 568 and 570 which are also precision etched on the face 564 of the substrate.

The front alignment springs 560 and 564 may take a variety of forms, as illustrated in FIGS. 41–47, but all incorporate a tapered tip or notch, or both, for ensuring accurate lateral alignment. Thus, for example, in FIG. 41 the front alignment spring 562 incorporates a tapered alignment tip 572 supported in trench 432 by a pair of spring arms 574 and 576. These arms are mounted as cantilevered beams on a wall of trench 432 and are released for motion with respect to coupler block 434 by a deep trench etch on the back side of the block 434, as illustrated by the dotted line 578. The alignment spring 562 may be moved forwardly and rearwardly by the retractor pin 500 to permit insertion of substrate 430 into trench 432, and to release the substrate when desired. The forward end of tip 572 is tapered, as illustrated at 580, so that when it engages notch 570 under the urging of spring arms 574 and 576, the tip laterally aligns the substrate 430 while securing it in position. It will be understood that the alignment spring 560 is preferably a mirror image of spring 562.

The alignment spring 562 is shown in its rest position with the substrate 430 removed from trench 432, although the location of the substrate is indicated in dotted lines. FIGS. 42–47, on the other hand, show the substrate 430 in place and illustrate a variety of front alignment springs engaging corresponding notches on the front surface 564 of the substrate. Thus, for example, in FIG. 42 a modified alignment spring 581 includes a tip 582 which is similar to that of FIG. 41, but is wider and shorter. As illustrated, the tip 582 has a double taper 584 on its forward end to engage both sides of notch 570. The tip is urged toward the substrate by its spring arms 583 for centering the notch and laterally aligning the substrate 430, since the spring arms are flexible toward and away from the substrate, but are relatively inflexible in a direction parallel to the face 564 of the substrate. In FIG. 43, spring 585 includes an alignment tip 586 which has a single taper on its forward end 588 to engage one side of notch 570. This taper tends to press the substrate toward the left, as viewed in this figure, while its corresponding alignment spring on the other end of the substrate will tend to press the substrate toward the right, thereby aligning the substrate.

FIG. 44 illustrates a modified alignment spring 589 carrying an alignment tip 590 having a tapered forward end 592 which tends to press substrate 430 toward the right. This spring operates in cooperation with its corresponding spring on the opposite end of the substrate to laterally align it.

In the embodiment of FIG. 45, spring 593 incorporates an alignment tip 594 having a V-shaped end 596 which engages a locator beam 598 extending outwardly from the base of notch 570, the V-shaped end tending to align substrate 430 by engaging beam 598.

In FIG. 46, the alignment spring 599 incorporates a tip 600 which has a flat forward end 602. In this case, the notch 570 is V-shaped so that it provides outwardly tapered walls which are engaged by spring tip 600 to laterally align substrate 430. Finally, in FIG. 47, the alignment spring 603 incorporates an alignment tip having a double taper on its forward end 606 which engages a V-groove notch 570 to provide lateral alignment of substrate 430.

In the foregoing embodiments, the alignment tips for the forward surface alignment springs are keyed to corresponding notches in the edge-mounted substrate 430 so that variations in etched sidewall positions for both the alignment tip and the notch are automatically compensated for, since the tapered alignment tip always centers on the etched notch. As noted above, the alignment springs are designed to be relatively stiff in the lateral direction, although some flexibility is required to allow for the effects of thermal expansion.

The alignment structures described above in FIGS. 28–39, for example, provide lateral alignment of the edge-mounted substrate in a plane parallel to the surface of the coupler block 434. This alignment is from left to right or from front to back in the top plan views of these figures, as described above. Alignment of the substrate in coupler block 434 in a direction perpendicular to the surface of block 434 is determined in the foregoing embodiments by the depth of the deep etch trench and by precision cleaving of the edge-mounted substrate for determining the precise dimensions of the substrate. However, by etching notches in the edge-mounted substrate, alignment springs can provide both lateral alignment in the plane of the top surface of the optical coupler block and alignment in a direction perpendicular to that surface. FIG. 48 illustrates a structure for lateral and perpendicular alignment of an edge-mounted substrate such as substrate 430 in a coupler block 434, and is a perspective cutaway view of the coupler, illustrating trench 432 formed in block 434 to receive substrate 430 and to receive alignment springs such as those generally illustrated at 620 and 622. As illustrated, alignment spring 620 includes an alignment arm 624 mounted in trench 432 by flexible spring arms 626 and 628, the arms being positioned to urge alignment arm 624 in a direction to engage the edge-mounted substrate 430 to hold the substrate in place within the trench 432. In this embodiment, the substrate 430 incorporates an etched notch 630 which receives a tip portion 632 of arm 624 to align the substrate 430 both horizontally, in the plane of the top surface 634 of block 434, and vertically, in a direction perpendicular to the plane of surface 634.

The alignment spring 620 is fabricated in the silicon block 434 utilizing the SCREAM-1 process, for example, and is released for motion with respect to block 434 by a back side deep etch, generally indicated by cavity 640 formed through the back surface 642 of block 434. It will be understood that the alignment spring 620 can be retracted by a suitable spring retractor pin 642 to withdraw tip 632 from notch 630 to release the substrate 430.

Spring 622 may be a mirror image of spring 620, if desired, but for purposes of illustration it is shown as incorporating a support 644 carrying an alignment arm 646 having a tip 648 which engages a notch 650 in the end of substrate 430. The support 644 is carried by a pair of spring arms 652 and 654 which are mounted in cantilever fashion to the side wall of trench 432. These spring arms 652 and 654 are released for motion with respect to coupler 434 by a back side deep etch, indicated at 640, as previously described. The spring arms 650 and 652 urge the tip 648 into engagement with notch 650 and may be retracted by a retractor pin engaging the support 644. The notches 630 and 650 are carefully located on the substrate 430 to position the substrate vertically for alignment with optical fibers, as previously described, and to align the substrate horizontally side to side and front to back in the plane of the top surface 634 of coupler 434 so that the substrate is precisely and positively positioned in the coupler.

FIGS. 49–57 show several different edge-mounted substrate notch designs which may be used with the alignment springs of the device illustrated in FIG. 48. In FIGS. 49–52, edge notches 660, 662, 664 and 666, respectively, are illustrated. Notch 660 is shown without a taper, and thus is similar to notches 630 and 650 in FIG. 48. Notches 662, 664 and 666 include one or more tapered surfaces which serve to guide the spring-loaded alignment tips of the alignment springs so that the edge-mounted substrate 430 will be aligned with the middle, top, or bottom of the alignment tip. For example, notch 664 provides accurate alignment with the top surface of an alignment tip and may be incorporated in an edge-mounted substrate which is designed to be aligned with a surface substrate waveguide.

As illustrated in FIGS. 53–57, the edge notches can be extended to provide alignment ramps which engage the corresponding spring alignment tips as the substrate 430 is inserted into the trench 432. Thus, an alignment ramp 670 is provided for each of the notches 660, 662, 664 and 666 to guide the alignment tips into the notches as the substrate 430 is pressed downwardly into the trench 432. The location of the alignment ramp 670 is illustrated in FIG. 48 by a dotted line on the end surface 656 of the substrate. This ramp arrangement reduces the number of retractor pins required, thereby simplifying assembly of the substrate and the coupler. In the embodiments of FIGS. 54–57, an integrated shoulder is provided to serve as a catch for the alignment spring tip to hold the substrate 430 captive after assembly. Middle, top and bottom surface alignment tapers for the notches can be used, as also illustrated in FIGS. 50–52.

If desired, the notches 630 and 650 can be moved away from the edge of substrate 430, either onto the end wall 656 or onto the front surface 564 (FIGS. 40 and 48). If the notches are placed on the end wall 656, they will be engaged by end alignment springs 620 and 622, whereas if they are placed on the front surface 564, they may be engaged by alignment springs such as spring 562 illustrated in FIG. 41. End or front surface notches on substrate 430 are illustrated in FIGS. 58–67 as being located on end surface 656. In each of the illustrated embodiments, a surface notch 680 is connected to a tapered alignment trench 682, as shown, for example, in FIG. 58. The alignment trench is tapered inwardly and upwardly from the bottom edge of the substrate 430 to the notch 680. In each of the embodiments illustrated in FIGS. 58–67, the alignment trench guides the alignment spring tip into the corresponding notch, with most of the illustrated embodiments incorporating a shoulder, or catch 684 (See FIG. 59) which secures the tip in place. One advantage of utilizing the trenches of FIGS. 58–67 instead of the notches of FIGS. 49–57 is that the trenches are less likely to suffer damage during cleaving of the substrate 430.

The notch and trench configuration of FIG. 62 is illustrated in perspective view in FIG. 68. In this embodiment, the notch is located on the front surface 564 of substrate 430 and receives a tapered alignment tip 686 mounted on an alignment spring structure such as that illustrated in FIG. 41. In this embodiment, when the substrate is pressed into trench 432, the alignment tip 686 enters the alignment trench 682 and slides upwardly into the notch 680 where it latches over the shoulder 684 to prevent removal of the substrate. This arrangement positions the substrate both vertically and horizontally within trench 432, as discussed above.

The tapered alignment tip 686 (FIG. 68) automatically compensates for variations in etched notch locations, and FIGS. 69–72 illustrate several etched trench and notch designs for use with tapered alignment tips. Thus, for example, FIG. 69 illustrates a tapered notch 690 which is V-shaped in cross section to engage the tapered tip 686. An alignment trench 692 leads to the V-shaped notch, 690 to guide the alignment tip 686 into place as the substrate 430 is positioned in trench 432. In similar manner, FIGS. 70, 71 and 72 illustrate variations in the V-shaped notch 690 for receiving and securing the alignment tip 686. These variations are illustrated at 694, 696 and 698, respectively, and illustrate that the V-groove notch can be combined with deep or shallow etches to create alignment channels which provide middle, bottom and top substrate alignment.

FIG. 73 is a perspective view of the bottom alignment v-groove arrangement of FIG. 71, wherein a deep etch tip stop 700 provides bottom alignment for an alignment tip 702 mounted on a spring arm 704. The alignment tip 702 has a square end that is aligned horizontally by the V-groove 696 and vertically by the tip stop 700. A shallow etch tip guide 706 guides alignment tip 702 into the groove 696 as the substrate 430 is inserted into trench 432.

As illustrated in the top view of FIG. 74, wherein a top portion of the substrate 430 is cut away to illustrate alignment notch 710 on the face of the substrate, the notch 710 is etched isotropically so that the width of the trench at the surface of substrate 430 is narrower than the width of the trench at its bottom. With this arrangement, an outwardly flared alignment tip 712, mounted on spring arm 714, can be inserted into the trench from a downwardly extending tip guide trench so that the notch will hold the alignment tip captive upon complete insertion. FIG. 75 shows a smaller version of the alignment notch of FIG. 74, with a notch 716 being smaller in width than the notch 710 and an alignment tip 718 being smaller than the alignment tip 712. FIGS. 76 and 77 illustrate two forms of the notch 710, and show how the front surface width 720 is narrower than the rear width 722 (shown in dotted lines). In the configuration of FIG. 77, the notch includes a shoulder portion 724 for securing the alignment tip. FIG. 78 is a partial perspective view of the alignment trench 710 of FIGS. 74 and 76.

As illustrated in FIGS. 79–84, the alignment tips described above can be provided with one or more burrs fabricated at the ends of the tips to provide permanent attachment of the edge-mounted substrate 430 to the optical coupler. As illustrated in FIG. 79, for example, alignment tip 730 may be provided with burrs 732 and 734 attached at the forward end 736 of the tip 730 and extending outwardly and rearwardly. When the tip is inserted into a notch, or etched trench, 738 formed in the face of an edge-mounted substrate 430, the rearwardly and outwardly extending burrs will engage the side walls of the trench to prevent removal of the tip. The notch, or trench, 738 can be etched isotropically to have flared walls 742 as illustrated in FIG. 79, may have perpendicular walls as illustrated at 744 in FIG. 80, or may have outwardly tapered walls 746 as illustrated in FIG. 81. FIGS. 82, 83 and 84 illustrate rearwardly and outwardly extending burrs 748 on both sides of tip 750, or on the right hand or left hand edges of the tip 750, respectively.

Figure 92:
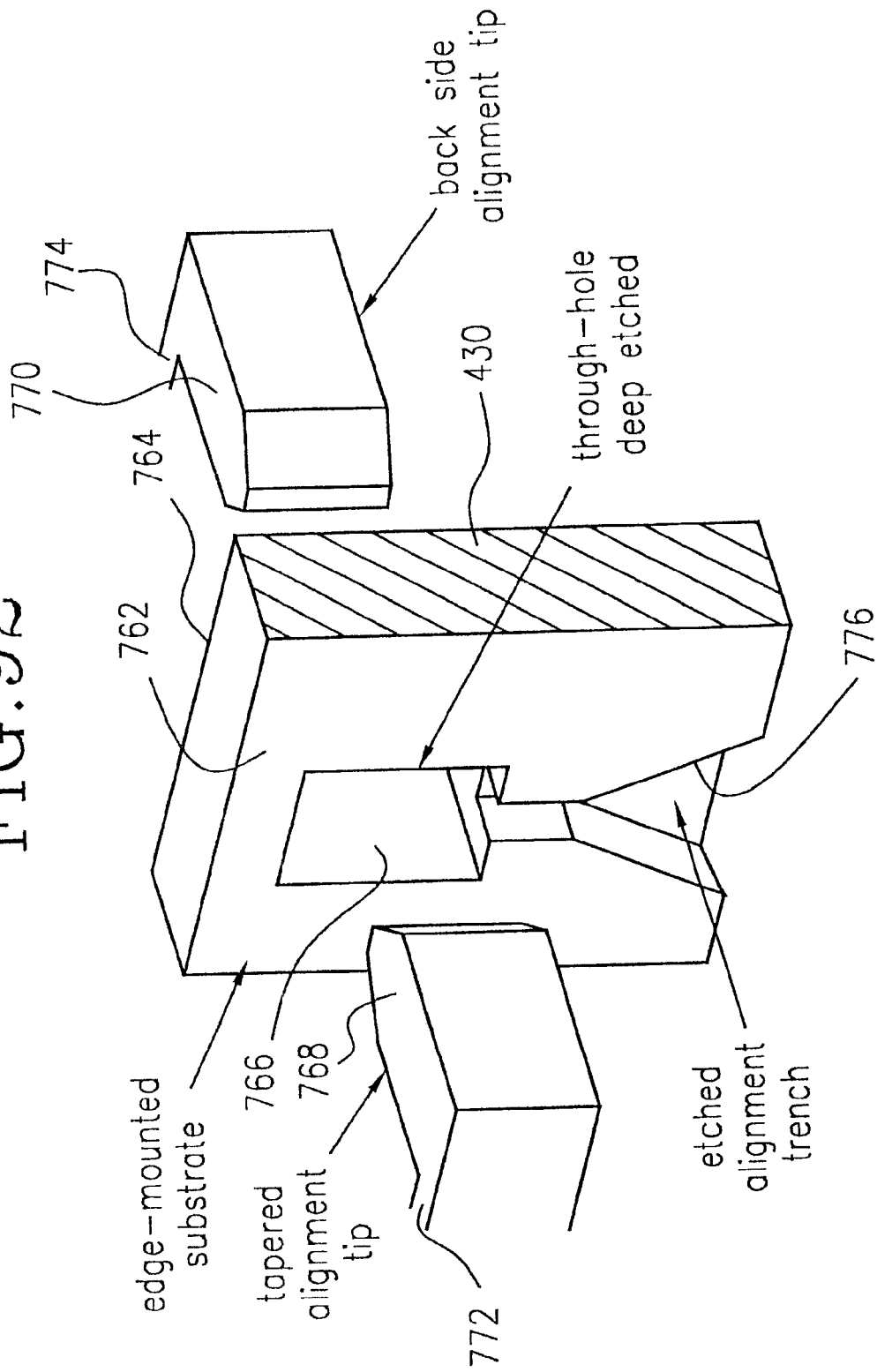
FIG. 92 is a diagrammatic perspective view of the device of FIG. 86, having a through-hole engaged by front and rear surface tapered alignment tips.

FIG. 85 is a perspective view of the device of FIG. 79, illustrating how a burred alignment tip would meet with a slightly isotropically etched alignment trench on the surface of an edge-mounted substrate. This figure also illustrates an optional through hole 760 extending from the forward surface 762 of substrate 430 to the rear surface 764. If a through-hole such as the hole 760 is etched in the substrate 430, alignment tips can be used to support the substrate from both sides, as illustrated in FIG. 86. This approach would be useful if the edge-mounted substrate is to be mounted so that it is free from contact with the sidewalls of trench 432, as might be the case if the substrate 430 were to be attached to a micropositioner or a micromotor for optical alignment or switching. Thus, for example, in FIG. 86 the substrate 430 is provided with a through-hole 766 which is engaged at the front surface 762 of substrate 430 by a first alignment tip 768 and which is engaged at the rear surface 764 by a rear alignment tip 770. In this embodiment, both alignment tips are mounted by corresponding spring arms 772 and 774, respectively, to the edge wall of trench 432, as previously discussed. As illustrated in FIG. 87, flared alignment trenches 776 on the front and back surfaces of substrate 430 may lead to the etched through-hole 766 to facilitate assembly of the substrate 430 with the alignment tips 768 and 770. FIGS. 88–91 illustrate a variety of shapes for through-holes 780, 782, 784 and 786, respectively, each of which is connected to an alignment trench for guiding the alignment tips into place. FIG. 92 is a perspective view of the device of FIG. 86, with common features carrying common identifying numerals.

Figure 93:
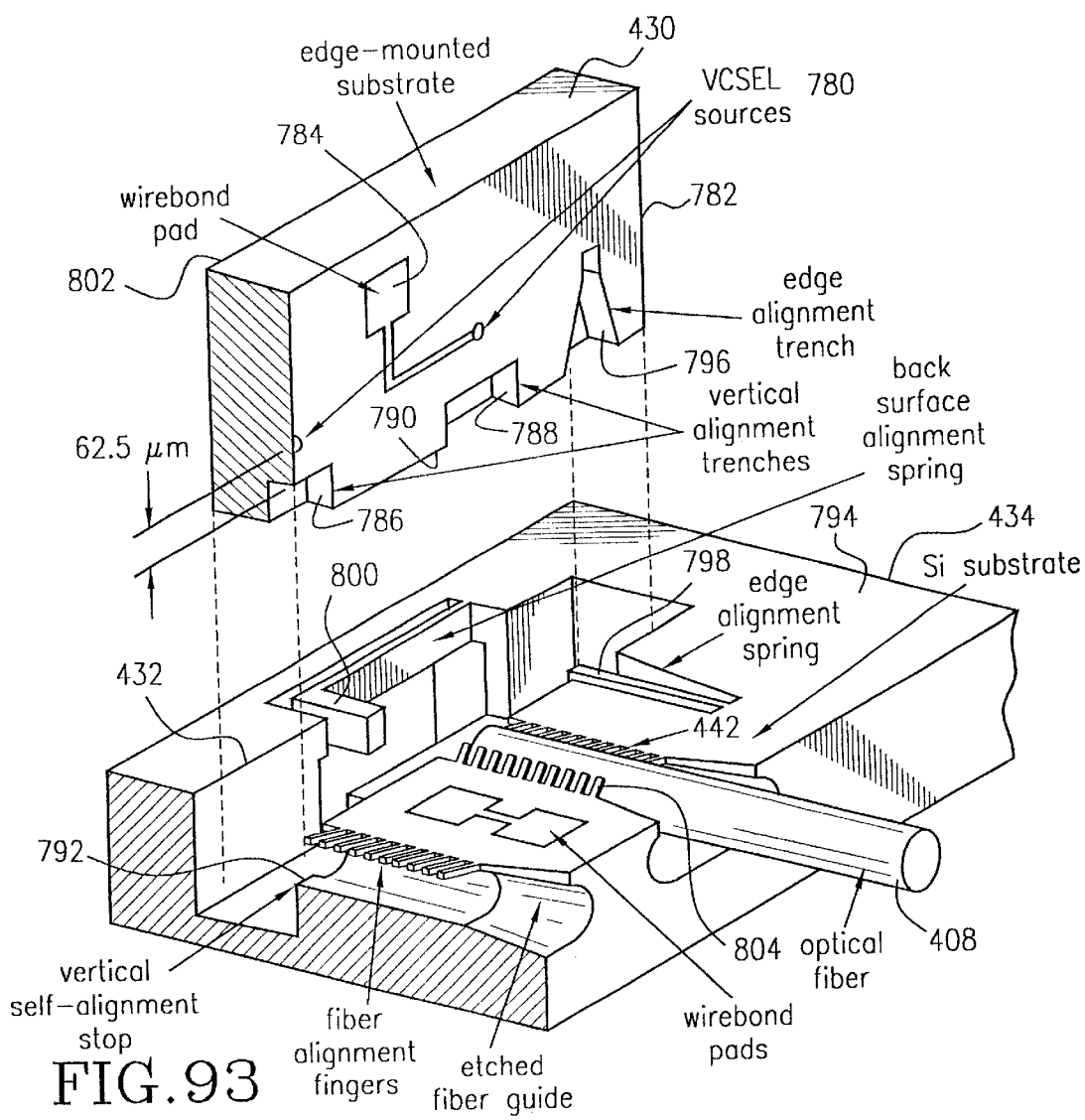
FIG. 93 is a diagrammatic, perspective, exploded view of a modification of the coupler of FIG. 28, illustrating vertical alignment trenches for receiving alignment stops and front and rear surface alignment trenches for receiving corresponding alignment springs, and incorporating the optical fiber alignment fingers of FIG. 18.

Another modification of the coupler of FIG. 28 is illustrated in FIG. 93, to which reference is now made. As previously discussed, the coupler block 434 includes a trench 432 for receiving an edge mounted substrate 430. The substrate 430 carries a plurality of active elements such as VCSEL sources 780 mounted on a front surface 782 of substrate 430, each of the VCSEL sources being connected to a corresponding wire bond pad 784 mounted on front surface 782 in the manner described hereinabove. The coupler block 434 incorporates a plurality of etched fiber guides 442 which receive optical fibers 408, as previously described. To align the VCSEL sources with the corresponding fiber optics in this embodiment, the substrate 430 incorporates a plurality of vertical alignment trenches 786 and 788 formed on the lower edge 790 of the substrate. These vertical alignment trenches engage corresponding self alignment stops such as the stop 792 formed in the trench 432 to align the VCSEL sources in a direction perpendicular to the top surface 794 of coupler block 434. Horizontal alignment of substrate 430 is provided by an edge alignment trench 796 such as that described with respect to FIG. 58 for receiving an edge alignment spring 798 carried by coupler block 434. As illustrated, the coupler block also carries a back surface alignment spring 800 for engaging corresponding alignment trench in the back surface 802 of substrate 430 in the manner described above. In this embodiment, the optical fibers 408 are secured in the etched fiber guides 442 by means of fiber alignment finger springs 804, such as those described at 352 and 354 in FIG. 18. In addition, coupler block 434 preferably incorporates a plurality of wire bond pads such as the pads 428 of FIG. 26.

Figures 94, 95:
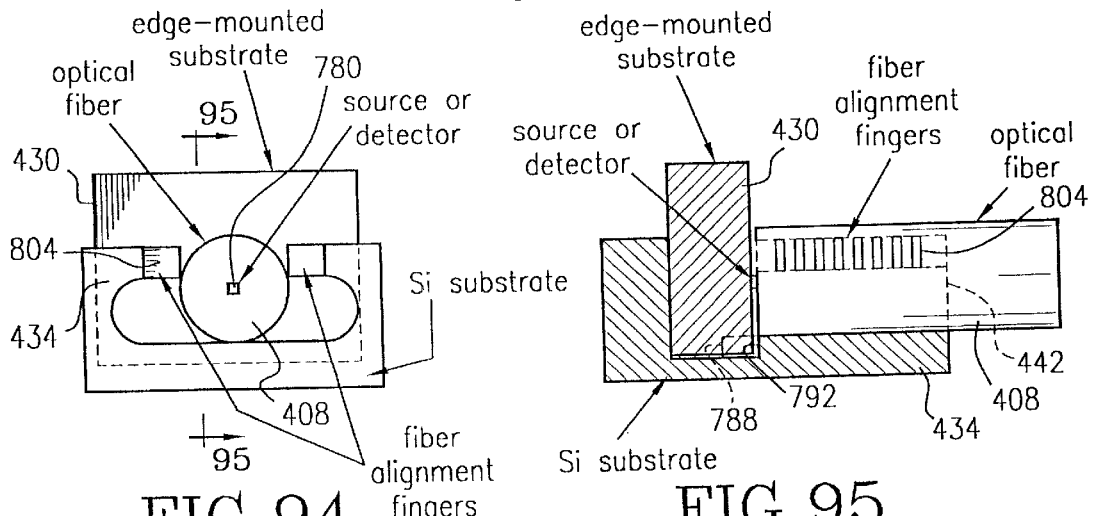
FIG. 94 is a side elevation of a portion of the device of FIG. 93.
FIG. 95 is a cross-sectional view taken at line 95—95 of FIG. 94.

The fiber alignment fingers 804 grip the optical fiber to secure it in place. Although these fingers are illustrated as being relatively thin and flexible, it will be understood that deeper alignment fingers may be provided, such as the fingers 806 and 808 illustrated in FIG. 94. Since the active elements 780 can be placed below the top surface 794 of coupler 434, in accordance with the present invention, the fiber guides 442 can be sufficiently deep that the fingers 804 will secure the fibers 408 in place, as illustrated in FIGS. 94 and 95. As illustrated in dotted lines, the bottom edge notch 788 rests on a vertical self-alignment stop 792 fabricated during the same etch that is used to create the fiber guide 442.

Figure 96:
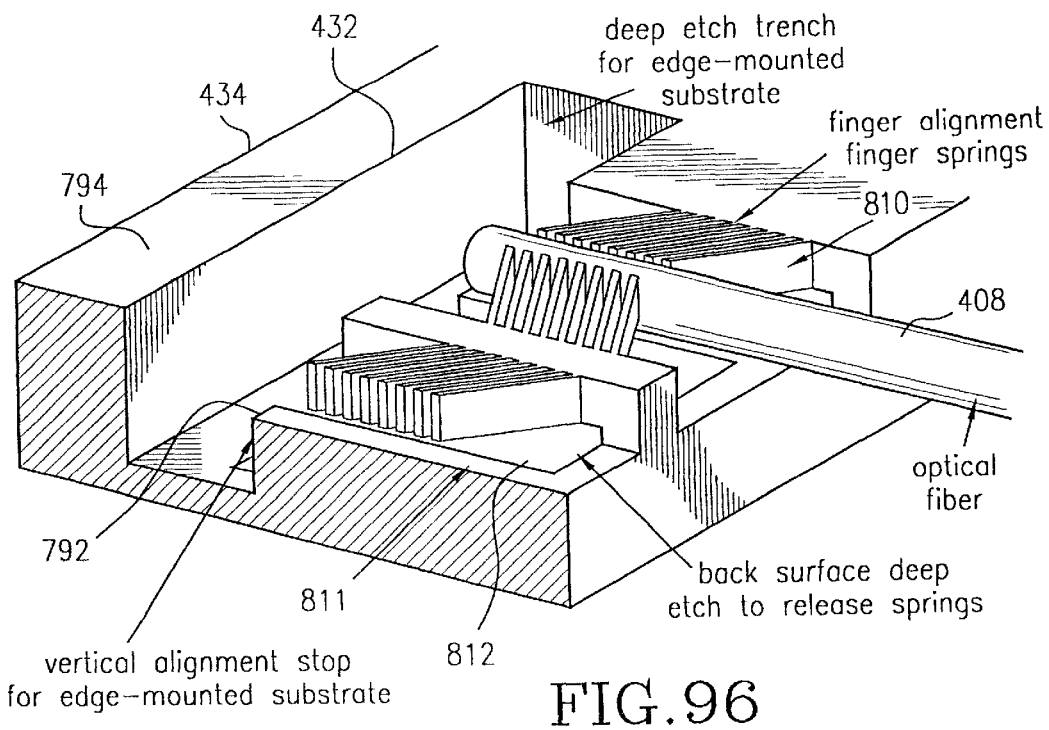
FIG. 96 is a diagrammatic partial perspective view of a modification of the device of FIG. 93.
Figure 97:
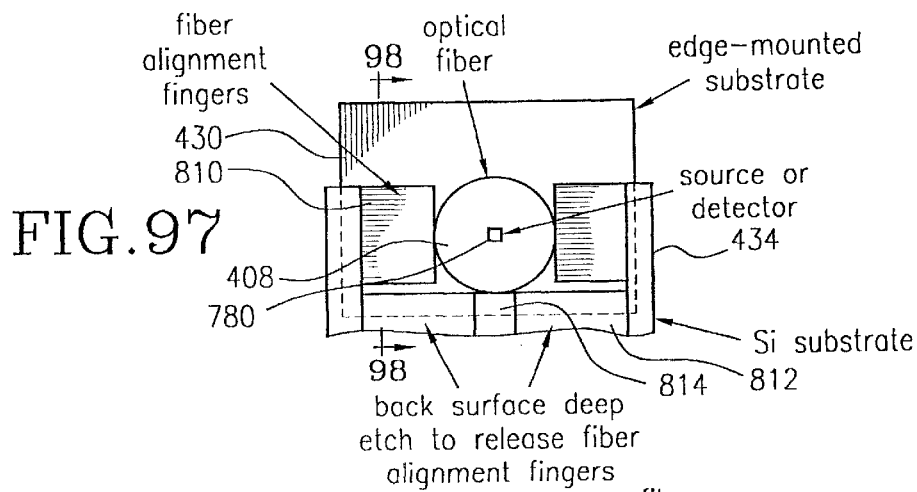
FIG. 97 is a side elevation of the device of FIG. 96, illustrating the modified fiber alignment finger springs.
Figure 98:
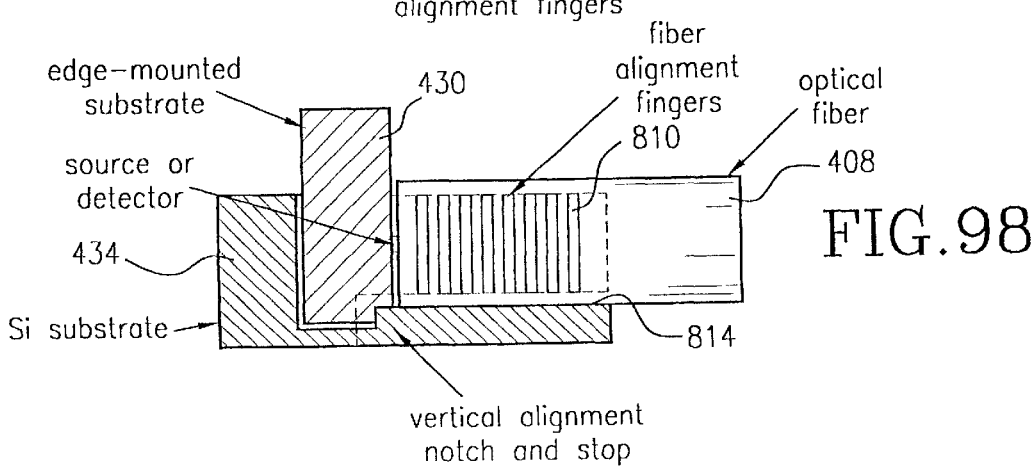
FIG. 98 is a cross-sectional view taken along lines 98—98 of FIG. 97.

As previously described, the alignment fingers 804 are fabricated utilizing the SCREAM-1 process for undercutting and releasing cantilevered beams. An alternate structure for the fiber alignment finger springs and the vertical alignment stop is illustrated in FIGS. 96, 97 and 98. In this arrangement, the coupler block 434 is etched through the top surface 794 to form a multiplicity of fiber alignment finger springs 810. These fingers are then released by a back surface etch 812 which leaves a bottom fiber guide wall 814. The fingers have high aspect ratios so as to be flexible in the horizontal direction and relatively inflexible in the vertical direction, to enable them to receive and secure optical fibers 408. It will be noted that in this process the vertical alignment stop 792 is fabricated during the isotropic etch used to form the fingers 812 and the underlying fiber guide 814.

Figure 99:
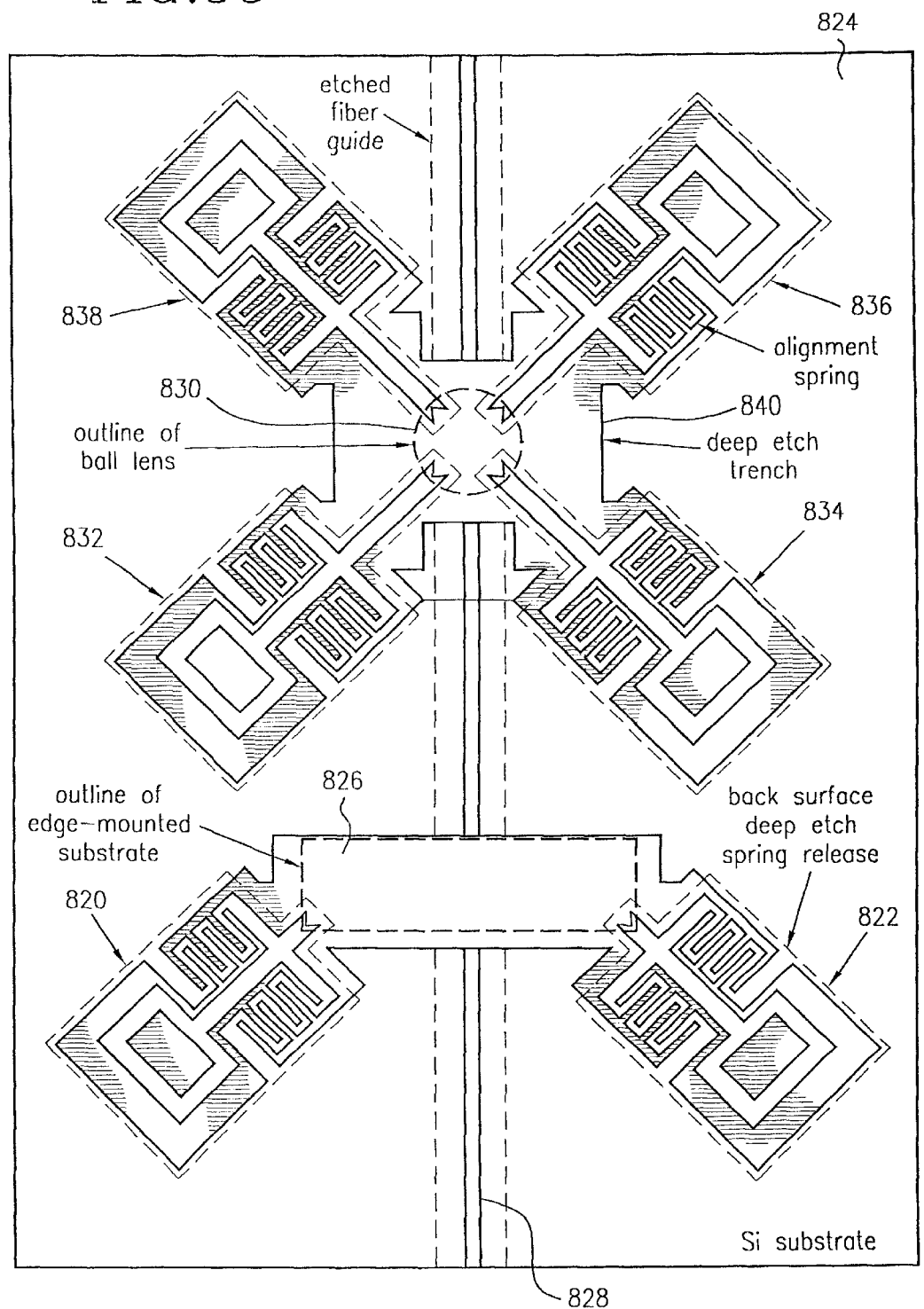
FIG. 99 is a top plan view of an optical coupler having several components aligned with each other.

In addition to securing edge-mounted substrates in a coupler block, it will be apparent that the alignment springs of the present invention can be utilized to secure a variety of components on a substrate. Thus, for example, as illustrated in FIG. 99, alignment springs 820 and 822 may be fabricated in the surface of a coupler block 824 in the manner described above with respect to FIG. 38 to secure an edge-mounted substrate 826 in alignment with an etched fiber guide 828. In this case, the fiber guide may also be aligned with a ball lens 830 secured by 4 additional alignment springs 832, 834, 836 and 838 located in a corresponding deep etch trench 840. Other components may similarly be aligned with each other and with etched fiber guides, utilizing any of the alignment spring configurations described herein. Thus, for example, FIG. 100 illustrates another embodiment wherein a substrate 840 is mounted parallel to the top surface 842 of a coupler block 844 by a plurality of alignment finger springs 846 and 848. The substrate 840 may be held in alignment with an etched fiber guide 850 which is also aligned with a GRIN lens 852, also held in place by alignment finger springs 854 and 856. In this embodiment the optical fiber carried in etched fiber guide 850 may be secured in place by a suitable epoxy. For this purpose, a trench 862 is provided in the top surface 842 intersecting the path of the fiber guide 850 so that when the optical fiber is in place, epoxy can be poured into the trench to hold the fiber in place.

FIGS. 101–107 illustrate various electrical interconnections between edge-mounted substrates such as the substrate 430 and optical coupler blocks such as the block 434 described above. Optoelectronic devices require reliable electrical connections, and the edge-mounted substrates present unique challenges because they deviate from the planar mounting approach which dominates electronic packaging. The techniques described in FIGS. 101–107 are applicable to the various configurations described hereinabove, as well as to other electronic packaging techniques.

Wire bonding is commonly used to provide connections between chips and their packages. This approach is modified for edge-mounted substrates by a bonding technique that connects surfaces which are at right angles to each other, as illustrated in FIG. 101. In this case, the edge-mounted substrate 430 and the optical coupler block 434 carry corresponding connector pads 870 and 872 which are interconnected by an L-shaped wire bond connector 874. In conventional manner, connector 874 is secured to pads 870 and 872 by solder droplets 876 and 878, respectively.

Flip-chip solder ball interconnections are becoming more common in electronic packaging, and a variation on the standard method can be used for edge-mounted substrates. Thus, as illustrated in FIG. 102, in place of the wire bond connection of FIG. 101, solder balls 880 and 882 are initially deposited on the connector pads 870 and 872, respectively, located on the edge-mounted substrate 430 and the connector block 434. The solder balls on the substrate can then be reflowed with the substrate 430 assembled in the connector block 434, as described above, so that the two solder balls melt together to form an electrical connection as generally indicated at 884 in FIG. 103. The geometries of the solder ball volume and of the connector pad are adjusted to minimize the effects of thermal expansion.

If desired, stresses due to thermal expansion can be relieved by mounting the solder ball interconnection for the coupler block 434 on a released cantilevered beam spring 890. The spring may move with the expanding or contracting edge-mounted substrate during temperature changes to thereby relieve stress on the solder connection. The beam can also be formed with a serpentine stress-relieving spring along its length to compensate for changes in length due to expansion or contraction of the edge-mounted substrate.

Figure 105:
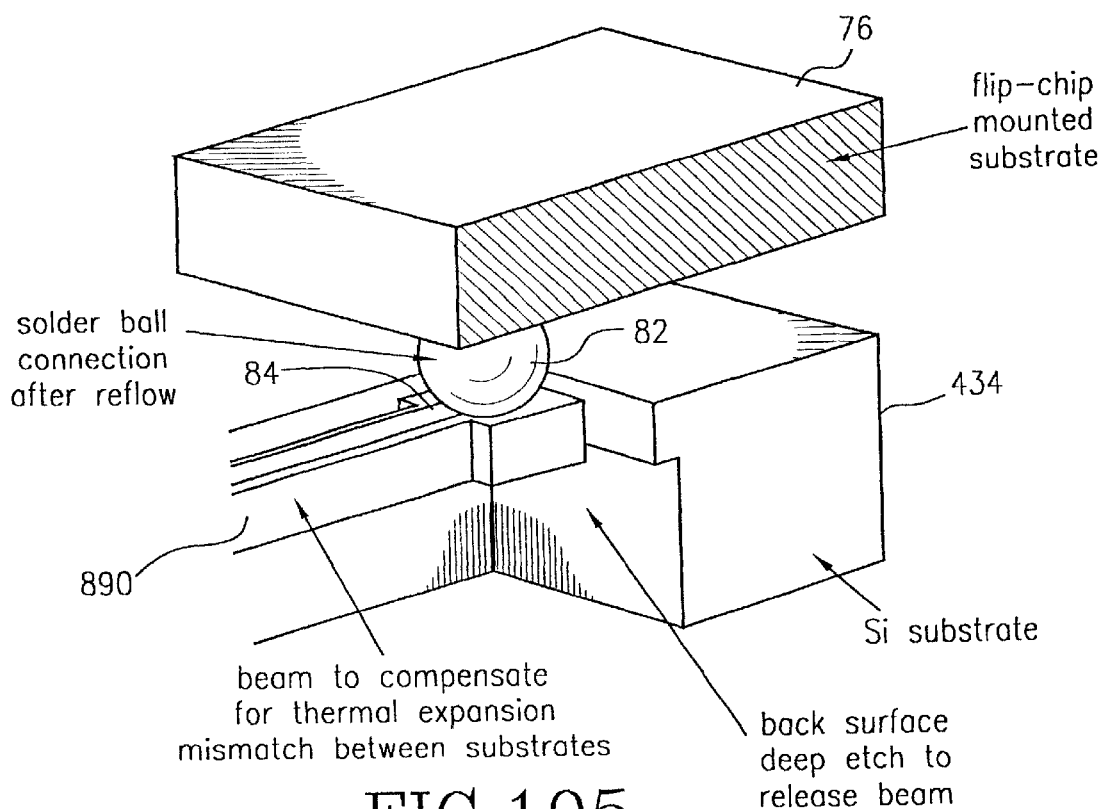

As illustrated in FIG. 105, the stress-relieving beam 890 may also be used in the flip-chip mounted substrates illustrated in FIG. 4, for example, with the beam 890 supporting a flip-chip mounted substrate such as the substrate 76. In this case, the solder ball 82 of the device of FIG. 4 is secured to pad 84 mounted on beam 890.

Figure 106:
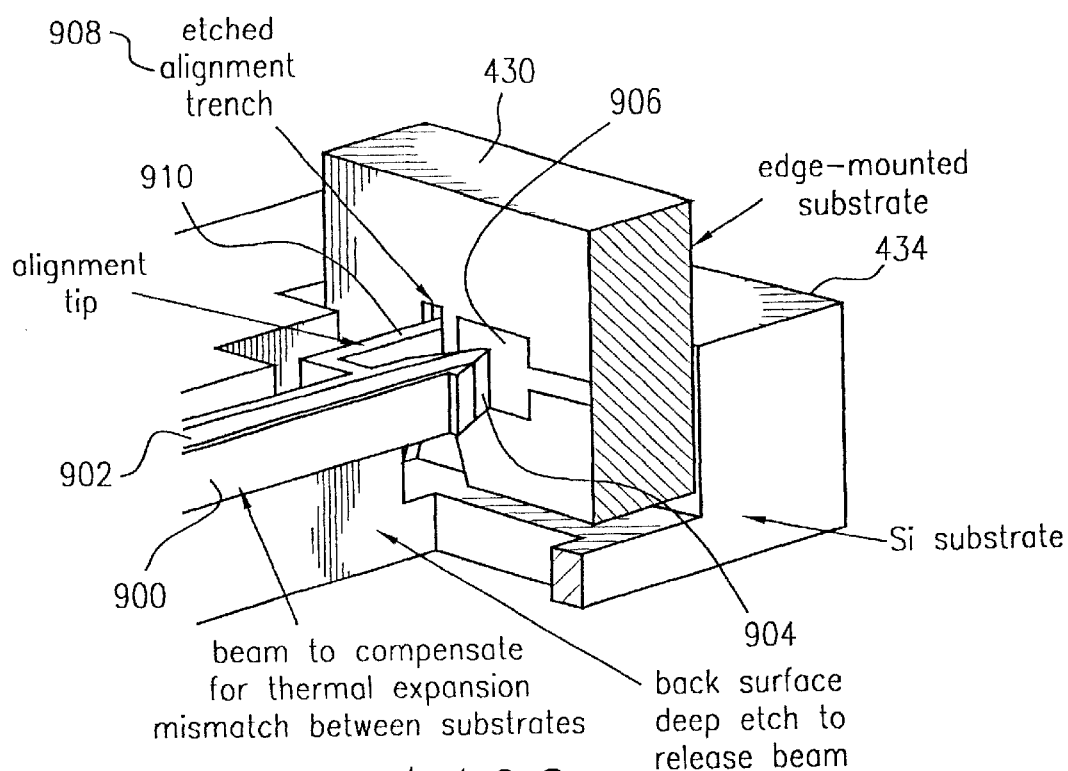

Electrical contacts between edge-mounted substrates and the receiving optical coupler block 434 can be created by metallizing a flexible released beam 900, as illustrated in FIG. 106, the metal layer forming a connector lead 902 which covers a tip of the beam to form a metal tip 904. This metal tip may contact a metallized pad 906 on the surface of substrate 430 to provide the desired electrical connection. The beam then compensates for differences in thermal expansion between the substrate 430 and the coupler block 434. The SCREAM-1 process provides metalization on the tops and side walls of released beams without electrical contact to the underlying silicon of the coupler block 434, thereby allowing the side walls of the tip 904 to be metallized to provide a reliable connection. Since thermal expansion effects would tend to drag the tip contact over the surface of pad 906, an etched alignment trench 908 can be provided in the surface of substrate 430. An alignment tip 910 may then be fabricated on the contact beam 900 to engage the trench 908 to stabilize the contact point and to prevent the beam from shifting with respect to the substrate 430.

Thus, there has been described a unique electronic packaging system for interconnecting fiber optics with waveguides, active optical elements, and other optical components mounted on a coupler block. Although the application of the principles of the present invention have been illustrated in numerous embodiments, various other modifications will be apparent to those of skill in the art. Accordingly, the present invention is limited only by the following claims.

What is claimed is:

1. An optical coupler comprising:
   a coupler block including a body portion having a top surface and first and second end surfaces;
   at least one fiber guide extending through said body portion beneath said top surface and between said end surfaces, said fiber guide comprising:
      first and second spaced walls defining a trench having a narrow width and extending across said top surface and into said body portion, said trench walls being flared apart from each other at at least one of said first and second end surfaces;
      a guide cavity within said body portion beneath and in communication with said trench, said cavity having a minimum dimension equal to or slightly greater than the diameter of an optical fiber to be received by said coupler, said guide cavity dimension being greater than the width of said trench, said cavity flaring outwardly at at least one of said first and second end surfaces to facilitate insertion of an optical fiber into the cavity; and means for transferring light carried by an optical fiber in said guide cavity to an optical element.

2. The optical coupler of claim 1, wherein said optical element is a second fiber guide for receiving a second optical fiber axially aligned with said first fiber guide.

3. The optical coupler of claim 2, further including a flared end portion for each fiber guide for facilitating the insertion of optical fibers.

4. The optical coupler of claim 3, wherein said block is single crystal silicon and wherein said fiber guides are etched in said block.

5. The optical coupler of claim 4, wherein said at least one fiber guide and said second fiber guide comprise a fiber guide pair, and wherein said coupler block includes a multiplicity of fiber guide pairs for coupling optical fiber arrays.

6. The optical coupler of claim 2, wherein said at least one fiber guide and said second fiber guide are etched trenches in said block.

7. The optical coupler of claim 1, wherein said optical element is located on a substrate edge-mounted in said optical block.

8. The optical coupler of claim 1, wherein said optical element is a waveguide.

9. The optical coupler of claim 1, wherein said optical element is an active element.

10. The optical coupler of claim 1, wherein said optical element is a substrate surface mounted on said block.

11. The optical coupler of claim 1, wherein said means comprises an elongated trench in said block between said fiber guide and said optical element.

12. The optical coupler of claim 1, wherein said means comprises a reflector integral with said block.

13. The optical coupler of claim 1, wherein said means comprises a waveguide having a first end aligned with said fiber guide and a second end aligned with said optical element.

14. The optical coupler of claim 13, wherein said waveguide is embedded in said block.

15. The optical coupler of claim 13, wherein said waveguide is located on the surface of said block.

16. The optical coupler of claim 1, wherein said optical element is a second fiber guide coaxial with said at least one fiber guide for receiving a corresponding optical fiber, and wherein said means for transferring light includes an intermediate guide portion between said fiber guides, and further including a fiber stop in said intermediate guide portion.

17. The optical coupler of claim 16, further including a flared end portion for each fiber guide for facilitating the insertion of optical fibers.

18. The optical coupler of claim 17, wherein said block is single crystal silicon and wherein said fiber guides and said intermediate guide portions are etched in said block.

19. The optical coupler of claim 18, wherein said at least one fiber guide and said second fiber guide comprise a fiber guide pair, and wherein said coupler block includes a multiplicity of fiber guide pairs for coupling optical fiber arrays.

20. The optical coupler of claim 1, wherein said optical element is an active element mounted on a substrate edge-mounted in said optical block with said active element aligned with said fiber guide.

21. The optical coupler of claim 20, wherein said active element is a light emitter.

22. The optical coupler of claim 20, wherein said active element is a light detector.

23. The optical coupler of claim 20, further including circuit means on said block and electrically connected to said active element.

24. The optical coupler of claim 1, wherein said at least one guide cavity has a longitudinal axis beneath said top surface and beneath said trench;
   further including an elongated, narrow, deep second trench in said block and perpendicular to said guide cavity axis;
   a substrate edge-mounted in said trench and having a wall perpendicular to said guide cavity axis, said optical element being mounted on said substrate wall; and
   alignment means in said second trench for aligning said optical element and said longitudinal axis of said guide cavity.

25. The optical coupler of claim 24, further including multiple guide cavities in said coupler and multiple active optical elements on said substrate wall, said optical elements corresponding to said, guide cavities wherein said alignment means in said second trench aligns said optical elements and the longitudinal axes of corresponding guide cavities.

26. The optical coupler of claim 24, wherein said alignment means comprises a precision-etched second trench wall perpendicular to said guide cavities.

27. The optical coupler of claim 24, wherein said alignment means includes at least one microspring in said second trench for engaging said substrate.

28. The optical coupler of claim 27, wherein said microspring is fabricated from and is intergral with said block.

29. The optical coupler of claim 28, wherein said microspring is a micromechanical cantilever beam structure extending into said second trench to engage said substrate.

30. The optical coupler of claim 29, wherein said microspring includes a retractor for releasing said substrate.

31. The optical coupler of claim 27, wherein said microspring is located in said second trench to engage an edge of said substrate.

32. The optical coupler of claim 27, wherein said microspring is located in said second trench to engage a back surface of said substrate.

33. The optical coupler of claim 27, wherein said microspring is located in said second trench to engage a corner of said substrate.

34. The optical coupler of claim 27, wherein said microspring is located in said second trench to engage a front surface of said substrate.

35. The optical coupler of claim 27, wherein said substrate includes at least one positioning notch for receiving said microspring.

36. The optical coupler of claim 35, wherein said notch is tapered to accurately position said substrate with respect to said microspring.

37. The optical coupler of claim 35, wherein said notch includes a V-groove for positioning said substrate.

38. The optical coupler of claim 35, wherein said notch is precision etched on a front surface of said substrate, and wherein said microspring includes a tip for engaging said notch.

39. The optical coupler of claim 24, wherein said alignment means includes at least one stop precision etched in said second trench for engaging said substrate.

40. The optical coupler of claim 24, further including electrical contact pads on said substrate and on said coupler block for electrically connecting said active optical element on said substrate to circuitry on said block.

41. The optical coupler of claim 40, further including a wirebond connection between said contact pads.

42. The optical coupler of claim 40, further including reflowed solder balls interconnecting said contact pads.

43. The optical coupler of claim 42, wherein said contact pad on said coupler block is mounted on a released cantilevered microstructure beam.

44. The optical coupler of claim 40, wherein said contact pad on said coupler block is mounted on an end tip of a released, cantilevered microstructure beam, said contact pad on said tip engaging said contact pad on said substrate.

45. The optical coupler of claim 1, wherein said optical element is an active element located on a surface-mounted substrate, and wherein said means for transferring light comprises a reflector integral with said block.

46. The optical coupler of claim 45, wherein said reflector is a precision etched reflective surface in said block, said surface being aligned with said fiber guide and with said active element.

47. The optical coupler of claim 1, wherein said optical element is an active element mounted on the edge of a substate, said substrate being surface-mounted in a cavity on said block, said cavity being sufficiently deep to align said active element with said guide cavity.

48. The optical coupler of claim 1, wherein said optical element is a first waveguide mounted on said block, and wherein said means for transferring light is a deep-etched second waveguide fabricated in said block and having a first end aligned with said guide cavity and a second end aligned with said first waveguide.

49. The optical coupler of claim 48, further including a lens between said guide cavity and said second waveguide.

50. An optical coupler, comprising:
   a coupler block including a body portion having a top surface and at least one end surface;
   at least one fiber guide extending into said body portion beneath said top surface from said at least one end surface, said fiber guide comprising:
      first and second spaced walls defining a trench having a narrow width and extending along said top surface from said at least one end surface and extending into said body portion, said trench walls being flared apart from each other at said at least one end surface; and
      a guide cavity within said body portion beneath, extending along, and in communication with said trench, said cavity having a diameter equal to or slightly greater than the diameter of an optical fiber to be received by said coupler, said guide cavity diameter being greater than the width of said trench and flaring outwardly at said at least one end surface to facilitate insertion of an optical fiber into the cavity.

51. The optical coupler of claim 50, wherein said trench and said guide cavity extend across said body portion from said at least one end surface to a second end surface, said trench and said guide cavity being flared at both said at least one and said second end surfaces to receive first and second optical fibers axially aligned in end to end relationship.

52. The optical coupler of claim 50, wherein said block is a single crystal material, and said trench walls are covered with a protective oxide layer to permit fabrication of said guide cavity by isotropic etching through said trench.

53. The optical coupler of claim 52, wherein said block includes means for optically coupling light carried by an optical fiber in said guide cavity to an optical element.

54. The optical coupler of claim 50, wherein said guide cavity terminates at an enlarged cavity within said block, and means in said enlarged cavity for transferring light carried by an optical fiber in said guide cavity to an optical element.

55. The optical coupler of claim 54, wherein said enlarged cavity forms a second end surface for said body portion, said fiber guide extending through said body portion from said at least one end surface to said second end surface.

56. The optical coupler of claim 1, wherein said means transferring light comprises an enlarged cavity within said coupler block and defining one of said first and second end surfaces of said body portion.

* * * * *